US006275588B1

(12) United States Patent
Videcrantz et al.

(10) Patent No.: US 6,275,588 B1
(45) Date of Patent: Aug. 14, 2001

(54) APPARATUS AND METHOD FOR PERFORMING AND CONTROLLING ENCRYPTION/DECRYPTION FOR DATA TO BE TRANSMITTED ON LOCAL AREA NETWORK

(75) Inventors: Peter Videcrantz, Hellerup; Søren Steen, Lyngby; Kim Steenberg, Stenløse, all of (DK)

(73) Assignee: I-Data International A/S, Bagsvaerd (DK)

(*) Notice: Subject to any disclaimer, the term of this patent is extended or adjusted under 35 U.S.C. 154(b) by 0 days.

(21) Appl. No.: 09/531,532

(22) Filed: Mar. 21, 2000

Related U.S. Application Data

(63) Continuation of application No. PCT/DK99/00625, filed on Nov. 12, 1999.

(30) Foreign Application Priority Data

Nov. 12, 1998 (DK) ............................................ 1998 01481

(51) Int. Cl.⁷ ...................................................... H03M 7/38
(52) U.S. Cl. .......................... 380/255; 380/256; 380/257; 380/269; 713/168
(58) Field of Search .................................. 380/255, 256, 380/257, 269; 713/168

(56) References Cited

U.S. PATENT DOCUMENTS

| 4,586,027 | 4/1986 | Tsukiyama et al. | 340/347 DD |
|---|---|---|---|
| 4,701,745 | 10/1987 | Waterworth | 340/347 DD |
| 4,872,009 | 10/1989 | Tsukiyama et al. | 341/95 |
| 4,988,998 | 1/1991 | O'Brien | 341/55 |
| 4,996,690 | 2/1991 | George et al. | 371/37.1 |
| 5,003,307 | 3/1991 | Whiting et al. | 341/51 |
| 5,016,009 | 5/1991 | Whiting et al. | 341/67 |
| 5,126,739 | 6/1992 | Whiting et al. | 341/106 |
| 5,146,221 | 9/1992 | Whiting et al. | 341/67 |
| 5,297,147 | 3/1994 | Shimokasa | 370/118 |
| 5,307,413 | * 4/1994 | Denzer | 380/49 |
| 5,414,425 | 5/1995 | Whiting et al. | 341/67 |
| 5,463,390 | 10/1995 | Whiting et al. | 341/51 |
| 5,506,580 | 4/1996 | Whiting et al. | 341/51 |
| 5,532,694 | 7/1996 | Mayers et al. | 341/67 |
| 5,640,158 | 6/1997 | Okayama et al. | 341/51 |
| 6,088,455 | * 7/2000 | Logan et al. | 380/200 |
| 6,122,378 | * 9/2000 | Yoshiura et al. | 380/217 |
| 6,148,405 | * 11/2000 | Liao et al. | 713/201 |

FOREIGN PATENT DOCUMENTS

| 36 06 869 | 9/1986 | (DE) | H03M/7/46 |
|---|---|---|---|
| 0 582 907 | 2/1994 | (EP) | H03M/7/30 |
| 0 797 158 | 9/1997 | (EP) | G06F/17/30 |

* cited by examiner

Primary Examiner—Thomas R. Peeso
Assistant Examiner—Todd Jack
(74) Attorney, Agent, or Firm—Jacobson, Price, Holman & Stern, PLLC

(57) ABSTRACT

A technique for performing compression, encryption and transmission, and reception, decryption and decompression, respectively, of data communication packages on an area network.

75 Claims, 45 Drawing Sheets

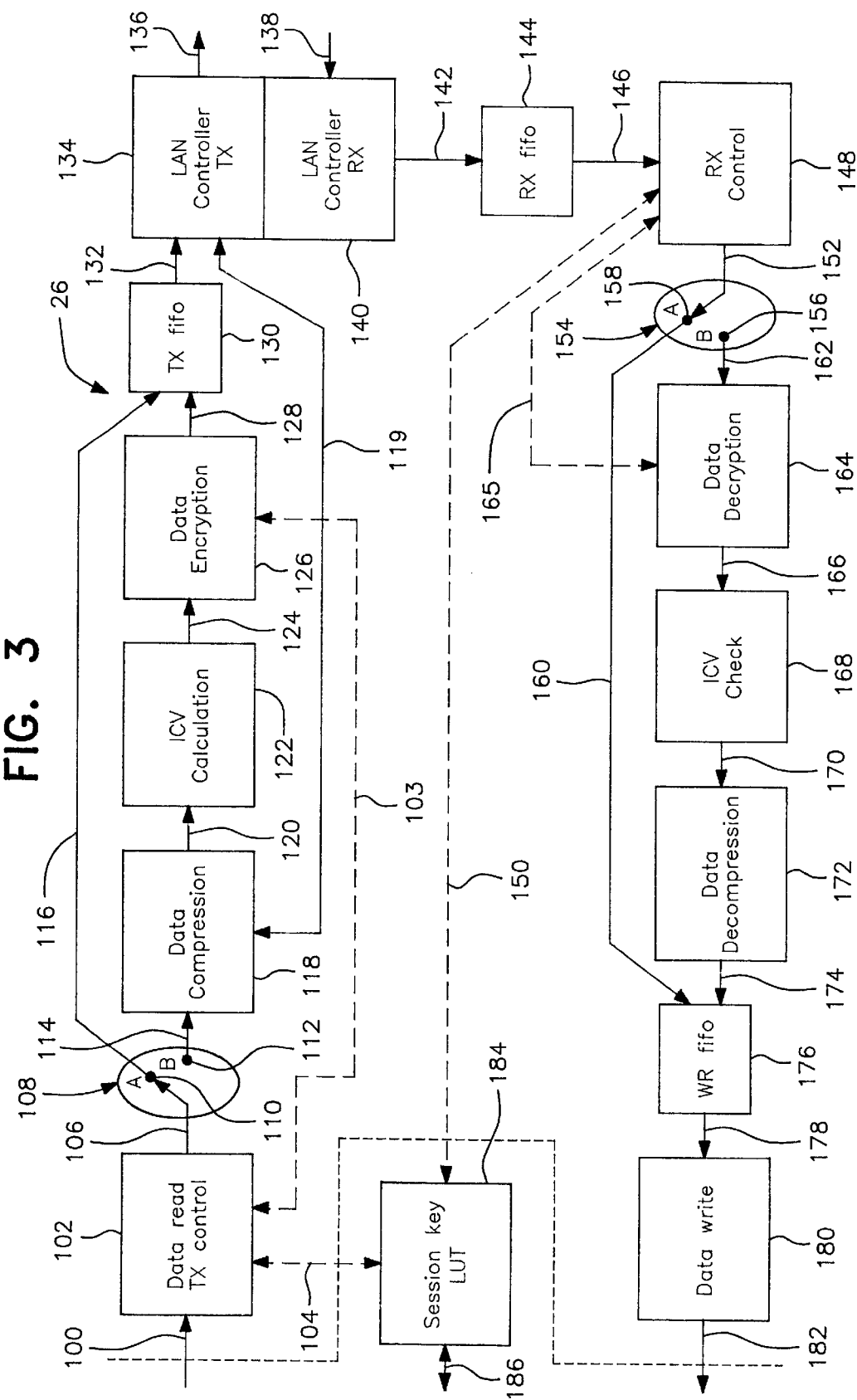

FIG. 25

Figure 1:
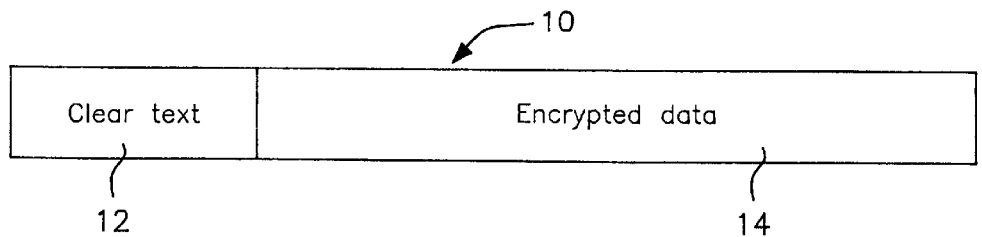

| Algorithm | ESP | Supported |
|---|---|---|
| ESP_DES_IV64 (64 bit initialization vector) | Optional | No |
| ESP_DES (DES-CBC) | Mandatory<br>Use HMAC-MD5<br>authentication | Yes |
| ESP_3DES | Recommended<br>Use HMAC-MD5<br>authentication | Yes |
| ESP_RC5 | Optional | No |
| ESP_IDEA | Optional | No |
| ESP_CAST | Optional | No |
| ESP_BLOWFISH | Optional | No |
| ESP_3IDEA | Optional | No |
| ESP_DES_IV32 | Optional | No |
| ESP_RC4 | Optional | No |
| ESP_NULL | Mandatory | (Yes) |

FIG. 26

| Algorithm | AH | ESP | Supported |
|---|---|---|---|
| AH_MD5 | Required | Required | Yes |
| AH_SHA | Required | — | No |
| AH_DES | Optional | — | No |

FIG. 27

| State | Activity |
|---|---|
| Idle | No processing is taking place and the PU is ready to begin processing. The PU is activated by a Req signal. |
| ReqAck | The request is acknowledge by responding with a OK. The PU has received an arbitration request and remains in this state until a Go or Complete signal is received which will initiate the configuration. See section Fejl! Henvisningskilde ikke fundet. for details on the arbitration of the PUs. |
| Config | Configuration of the PU is in progress. This configuration implies reading of the PD and other information. Error in configuration data enters the Error state. After configuration, processing starts with the header. |
| HrdProc | Header section/buffer is being processed. This may take place no matter what state the source buffer is in. After header processing, the source buffer is processed. If no data is available yet, the Wait state is entered, otherwise the Proc state is entered for processing of data. In case of errors, the Error state is entered. |
| Proc | Processing of the source buffer is in progress. This processing will continue while data is available (VFI>0). When no more data is available, the processing will either pause (enter the wait state) or processing will complete if no more data will be available. |
| Wait | This state is entered when no more data is available in the source buffer. The Proc state is entered if data becomes available again (from previous PU). If no more data become available, the StatusWB state is entered. Finally, the Error state is entered in case of errors. |
| StatusWB | This state is entered on completion of processing. The end pointer of source buffer of the NextPU is written and other status might be written. |
| Done | This state is used in order to let all other SMs of the PU enter the idle state before returning to the idle state where the PU shall be ready for new processing. |
| Error | An error condition has occurred. A minimum action is to issue an interrupt to the processor. It may be considered whatever the PU shall remain in the error-state until it is reset or it should return to the Done/Idle state and thereby be ready to process a new PD. |

FIG. 28

| State | Activity |
|---|---|
| Idle | The PU is ready to start processing. Processing is initiated by either a Go or a Complete signal. |
| SBEInit | Sets SBE to the start of the source buffer. Since the first Go is received in this state, the value is increased in next state unless a complete has been received.<br>An additional Go cannot be accepted in this state since the first Go has not been handled yet. It may be considered to keep account of how many Go-signals are received during this state since a number of operations must take place before it can be left (the SBS must be read from the PDS and the SBI must be loaded). |
| SBI1Incr | Increase SBE by SBI1 since the first Go is received on entry to this state. |
| Wait | Waiting for additional Go (SBI2Incr entered) or Complete (SetSBE entered). |
| SBI2Incr | An additional Go has been received on entry to this state. SBE is therefore incremented with SBI2.<br>The SM will remain in this state if an additional Go already should be pending.<br>If no Go is pending, the SM will wait for more Gos or enter the SetSBE length if complete is received. |
| SBESet | A complete is received at this point which means that the final source buffer end is available. This end pointer is read and the Done state is entered. |

FIG. 29

| State | Activity |
|---|---|
| Idle | The PU is ready to begin processing. The DBI counter is also cleared in this state. |
| Config | NextPUID is read and DBI1, DBI2 is read. |
| Wait1 | The DBI counter is incremented until it reaches DBI1 or processing is complete. The next PU will be requested and must be granted before further signaling can take place. |
| PUReq | The next PU is requested and the PDPtr is written to the PDPtr register. Complete is then signaled if processing is complete, otherwise Go is signaled corresponding to the first DBI1 data is available. |
| Go | A Go signal is send to the next PU and the DBI counter is reset. |
| Wait2 | In this state the SM is waiting for the processing to complete, the DBI2 count to be reached or a Sync to be signaled. |
| Complete | Complete is signaled to the next PU. |
| AcceptSync | A Sync signal has been received and is accepted since processing still is in progress. |
| Reload | The NextPUID, DBI2 values shall be read from the PD since a new Next PU is specified. The DBI counter is reset in this state. |

FIG. 30

| State | Activity |
|---|---|
| Idle | The PU is ready to begin processing |
| Go | A go has been received from the previous PU |
| Complete | A complete signal has been received from the previous PU. The complete signal does not need to be preceded by a Go signal. |

FIG. 31

| Interrupt line | NIC | VPN |
|---|---|---|
| Int 0 | IIP FPGA (only this FPGA is mounted in NIC-configuration) | IIP FPGA (processing data received from internet) |
| Int 1 | Not used | IOP FPGA (Processing data from LAN) |
| Int 2 | CPLD | CPLD |
| Int 3 | UART (Not shown) | UART (Not shown) |
| Int 4 | Pajero (System controller) | Pajero (System controller) |

FIG. 32

| CS-No. | Device |
|---|---|
| 0 | Inbound FPGA |
| 1 | Outbound FPGA |
| 2 | CPLD/Debug |
| 3 | RS232/UART. Option: PCI-ROM |
| 4 | Boot-Flash |

FIG. 33

| 24 | 22 | 21 | 20 | 14 | 13 | 10 | 9 | 2 | 1 | 0 |
|---|---|---|---|---|---|---|---|---|---|---|
| Not Used | | '1' | Not Used | | PUID | | Register address | | Always 0 (32 bit access) | |

FIG. 34

| Address | Name | Description |
|---|---|---|
| PDPtrRegAddr | PDPtr | This register holds the pointer to the PD which currently is being processed, is about to be processed or has been processed. This register must be valid when Go or Complete is signaled. |
| SBIRegAddr | SBI | Source Buffer Increment. This register contains the values of SBI1 and SBI2. This register must be configured by the CPU before processing. |

FIG. 35
SBI1 and SBI2 layout

| Type<br>31..24 | | | | | | | | |
|---|---|---|---|---|---|---|---|---|
| Type<br>23..16 | | | | | | | | |
| Type<br>15..8 | R/W<br>SBI2_7 | R/W<br>SBI2_6 | R/W<br>SBI2_5 | R/W<br>SBI2_4 | R/W<br>SBI2_3 | R/W<br>SBI2_2 | R/W<br>SBI2_1 | R/W<br>SBI2_0 |
| Type<br>7..0 | R/W<br>SBI1_7 | R/W<br>SBI1_6 | R/W<br>SBI1_5 | R/W<br>SBI1_4 | R/W<br>SBI1_3 | R/W<br>SBI1_2 | R/W<br>SBI1_1 | R/W<br>SBI1_0 |

FIG. 36

| ID | |
|---|---|
| 0 | Control Unit (Accessed by the CPU only) |
| 1 | OutQueue (PDs which has been processed) |
| 2 | InQueue (PDs to process) |
| 3 | Ethernet receive |
| | IP header auto router |
| 4 | Authentication (primarily verification) |
| 5 | Decrypt |
| 6 | Decompress |
| | IP Sec header auto router |
| 7 | Compress |
| 8 | Authentication (primary generation) |
| 9 | Encrypt |
| A | Transmit |
| B | BridgeRead. Used to read external memory. |
| C | BridgeWrite. Used to write to external memory. |
| | |
| Fh | Null/None (used to indicate no next PU) |

FIG. 37

| Name | Source | Target | Value | Description |
|---|---|---|---|---|
| Go | PU/CU | PU | 0000 | This signal has two meanings:<br>1: If this is the Go after PU arbitration of the next PU, it indicates that SBI1 words have been written to the destination buffer.<br>2: If this is a following Go after PU arbitration of the Source, it indicates that additionally SBI2 words has been written to the destination buffer of the current PU.<br>Since the start address of the source buffer generally will be smaller than or equal to the start address of the destination buffer, this does also qualify the availability of the additional data to the next PU. |
| Complete | PU/CU | PU | 0001 | Indicates to the next PU that no more data will be to the current PUs destination buffer and thereby that no more data will be available if the source buffer of the next PU. The final end indication is available in the SrcBufEndPtr of the PDS of the next PU.<br>This signal is issued by the current PU when it has completed processing. |
| Reset | CU | PU | 0010 | The PU shall be reset. The reset implies that the idle state is entered and internal configuration is reset where appropriate. |
| Resume | CU/PU | PU | 0011 | The target PU shall resume processing – if possible. |
| PUReq | PU/CU | PU | 0100 | This signal is issued when a PU wants to start the next PU–and thereby own the PU until processing is complete. Acknowledge/denial is indicated with OK or Busy. |
| Sync | InQueue PU | PU | 0101 | This sync signal is issued by the InQueue in order to make the target reread the NextPUID and DBI2 values and begin Go signaling to that PUID.<br>Acknowledge/denial is indicated with OK or Busy. |
| RegAccess | PU | PU | 1000 | This command indicates that the current cycle shall be interpreted as a memory–access. The PUID indicates the destination. |
| ExtMemAcc | PU | Bridge Read/Write | 1001 | This cycle is to external memory indicated by the source and destination buffers of the bridge.<br>See the description of the source and destination buffer for details on the results and their interpretation. |
| FIFORamACC | PU/CU | PUNone | 1010 | Access to FIFO memory. This command is provided for the case where none of the other commands need to be issued. |

FIG. 38

| Name | Value | Description |
|---|---|---|
| Error | 00 | The command was illegal/resulted in an error. |
| Busy | 01 | The command could not be accepted by the target. |
| OK | 10 | The command is accepted by the target. |
| Special | 11 | The interpretation of this command depends on the command. |

FIG. 39

| State | Activity |
|---|---|
| SendPUReq | If the bus is granted (ManagementSource=ActivePUID): Issue a PUReq on the management data bus with the Target bus set to the next PUID.<br>If the response is OK, the next PU is granted and the PDPtr may be written, othewise the request shall be retried. |
| WritePDPtr | Write PD Pointer to the next PU. Go or Complete may then be signaled. |

FIG. 40

| Type | Description |
|---|---|
| C | The current PU may write to this field on during processing or on completion of processing. |
| P | The previous PU may write information to this field. This is typical for buffer end indication. |
| S | This field is configured by software. |

FIG. 41

| Property | Header | Buffer |
|---|---|---|
| Start pointer | Fixed/Written by SW | Fixed/Written by SW |
| End pointer | Fixed/Written by SW | Written by previous PU on completion or defined by SW when no previous PU exist. |
| Processing order | First | Last |
| Synchronization mechanism with previous PU | No | Yes |

FIG. 42

| Memory area | Read | | Write | |
|---|---|---|---|---|
| | Start | End | Start | End |
| Header | Aligned | Aligned | — | — |
| Buffer | Aligned | Any address | Aligned | Aligned |

FIG. 43

| Name | Size | Type | Description |
|---|---|---|---|
| SrcBufStartPtr | 32b | S | Pointer to first word in source buffer |
| SrcBufEndPtr | 32b | S/P | Pointer to octet last octet of buffer. This field is typically written by the previous PU when it completes, and does then identify the end of the produced data |
| HdrStartPtr | 32b | S | Pointer to the first word of the header |
| HdrEndPtr | 32b | S | Pointer to the last word of the header |
| DestBufStartPtr | 32b | S | Pointer to first octet in destination buffer |
| DestBufEndPtr | 32b | (S) | Pointer to the last word in the destination buffer. This field allows the software to define a maximum size for a destination buffer. This field is only provided for compression and decompression where the length cannot be predicted and there therefore is a need to avoid overwriting of the allocated space. |
| NextPDPtr | 32b | S | This field is used by the InQueue and OutQueue to link the PDs in the queues. |
| Config_Base | 32b | S | Basic configuration. The bits is defined below. Some PUs might not use all fields and some may be specific for a PU. The Config_Base register is defined below. |

FIG. 44

Config_Base

| Type | S | S | S | S |
|------|---|---|---|---|
| 31..24 | HdrExt | SrcExt | DestExt | |
| Type | | | | |
| 23..16 | | | | |
| Type | | | | |
| 15..8 | | | | |
| Type | | | | |
| 7..0 | | | S | S | S | S |
| | | | NextPUID 3 | NextPUID 2 | NextPUID 1 | NextPUID 0 |

FIG. 45

| Offset | Size | Type | Name |
|--------|------|------|------|
| 0 | 32b | S | Config_Base |
| 4 | 32b | P/S | SrcBufEndPtr |

FIG. 46

| Offset | Size | Type | Name | Description (if relevant) |
|--------|------|------|------|---------------------------|
| 0h | 32b | S | Config_Base | |
| 4h | 32b | S/P | SrcBufEndPtr | |
| 8h | 32b | S | SrcBufStartPtr | |
| Ch | 32b | S | DestBufStartPtr | |
| 10h | 32b | S | KeyPtr | Pointer to area containing keys and initialization vector. |

FIG. 47

Config_Base

| Type | S | S | S | S | S | S | S | S |
|---|---|---|---|---|---|---|---|---|
| 31..24 | HdrExt | ScrExt | DestExt | | AlgID3 | AlgID2 | AlgID1 | AlgID0 |
| Type | S | S | S | S | S | S | S | S |
| 23..16 | PadLen7 | PadLen6 | PadLen5 | PadLen4 | PadLen3 | PadLen2 | PadLen1 | PadLen0 |
| Type | S | S | S | S | S | S | S | S |
| 15..8 | NextHdr7 | NextHdr6 | NextHdr5 | NextHdr4 | NextHdr3 | NextHdr2 | NextHdr1 | NextHdr0 |
| Type | S | S | S | S | S | S | S | S |
| 7..0 | IVCopy | IWB | ESPTrail | | NextPUID 3 | NextPUID 2 | NextPUID 1 | NextPUID 0 |

FIG. 48

| Offset | Size | Type | Name | Description (if relevant) |
|---|---|---|---|---|
| 0h | 32b | S | Config_Base | |
| 4h | 32b | S/P | SrcBufEndPtr | |
| 8h | 32b | S | SrcBufStartPtr | |
| 8h | 32b | S | DestBufStartPtr | |
| Ch | 32b | S | KeyPtr | Pointer to key and initialization vector section. |
| 10h | 32b | C | NextHdr | |

FIG. 49
Config_Base

| Type 31..24 | S HdrExt | S SrcExt | S DestExt | S AlgID3 | S AlgID2 | S AlgID1 | S AlgID0 |
|---|---|---|---|---|---|---|---|
| Type 23..16 | S PadLen7 | S PadLen6 | S PadLen5 | S PadLen4 | S PadLen3 | S PadLen2 | S PadLen1 | S PadLen0 |
| Type 15..8 | | | | | | | | |
| Type 7..0 | IWB | IVSource | ESPTrail | | S NextPUID 3 | S NextPUID 2 | S NextPUID 1 | S NextPUID 0 |

FIG. 50
NextHdr

| Type 31..24 | | | | | | | | |
|---|---|---|---|---|---|---|---|---|
| Type 23..16 | | | | | | | | |
| Type 15..8 | | | | | | | | C |
| Type 7..0 | C NextHdr7 | C NextHdr6 | C NextHdr5 | C NextHdr4 | C NextHdr3 | C NextHdr2 | C NextHdr1 | NextHdr0 |

FIG. 51

| Offset | Size | Type | Name | Description (if relevant) |
|---|---|---|---|---|
| 0h | 192b | S | Key | Key data for algorithm (Key0..3) |
| 18h | 64b | S/C | IV | initialization vector |

FIG. 52

| Offset | Size | Type | Name | Description (if relevant) |
|---|---|---|---|---|
| 0h | 32b | S | Config_Base | |
| 4h | 32b | S/P | SrcBufEndPtr | |
| 8h | 32b | S | SrcBufStartPtr | |
| Ch | 32b | S | SrcHdrStartPtr | |
| 10h | 32b | S | SrcHdrEndPtr | |
| 14H | 32b | S | AuthStartPtr | Start pointer for value location of authentication value for if AuthApp=0 |
| 18H | 32b | S | KeyPtr | Algorithm configuration block pointer. Described below in section Fejl! Henvisningskilde ikke fundet. |

FIG. 53

Config_Base

| Type | 31..24 | 23..16 | 15..8 | 7..0 |
|---|---|---|---|---|
| Type | S | S | S | S |
| 31..24 | HdrExt | SrcExt | DestExt | |
| Type | | | | S |
| 23..16 | | | | AuthApp |
| Type | | | S | S |
| 15..8 | | | AlgID1 | AlgID0 |
| Type | | S | S | S |
| 7..0 | AlgID3 | AlgID2 | NextPUID 1 | NextPUID 0 |
|  | NextPUID 3 | NextPUID 2 |  |  |

FIG. 54

| Offset | Size | Type | Name | Description (if relevant) |
|---|---|---|---|---|
| 0h | 32b | S | Config_Base | |
| 4h | 32b | S/P | SrcBufEndPtr | |
| 8h | 32b | S | SrcBufStartPtr | |
| Ch | 32b | S | SrcHdrStartPtr | |
| 10h | 32b | S | SrcHdrEndPtr | |
| 14H | 32b | S | AuthStartPtr | Start pointer for authentication value if AuthApp=0. |
| 18H | 32b | S | KeyPtr | Pointer to key section. |

FIG. 55
Config_Base

| | | | | | | | | |
|---|---|---|---|---|---|---|---|---|
| Type | S | S | S | | | | | |
| 31..24 | HdrExt | SrcExt | DestExt | | | | | |
| Type | | | | | | | | S |
| 23..16 | | | | | | | | AuthApp |
| Type | | | | | S | S | S | S |
| 15..8 | | | | | AlgID3 | AlgID2 | AlgID1 | AlgID0 |
| Type | | | | | S | S | S | S |
| 7..0 | | | | | NextPUID 3 | NextPUID 2 | NextPUID 1 | NextPUID 0 |

FIG. 56

| Offset | Size | Type | Name | Description (if relevant) |
|---|---|---|---|---|
| 0h | 32b | S | Algorithm | Configuration data |
| 4h | 192b | S | Key | Key data |
| 20h | 192b | S/C | IV | Initialization vector |
| 3C | 64b | S/C | Config | |

FIG. 57
Algorithm

| Type | | | | | | | | |
|---|---|---|---|---|---|---|---|---|
| 31..24 | | | | | | | | |
| Type | S | S | S | S | S | S | S | S |
| 23..16 | BlkLen2 | BlkLen1 | BlkLen0 | | | | BeginConf | EndConf |
| Type | S | S | S | S | S | S | S | S |
| 15..8 | AlgOpt7 | AlgOpt6 | AlgOpt5 | AlgOpt4 | AlgOpt3 | AlgOpt2 | AlgOpt1 | AlgOpt0 |
| Type | | | | | S | S | S | S |
| 7..0 | | | | | AlgID3 | AlgID2 | AlgID1 | AlgID0 |

FIG. 58

| Offset | Size | Type | Name | Description (if relevant) |
|---|---|---|---|---|
| 0h | 32b | S | Config_Base | |
| 4h | 32b | S/P | SrcBufEndPtr | |
| 8h | 32b | S | SrcBufStartPtr | |
| Ch | 32b | S | DestBufStartPtr | |
| 10h | 32b | S/C | DestBufEndPtr | |
| 14H | 32b | S | AltDestBufPtr | Alternative start of destination buffer. This value is used if the result of the compression is insufficient. |
| 18H | 32b | S | AltTxConfig | Alternate configuration of transmission used for Ethernet transmit. |

FIG. 59

| Type | S | S | S | S | S | S | S | S |
|------|---|---|---|---|---|---|---|---|
| 31..24 | HdrExt | SrcExt | DestExt | | | | | |
| Type | S | S | S | S | S | S | S | S |
| 23..16 | AlgOpt7 | AlgOpt6 | AlgOpt5 | AlgOpt4 | AlgOpt3 | AlgOpt2 | AlgOpt1 | AlgOpt0 |
| Type | S | S | S | S | S | | | |
| 15..8 | AlgID3 | AlgID2 | AlgID1 | AlgID0 | | | CompDet | Init |
| Type | | | | | S | S | S | S |
| 7..0 | | | | | NextPUID 3 | NextPUID 2 | NextPUID 1 | NextPUID 0 |

FIG. 60

| Offset | Size | Type | Name | Description (if relevant) |
|--------|------|------|------|---------------------------|
| 0h | 32b | S | Config_Base | |
| 4h | 32b | S/P | SrcBufEndPtr | |
| 8h | 32b | S | SrcBufStartPtr | |
| Ch | 32b | S | DestBufStartPtr | |
| 10h | 32b | S/C | DestBufEndPtr | |

FIG. 61

| Type | 31..24 | S | HdrExt | S | SrcExt | S | DestExt | S | | S | | S | | S | | S | |
|------|--------|---|--------|---|--------|---|---------|---|---|---|---|---|---|---|---|---|
| Type | 23..16 | S | AlgOpt7 | S | AlgOpt6 | S | AlgOpt5 | S | AlgOpt4 | S | AlgOpt3 | S | AlgOpt2 | S | AlgOpt1 | S | AlgOpt0 |
| Type | 15..8 | S | AlgID3 | S | AlgID2 | S | AlgID1 | S | AlgID0 | | | | | S | Init | S | |
| Type | 7..0 | | | | | | | | NextPUID 3 | S | NextPUID 2 | S | NextPUID 1 | S | NextPUID 0 |

FIG. 62

| Offset | Size | Type | Name | Description (if relevant) |
|--------|------|------|------|---------------------------|
| 0h | 32b | R/W | PDPtr | Pointer to the PD to be inserted in queue. The insertion can only take place when Status (see below) is 0. The upper bits identify the queue. |
| 4h | 1b | R | Status | Single bit to indicate whatever a new PD pointer can be accepted. |
| 8h | 32b | R | NextPD | Pointer to the PD waiting to be started. 0 indicates that no PD is pending. |

FIG. 63

| Offset | Size | Type R/W | Name | Description (if relevant) |
|---|---|---|---|---|
| 0h | 32b | R | Config | Configuration of operation and status |
| 4h | 32b | R | ComplQueueGet | A read operation will return a pointer and PUID to the first PD in the Complete-queue and advance to the next PD. 0 indicates that the queue is empty. |
| | | R | ComplQueueState | A read operation will return a pointer and PUID to the first PD in the Complete-queue. In opposite to QueueGet, the queue remains unchanged. |
| 8h | 32b | R | GoQueueGet | A read operation will return a pointer and PUID to the first PD in the Go-queue and advance to the next PD. 0 indicates that the queue is empty. |
| Ch | 32b | R | GoQueueState | A read operation will return a pointer to the first PD and PUID in the Go-queue. In opposite to QueueGet, the queue remains unchanged. |

FIG. 64

Outqueue pointer format

| Type 31..24 | R | R | R | R | | | | |
|---|---|---|---|---|---|---|---|---|
| | PUID3 | PUID2 | PUID1 | PUID0 | | | | |
| Type 23..16 | R | R | R | R | R | R | R | R |
| | Addr15 | Addr14 | Addr13 | Addr12 | Addr11 | Addr10 | Addr9 | Addr8 |
| Type 15..8 | R | R | R | R | R | R | R | R |
| | Addr7 | Addr6 | Addr5 | Addr4 | Addr3 | Addr2 | Addr1 | Addr0 |
| Type 7..0 | | | | | | | Addr17 | Addr16 |

FIG. 65

Config

| Type | 31..24 |   |   |   |   |   |   |
|------|--------|---|---|---|---|---|---|
| Type | 23..16 |   |   |   |   |   |   |
| Type | 15..8  | R |   |   | W |   | W |
|      |        | GoRdy |   |   | GoIntr | GoEnb |   |
| Type | 7..0   | R |   |   | W | W |   |
|      |        | ComplRdy |   |   |   | ComplIntr | ComplEnb |

FIG. 66

| Offset | Size | Type | Name | Description (if relevant) |
|--------|------|------|------|---------------------------|
| 0 | 32b | C | GoLink | Link for Go Queue |
| 4 | 32b | S | Reserved | Required for SrcBufEnd write of previous PU. |

FIG. 67

| Offset | Size | Type | Name | Description (if relevant) |
|---|---|---|---|---|
| 0 | 32b | S | Config | Configuration, see below |

FIG. 68

| Type 31..24 | | | | | | PrevPU3 S | S | S |
|---|---|---|---|---|---|---|---|---|
| Type 23..16 | | | | | | S | PrevPU2 S | PrevPU1 S | PrevPU0 S |
| Type 15..8 | | | | | | S | S | S | S |
| Type 7..0 | | | | | | NextPUID 3 | NextPUID 2 | NextPUID 1 | NextPUID 0 |

Config

FIG. 69

| State | Activity |
|---|---|
| Idle | The PU is waiting for a PD in the queue to be processed |
| LoadPUID | The NextPUID and PrevPUID field is read from the PD in order to identify the PUs. An unknown PUID results in an error |
| Error | An error has occurred (illegal PUID). |
| PUReq | This is a substatemachine which will perform the request of the next PU and return when it is granted. The state machine is defined in section Fejl! Henvisningskilde ikke fundet.<br>After the next PU has been reserved, it is determined who shall perform the signaling.<br>1) If no previous PU is indicated, the next PU is simply started by a complete signal.<br>2) If it has been detected that the previous PU has been assigned a new PD (SM.InQueue2<>NewPD), all data are therefore available in the source buffer and the end needs to be transferred.<br>3) If the previous PU has not been granted to another PU it is verified whatever it is operating on the current PD. In this case, synchronization is attempted between the two PUs. |
| PDVerify | The previous PU might be operating on the current PD. If this is the case and it has not been granted to another PU, a sync is signaled to the previous PU.<br>Transition to the Sync state should not be activated until a sync command actually can be transferred. Violation of this requirement could allow the previous PU to change the PD undetected (since the transition condition is evaluated). |
| Sync | Synchronization between the previous and next PU shall take place. If synchronization is accepted, initiation of the next PU is complete.<br>If the synchronization is not accepted, it is because the next PU just has completed the processing and thereby has completed processing of the PD. The end pointer is therefore transferred before complete is signaled. |
| EndWB | This state is entered if the Sync signal was not accepted by the PU. This will only be the case if the processing is complete and the end of the buffer therefore needs to be copied to the source buffer end of the next PU. |
| Complete | Complete is signaled to the next PU since all source data are available. |

FIG. 70

| Offset | Size | Type | Name | Description (if relevant) |
|---|---|---|---|---|
| 0h | 32b | S | Config_Base | |
| 4h | 32b | S | SrcBufStartPtr | |
| 8h | 32b | S/P | SrcBufEndPtr | |
| Ch | 32b | S | HdrStartPtr | |
| 10h | 32b | S | HdrEndPtr | |
| 14h | 48b | S | DestAddr | Destination MAC address |
| 1Ah | 16b | S | Type | Type of MAC frame. |
| 1Ch | 32b | C | Status | |

FIG. 71

| Type 31..24 | S HdrExt | S SrcExt | S DestExt | | | | |
|---|---|---|---|---|---|---|---|
| Type 23..16 | S IPOfs4 | S IPOfs3 | S IPOfs2 | S IPOfs1 | S IPOfs0 | Length10 | Length9 | Length8 |
| Type 15..8 | S Length7 | Length6 | Length5 | Length4 | Length3 | Length2 | Length1 | Length0 |
| Type 7..0 | IPChk | IPLen | IPLenCalc | LenT | NextPUID 3 | NextPUID 2 | NextPUID 1 | NextPUID 0 |

FIG. 72

| Offset | Size | Type | Name | Description (if relevant) |
|---|---|---|---|---|
| 0h | 32b | S | Config_Base | |
| 4h | 32b | S | DestBufStartPtr | Start of buffer used for storage of the received data. This address may be 16 bit aligned in order to align the payload to a 32 bit boundary (since the Src/dest address and Type/Size fields constitutes 14 octets). Note, that full 32 bits will be written without any Read-modify-write cycles. |
| 8h | 32b | C | DestBufEndPtr | End of destination buffer. Written on completion of reception to indicate length end of data. This length will be indicated on a octet level. The value will also be written to the SrcBufEndPtr in the PDS section indicated by the NextPUID3..0 field. |
| Ch | 32b | C | Status | Status of reception. The software cannot reliably write to this register while the reception is in progress since the Ethernet receiver also may write it at any time during reception. |

FIG. 73

Config_Base

| Type | | | | | | | |
|------|---|---|---|---|---|---|---|
| 31..24 | | | | | | | |
| Type | | | | | | | |
| 23..16 | | | | | | | |
| Type | | | | | | | |
| 15..8 | | | | | | | |
| Type | | | | | | | |
| 7..0 | | | | NextPUID 3 | S | NextPUID 2 | S | NextPUID 1 | S | NextPUID 0 | S |

FIG. 74

| Offset | Size | Type | Name | Description (if relevant) |
|--------|------|------|------|---------------------------|
| 10h | 48b | W | RXMac | MAC address of the received MAC. |
| 18h | 48b | W | TxMac | MAC address of the transmitting MAC. |

FIG. 75

| Offset | Size | Type | Name | Description (if relevant) |
|--------|------|------|------|---------------------------|
| 20h | 32b | W | MAC0 | This register is used to enter the lower 32 bits of MAC address. |
| 24h | 32b | R/W | MACCtrl | The lower 16 bits of this register holds the upper 16 bits of the MAC address. Additionally 5 bits are used for configuration and status as defined below: |

FIG. 76

MACCtrl

| Type |  |  |  |  |  |  |  |  |
|---|---|---|---|---|---|---|---|---|
| 31..24 | R | W |  |  |  | W | W | W |
| Type | Busy | Mode |  |  |  | CMD2 | CMD1 | CMD0 |
| 23..16 | W | W | W | W | W | W | W | W |
| Type | MAC47 | MAC46 | MAC45 | MAC44 | MAC43 | MAC42 | MAC41 | MAC40 |
| 15..8 | W | W | W | W | W | W | W | W |
| Type | MAC39 | MAC38 | MAC37 | MAC36 | MAC35 | MAC34 | MAC33 | MAC32 |
| 7..0 |  |  |  |  |  |  |  |  |

FIG. 77

| Offset | Size | Type | Name | Description (if relevant) |
|---|---|---|---|---|
| 0h | 32b | W | BufStart | Buffer start address. First access will be at this address |
| 4h | 32b | W | BufEnd | Buffer end address – immediately after the last octet of the buffer. |
| 8h | 32b | R | BufPtr | Address of last read. |

FIG. 78

| Result | Report when: |
|---|---|
| Error | A PU which has not been granted ownership of the buffer has attempted to read from the buffer. |
| Busy | The data to read is not yet fetched from external memory. |
| OK | Valid data has been read |
| Special | Last Word/fraction of the source buffer has been read. |

FIG. 79

| Offset | Size | Type | Name | Description (if relevant) |
|---|---|---|---|---|
| 0h | 32b | W | BufStart | Buffer start address. First access will be at this address |
| 4h | 32b | W | BufEnd | Buffer end address – immediately after the last word of the buffer. |
| 8h | 32b | R | BufPtr | Address of next write operation. |

FIG. 80

| Result | Report when: |
|---|---|
| Error | A PU which has not been granted ownership of the buffer or has attempted to read from the buffer or an attempt to write beyond the buffer. |
| Busy | The written data could not yet be accepted. |
| OK | The written data is accepted |
| Special | Written data is accepted and end of buffer thereby is reached. |

APPARATUS AND METHOD FOR PERFORMING AND CONTROLLING ENCRYPTION/DECRYPTION FOR DATA TO BE TRANSMITTED ON LOCAL AREA NETWORK

This application is a continuation application of International Application No. PCT/DK99/00625, filed Nov. 12, 1999.

The present invention generally relates to a technique for performing compression, encryption and transmission, and reception, decryption and decompression, respectively, of data communication packages on an area network.

The most commonly applied technique for performing transmissions on a network such as LAN (local area network) or WAN (wide area network) involves performing compression/decompression, encode/decode and transmission/reception of data communication packages to establish a fast communication between stations in the LAN. Techniques are disclosed in following patents and published patent applications DE 3 606 869, EP 0 582 907, U.S. Pat. Nos. 4,701,745, 4,996,690, 5,003,307, 5,016,009, 5,126,739, 5,146,221, 5,414,425, 5,463,390, 5,506,580, 5,532,694, 4,586,027, 4,872,009, 4,701,745 and 4,988,998 describing various aspects of compression/decompression and transmission from one unit to another unit. Reference is made to the above patents and published patent applications, and the above US patents are hereby incorporated in the present specification by reference.

According to present technology it appears that no technique is currently available ensuring a secure communication in combination with a fast communication. To secure data communication packages one must encrypt the data communication packages according to a between stations known encryption key or keys. This is a time consuming process and therefor slows down and in particular delays the transmission between two or more stations and consequently contradicts the combination of a secure and fast communication. Furthermore, according to present technology operations such as compression, encryption and transmission, and reception, decryption and decompression are performed consecutively and which further slows the transmissions on the LAN as the data packages increase. Since computer networking becomes a more and more significant part of today's computer applications and communication on networks becomes everyday practise, it is rendered necessary to develop an apparatus and method for performing secure transmissions and increased transmission rates between stations in a computer network.

An object of the present invention is to provide a novel apparatus and method for securing data communication packages by encryption and simultaneously ensuring a fast communication between stations in a network such as LAN or WAN.

A particular advantage of the present invention is the significant reduction or substantially elimination of delays in transmitting data communication packages through a network by continuously insuring data is presented to the LAN or WAN in an encrypted state.

A particular feature of the present invention relates to the fact that the apparatus according to the present invention may be produced fully or partly in a process compatible with the production of integrated electronic circuits using any appropriate circuit technology involving VLSI, LSI, ASIC, FPGA, PLD production techniques or any combinations thereof.

The above object, the above advantage and the above feature together with numerous other objects, advantages and features which will be evident from the below detailed description of a preferred embodiment of the present invention is according to a first aspect of the present invention obtained by a communication controller for performing data encryption and data decryption of data communication packages to be transferred in a network such as a LAN (local area network) or WAN (wide area network), the data communication package containing a first section of non-encrypted data and a second section containing encrypted data, and comprising a session key LUT unit and a transmission and encryption section comprising:

(a) a data read transmission control unit (102) connected to a system bus of a host system and receiving input data therefrom and communicating with said session key LUT (186), said session key LUT (186) providing a transmission encryption key for said data communication package, (b) a data compressing unit (118) providing compression of a part of said input data thereby producing a compressed part of said input data contained in said second section of said data communication package, (c) a data encryption unit (126) providing an encryption of said second section of said data communication package according to said transmission encryption key transferred from said session key LUT (186) to said data encryption unit (126), (d) an integrity check value calculation unit (122) constituting a first series configuration from said data compression unit (118) intercommunicating through said integrity check value calculation unit (122) to said data encryption unit (126), (e) a network transmission controller (134) providing said data communication package through a connection to said network, supplying said input data to said network in a transmission rate determined by said network transmission controller (134) and said network, and (f) a first switch means (108) enabling switching between two modes of operation, a first mode of operation providing bypassing or disabling of said first series configuration and enabling communication between said data read transmission control unit (102) and said network transmission controller (134) for transferring said input data directly hereto and a second mode of operation enabling communication between said data read transmission control unit (102) through said first series configuration to said network transmission controller (134), said communication controller further comprising a receiving and decrypting section comprising:

(g) a LAN receiving controller (140) providing a connection to said network and receiving a received data communication package from said network, (h) a data receiving control unit (148) receiving said received data communication package through communication with said network receiving controller (140), and communicating with said session key LUT (186), said session key LUT (186) providing a reception encryption key for said received data communication package, (i) a data decompression unit (172) providing decompression of said second section of said received data communication package, (j) a data decryption unit (164) providing a decryption of said second section of said received data communication package according to a reception encryption key transferred from said session key LUT (186) to said data decryption unit (164), (k) an integrity check value verification unit (168) receiving said received data communication package from said data decryption unit (164), and constituting a second series configuration from said data decryption unit (164) intercommunicating through said integrity check value verification unit (166) to said data decompression unit (172), said integrity check value verification unit (166) transferring said second section of said received data communication package to said data decompression unit (172), (l) a data write unit (180) connected to said system bus of said host system, supplying said system bus with said received data communication package, and (m) a second switch means (154) enabling switching between two modes of operation, a third mode of operation providing bypassing or disabling of said second series configuration and enabling communication between said data receiving control unit (148) and said data write unit (180) for transferring said first section of said received data communication package directly hereto, and a fourth mode of operation enabling communication between said data receiving control unit (148) through said second series configuration to said data write unit (180).

By incorporating several of the functions of the communication controller, according to the first aspect of the present invention, in a single electronic circuit the time delay from one unit to the next is considerable reduced compared to time delays between discrete electronic components.

The term unit is to be understood as a generic term including all equivalent elements, blocks and sections etc. The term unit may comprise a single entity or may comprise a multiple of entities into one self-contained and defined unit, element, block or section.

In the communication controller according to the first aspect of the present invention, the transmission and encryption section further comprises a transmission FIFO (first in first out storage means) constituting an input section of the network transmission controller. Furthermore in the communication controller according to the first aspect of the present invention, the receiving and decrypting section further comprises a write FIFO receiving the received data communication package from the data receiving control unit in the third mode of operation, receiving the received data communication package from the data decompression unit in said fourth mode of operation and transferring the received data communication package through a connection to the data write unit, and a receiving FIFO receiving the received data communication package from the network reception control and transferring the data communication package through a connection to the data receiving control unit.

Since the communication controller, according to the first aspect of the present invention, comprises storage means for transmission as well as reception of data communication packages, full compatibility is achieved between a host system and the network. Especially differences in reading rates between stations and network transmission rates are compensated for. The host system may operate at one frequency, while the network may operate at another without overloading either the host system or the network. This relieves processing time available to the host system, since delivering a data communication package to the controller frees the host system's central processing unit to perform other tasks than waiting for completion of transmission and therefor optimises the transmission performed on the network.

The communication controller, according to the first aspect of the present invention, for receiving and transmitting data communication packages on a network provides interrupt routines for units included in the communication controller hereby insuring a continuous data transmission on a network. The communication controller, having the data compression unit and the data encryption unit adapted to be operated substantially simultaneously and controlled by the network transmission controller. The network transmission controller furthermore controls the transmission FIFO so as to guarantee the continuous supply of bytes from the transmission FIFO to the network transmission controller. This ensures that the transmission is extraordinarily fast. Furthermore, since the communication controller preferably is implemented in accordance with a technique for producing integrated electronic circuits, a fast internal control of the operation may be achieved. By operating data compression and data encryption substantially simultaneously instead of operating consecutively considerably improves the transmission time and reduces the delay for transmitting a secure data communication package.

The communication controller, according to the first aspect of the present invention, having the data read transmission control adapted to monitor the compression and encryption of the part of the input data for determining, whether or not, the part of the input data exceeds the amount of data containable within said second section of data communication package. By continuously monitoring if the data communication packages processed are within the package specifications of the network, any redundant operations are eliminated, and thus the number of data communication package transmitted on the network is reduced.

The communication controller, according to the first aspect of the present invention, wherein the integrity check value calculation unit performs a subtraction, division, multiplication or preferably a summation of the data contained in the second section of the data communication package to be transmitted, and adds a first integrity check value to the second section of the data communication package. Additionally, the communication controller, according to the first aspect of the present invention, wherein the integrity check value verification unit performs a subtraction, division, multiplication or preferably a summation of the data contained in the second section of a received data communication package. Hereby obtaining a second integrity check value and comparing the second integrity check value with the first integrity check value contained in the second section of the data communication package. The integrity check value calculation and verification ensures that no excessive time is spent on corrupted data communication packages at the receiving end of a transmission, therefor, implementation of this calculation and verification may reduce unnecessary data communication package processing.

The communication controller, according to the first aspect of the present invention, wherein the data read transmission control unit comprises control means for controlling the first switch means in the two modes of operations. Furthermore, wherein the data receiving control unit comprises control means for controlling the second switch means in the two modes of operations. These switching means ensures a fast recognition of the clear text and consequently bypassing or disabling of the first and second series configuration, respectively.

The communication controller, according to the first aspect of the present invention, wherein the data read transmission control unit further comprising a connection to the data encryption unit for transferring the transmission encryption key provided by the session key LUT from the data read transmission control unit to the data encryption unit.

The communication controller, according to the first aspect of the present invention, wherein the session key LUT comprising encryption key information is updated according to a key management protocol by the host system. Encryption key administration is entirely managed by the host system thus delegating this cumbersome task to the host rather than a local processing unit on the communication controller. In an alternative embodiment of the present invention, the encryption key or keys may be updated through the data read transmission control of the communication controller. Further alternatively the encryption key or keys may be generated locally by the communication controller rather than by updating from the host system.

According to the basic realisation of the present invention the communication controller, according to the first aspect of the present invention, is implemented fully or partly as an integrated circuit applying VLSI, LSI, ASIC, FPGA, PLD techniques or any combinations thereof. This provides considerable production cost reductions since by implementing the communication controller according to the first aspect of the present invention utilising these production techniques the production time and the product handling are greatly reduced, and furthermore, the amount of costly pin connections and component casings are subsequently minimised.

The communication controller, according to the first aspect of the present invention, wherein the data compression unit adds flag and fragment ID trailing the compressed part of the input data contained the second section of the data communication package, and wherein the data decompression unit extracts flag and fragment ID trailing the compressed part of the input data in the second section of the data communication package. The flag and fragment ID provides information as to how the data communication package is configured. The data compression unit comprising two modes of operation, a high compression mode of operation handling compression of the part of the input data substantially simultaneously to transmission of the data communication package, and a low compression mode of operation applying a reduced compression efficiency to the compression substantially simultaneously to transmission of the data communication package, the high compression mode of operation operating according to an amount of accumulated data in the transmission FIFO and the data compression unit being notified by the network transmission controller in case of the amount of accumulated data in transmission FIFO is less than a predetermined value hence activating the low compression mode of operation. The capability of switching between two modes of compression enables the communication controller to perform at a maximum rate continuously and supplying the network with transmission data bytes until the end of the data communication package is reached. In this context the low compression mode may involve low compression, no compression or even expansion or decompression.

The above object, the above advantage and the above feature together with numerous other objects, advantages and features which will be evident from the below detailed description of a preferred embodiment of the present invention is according to a second aspect of the present invention obtained by a transmission and encryption section of a communication controller for performing data encryption and data decryption of data communication packages to be transferred in a network (such as a LAN: Local Area Network, or a WAN: Wide Area Network), the data communication package containing a first section of non-encrypted data and a second section containing encrypted data, and said communication controller comprising a session key LUT unit, and comprising:

(a) a data read transmission control unit (102) connected to a system bus of a host system and receiving input data therefrom and connected to said session key LUT (186), said session key LUT (186) providing a transmission encryption key for said data communication package, (b) a data compressing unit (118) providing compression of a part of said input data thereby producing a compressed part of said input data contained in said second section of said data communication package, (c) a data encryption unit (126) providing an encryption of said second section of said data communication package according to said transmission encryption key transferred from said session key LUT (186) to said data encryption unit (126), (d) an integrity check value calculation unit (122) constituting a first series configuration from said data compression unit (118) interconnecting through said integrity check value calculation unit (122) to said data encryption unit (126), (e) a network transmission controller (134) providing said data communication package through a connection to said network, supplying said input data to said LAN in a transmission rate determined by said network transmission controller (134) and said network, and (f) a first switch means (108) enabling switching between two modes of operation, a first mode of operation providing bypassing or disabling of said first series configuration and providing a connection from said data read transmission control unit (102) with said network transmission controller (134) for transferring said input data directly hereto and a second mode of operation providing a connection to said data read transmission control unit (102) through said first series configuration to said network transmission controller (134).

The transmission and encryption section of a communication controller, according to the second aspect of the present invention is new, and incorporates several of its functions in a single electronic circuit. Hereby considerably reducing the time delay from on section to the next compared to time delays between discrete electronic components.

The communication controller, according to the second aspect of the present invention, wherein the transmission and encryption section further comprises a transmission FIFO (first in first out storage means) constituting an input section of the network transmission controller. Since the transmission and encryption section of a communication controller, according to the second aspect of the present invention, comprises storage means for transmission of data communication packages, full compatibility is achieved between a host system and the network. Especially differences in reading rates between stations and network transmission rates are compensated for. The host system may operate at one transmission frequency, while the network may operate at another without overloading the host system or the network. This relieves processing time available to the host system, since delivering a data communication package to the controller frees the host system's central processing unit to perform other tasks than waiting for completion of transmission and therefor optimises the transmission performed on the network.

The transmission and encryption section of a communication controller, according to the second aspect of the present invention, for encrypting and transmitting data communication packages on a network provides interrupt routines for units included in the communication controller hereby insuring a continuous data transmission on a network. The transmission and encryption section, having the data compression unit and the data encryption unit adapted to be operated substantially simultaneously and controlled by the network transmission controller. The network transmission controller controls the transmission FIFO so as to guarantee the continuous supply of bytes from the transmission FIFO to the network transmission controller. This ensures that the transmission is extraordinarily fast.

Furthermore, since the communication controller preferably is implemented in accordance with a technique for producing integrated electronic circuits, a fast internal control of the operation may be achieved. By operating data compression and data encryption substantially simultaneously instead of operating consecutively considerably improves the transmission time and reduces the delay for transmitting a secure data communication package.

The transmission and encryption section of a communication controller, according to the second aspect of the present invention, having the data read transmission control adapted to monitor the compression and encryption of the part of the input data for determining, whether or not, the part of the input data exceeds the amount of data containable within the second section of data communication package. By continuously monitoring if the data communication packages processed are within the package specifications of the network, any redundant operations are eliminated, and thus the number of data communication packages transmitted on the network is reduced.

The transmission and encryption section of a communication controller, according to the second aspect of the present invention, wherein the integrity check value calculation unit performs a subtraction, division, multiplication or preferably a summation of the data contained in the second section of the data communication package to be transmitted, and adding a first integrity calculation value to the second section of the data communication package. The integrity check value calculation ensures that no excessive time is spent on corrupted data communication packages at the receiving end of a transmission, therefor, implementation of this calculation may reduce unnecessary data communication package processing.

The transmission and encryption section of a communication controller, according to the second aspect of the present invention, wherein the data read transmission control unit comprises control means for controlling the first switch means in the two modes of operations. These switching means ensures a fast recognition of the clear text and consequently bypassing or disabling of the first series configuration.

The transmission and encryption section of a communication controller, according to the second aspect of the present invention, wherein the data read transmission control unit further comprises a connection to the data encryption unit for transferring the transmission encryption key provided by the session key LUT from the data read transmission control unit to the data encryption unit.

The transmission and encryption section of a communication controller, according to the second aspect of the present invention, wherein the session key LUT comprising encryption key information is updated according to a key management protocol by the host system. Encryption key administration is entirely managed by the host system thus delegating this cumbersome task to the host rather than a local processing unit on the communication controller. In an alternative embodiment of the present invention, the encryption key or keys may be updated through the data read transmission control of the communication controller. Further alternatively the encryption key or keys may be generated locally by the communication controller rather than by updating from the host system.

According to the basic realisation of the present invention the transmission and encryption section of a communication controller, according to the second aspect of the present invention, is implemented fully or partly as an integrated circuit applying VLSI, LSI, ASIC, FPGA, PLD techniques or any combinations thereof. This provides considerable production cost reductions since by implementing the communication controller according to the first aspect of the present invention utilising these production techniques the production time and the product handling are greatly reduced, and furthermore, the amount of costly pin connections and component casings are subsequently minimised.

The transmission and encryption section of a communication controller, according to the second aspect of the present invention, wherein the data compression unit adds flag and fragment ID trailing the compressed part of the input data contained in the second section of the data communication package. The flag and fragment ID provides information as to how the data communication package is configured. The data compression unit comprising two modes of operation, a high compression mode of operation handling compression of the part of the input data substantially simultaneously to transmission of the data communication package, and a low compression mode of operation applying a reduced compression efficiency to the compression substantially simultaneously to transmission of the data communication package the high compression mode of operation operating according to an amount of accumulated data in the transmission FIFO and the data compression unit being notified by the network transmission controller in case of the amount of accumulated data in transmission FIFO is less than a predetermined value hence activating the low compression mode of operation. The capability of switching between two modes of compression enables the communication controller to perform at a maximum rate continuously and supplying the network with transmission data bytes until the end of the data communication package is reached.

The above object, the above advantage and the above feature together with numerous other objects, advantages and features which will be evident from the below detailed description of a preferred embodiment of the present invention is according to a third aspect of the present invention obtained by a method for transmitting and encrypting in a communication controller for performing data encryption and data decryption of data communication packages to be transferred in a network (such as a LAN: Local Area Network, or a WAN: Wide Area Network), said data communication package containing a first section of non-encrypted data and a second section containing encrypted data, and said communication controller comprising a session key storage means, a transmission FIFO (first in first out storage facility) means, a data read transmission control means, a data encryption means, a data compression means and an integrity check value calculation means constituting a first series configuration from said data compression means interconnecting through said integrity check value calculation means to said data encryption means, said method for transmitting and encrypting, comprising:

(a) receiving input data from a system bus of a host system by means of said data read transmission control means connected to said session key storage means, providing a transmission encryption key for said data communication package by means of said session key storage means, (b) providing compression of a part of said input data thereby producing a compressed part of said input data contained in said second section of said data communication package by means of said data compressing means, (c) providing an encryption by means of said data encryption means, according to said transmission encryption key transferred from said session key storage means, of said second section of said data communication package transferred from said data compressing means, (d) supplying said data communication package to said network in a transmission rate determined by said controller means for network transmission and said network by means of a connection to said network from a controller means for network transmission, and (e) switching by means of a first switching means between two modes of operation, a first mode of operation providing bypassing or disabling of said first series configuration and connecting said data read transmission control means with said controller means for network transmission and transferring said input data directly hereto and a second mode of operation providing a connection from said data read transmission control means through said first series configuration to said controller means for network transmission through a connection hereto by means of said means for data encryption.

The method for transmitting and encrypting in a communication controller, according to the third aspect of the present invention, is new and ensures a secure and fast transmission. Furthermore by incorporating the means in a single method the time delays are considerably reduced.

The method for transmitting and encrypting, according to the third aspect of the present invention, further comprising constituting an input section of said controller means for network transmission by means of a transmission FIFO means (first in first out storage means). Since the method for transmission and encryption in a communication controller, according to the third aspect of the present invention, comprises storage means for transmission of data communication packages, full compatibility is achieved between a host system and the network. Especially differences in reading rates between stations and network transmission rates are compensated for. The host system may operate at one transmission frequency, while the network may operate at another without overloading the host system or the network. This relieves processing time available to the host system, since delivering a data communication package to the controller frees the host system's central processing unit to perform other tasks than waiting for completion of transmission and therefor optimises the transmission performed on the network.

The method for transmitting and encrypting in a communication controller, according to the third aspect of the present invention, further comprising provision of interrupt routines for units included in the communication controller hereby insuring a continuous data transmission on the network by means of the controller means for network transmission. The method for transmitting and encrypting further comprising substantially simultaneously operations of the data compression means and the data encryption means, and controlling by the controller means for network transmission. The method for transmitting and encrypting, further comprising controlling the transmission FIFO means by means of the controller means for network transmission so as to guarantee the continuous supply of bytes from the transmission FIFO means to the controller means for network transmission. This ensures that the transmission is performed extraordinarily fast. Furthermore, since the means incorporate several operations in the method a fast internal control of the operations may be achieved. Performing data compression and data encryption substantially simultaneously instead of performing the operations consecutively considerably improves the transmission time and reduces the delay for transmitting a secure data communication package.

The method for transmitting and encrypting in a communication controller, according to the third aspect of the present invention, further comprising monitoring the compression and encryption of the part of the input data by means of the data read transmission control means for determining, whether or not, the part of the input data exceeds the amount of data containable within the second section of data communication package. By continuously monitoring if the data communication packages processed are within the package specifications of the network, any redundant operations are eliminated, and thus the number of data communication packages transmitted on the network is reduced. If a data communication package is within the package size specification of the network the method prevents further data compression relieving the means hereby obtaining valuable processing time.

The method for transmitting and encrypting in a communication controller, according to the third aspect of the present invention further, comprising transferring the transmission encryption key provided by the session key storage means from the data read transmission control means to the data encryption means by means of a connection means.

The method for transmitting and encrypting in a communication controller, according to the third aspect of the present invention, further comprising operating the data compression means in two modes of operation, a high compression mode of operation handling compression of the part of the input data substantially simultaneously to transmission of the data communication package, and a low compression mode of operation applying a reduced compression efficiency to the compression substantially simultaneously to transmission of the data communication package, the high compression mode of operation operating according to an amount of accumulated data in the transmission FIFO means and the data compression means being notified by the controller means for network transmission in case of the amount of accumulated data in the transmission FIFO means is less than a predetermined value hence activating the low compression mode of operation. The capability of switching between two modes of compression enables the continuous performance of a maximum rate and supply of transmission data bytes to the network until the end of the data communication package is reached.

The method for transmitting and encryption in a communication controller, according to the third aspect of the present invention, the communication controller further comprising receiving means, a data writing means, a data decompressing means, a data decryption means, a data receiving control means and an integrity check value verification means constituting a second series configuration from said data decryption means interconnecting through said integrity check value verification means to said data decompression means, comprising:

(f) providing a connection to said network and receiving a received data communication package from said network by means of controller means for network reception, (g) receiving said received data communication package through a connection to said controller means for network reception and connecting to said session key storage means by means of a data receiving control means, providing a reception encryption key for said data communication package by means of said session key storage means, (h) providing a decryption of said second section of said received data communication package according to said reception encryption key transferred from said session key storage means and providing a decrypted second section of said received data communication package by means of a data decryption means, (i) providing decompression of a compressed part of said decrypted second section of said received data communication package and providing a decompressed part in said second section of said received data communication package instead of said compressed part in said second section of said data communication package by means of a data decompression means, (j) supplying said system bus of said host system with received data communication package by means of said data writing means, and (k) switching by means of a second switching means enabling switching between two modes of operation, a third mode of operation providing bypassing or disabling of said second series configuration and connecting said data receiving control means with said data writing means and transferring said received input data directly hereto, and a fourth mode of operation providing a connection from said data receiving control means through said second series configuration to said data writing means.

By introducing receiving means to the method for transmitting and encrypting several advantages are achieved. By performing transmission and reception by applying a single method simplifies processes and enables common actions of both transmission and reception to be shared.

The method for transmitting and encrypting, according to the third aspect of the present invention, further comprising receiving said received data communication package from said data receiving control means in said third mode of operation, receiving said received data communication package from said data decompression means in said fourth mode of operation and transferring said received data communication package through a connection to said data writing means by means of a write FIFO means, and receiving said received data communication package from said control means for network reception and transferring said data communication package through a connection to said data receiving control means by means of a receiving FIFO means.

The method for transmitting and encrypting in a communication controller, according to the third aspect of the present invention, further comprising updating encryption key information in the session key storage means according to a key management protocol by the host system. Encryption key administration is entirely managed by the host system thus delegating this cumbersome task to the host rather than a local processing means on the communication controller. In an alternative embodiment of the present invention, the encryption key or keys may be updated through the data read transmission control means.

The method transmitting and encrypting in a communication controller, according to the third aspect of the present invention, further comprising performing a subtraction, division, multiplication or preferably a summation of the data contained in the second section of the data communication package to be transmitted, and adding a first integrity check value to the second section of the data communication package by means of the integrity check value calculation means. Additionally, the method for transmitting and encrypting in a communication controller, according to the third aspect of the present invention, further comprising performing a subtraction, division, multiplication or preferably a summation of the data contained in the second section of a received data communication package. Hereby obtaining a second integrity check value and comparing the second integrity check value with the first integrity check value contained in the received data communication package by means of the integrity check value verification means. The integrity check value calculation and verification ensures that no excessive time is spent on corrupted data communication packages at the receiving end of a transmission, therefor, implementation of this calculation and verification may reduce unnecessary data communication package processing.

The method for transmitting and encrypting in a communication controller, according to the third aspect of the present invention, further comprising controlling the first switching means in the two modes of operations by means of the data read transmission control means. The method transmitting and encrypting in a communication controller, according to the third aspect of the present invention, further comprising controlling the second switching means in the two modes of operations by means of the data receiving control means. These switching means ensures a fast recognition of the clear text and consequently bypassing or disabling of the first and second series configuration, respectively.

The method for transmitting and encrypting in a communication controller, according to the third aspect of the present invention, further comprising providing interrupt routines for units included in the communication controller hereby insuring a continuous data transmission on the network by means of the receiving means for receiving the data communication packages on the network.

The method for transmitting and encrypting in a communication controller, according to the third aspect of the present invention, further comprising adding flag and fragment ID trailing the compressed part of the input data contained in the second section of the data communication package by means of the data compression means, and further comprising extracting flag and fragment ID trailing the compressed part of the input data in the decrypted second section of the data communication package by means of the data decompression means.

The above object the above advantage and the above feature together with numerous other objects, advantages and features which will be evident from the below detailed description of a preferred embodiment of the present invention is according to a fourth aspect of the present invention obtained by a network controller of a communication controller comprising means for producing a data communication package comprising a non encrypted first section including clear header, and a encrypted second section including a protected header, a data section, a fragment ID, flags, padding and a ICV.

By placing flags and the fragment ID contrary to normal practice trailing the data section an improved configuration is obtained, since the transmission may be initiated without delay. Thus a significant reduction in transmission time is achieved.

The network controller of a communication controller, according to the fourth aspect of the present invention, further comprising means for producing the data communication package wherein the data section comprises compressed data, end of data, padding and uncompressed data. In case transmission data in non-compressed form are larger than a maximum payload of the data section then the transmission data are compressed until the transmission data are smaller than the maximum payload of the data section. If the transmission data in compressed are larger than the maximum payload of the data section then the transmission data are transmitted uncompressed. Therefor the data section is configured as comprising compressed data as well as an uncompressed data. The compressed data part may contain 0 bytes of data. By continuously monitoring of the compression of the transmission data delays in the transmission are eliminated.

The network controller of a communication controller, according to the fourth aspect of the present invention, may further advantageously comprise any of the features of the communication controller according to the first and second aspects of the present invention and may further advantageously be adapted to perform the method according to the third aspect of the present invention.

The above object, the above advantage and the above feature together with numerous other objects, advantages and features which will be evident from the below detailed description of a preferred embodiment of the present invention is according to a fifth aspect of the present invention obtained by a data communication package comprising a data section including compressed data and uncompressed data.

The above object, the above advantage and the above feature together with numerous other objects, advantages and features which will be evident from the below detailed description of a preferred embodiment of the present invention is according to a sixth aspect of the present invention obtained by a communication controller chip for performing data encryption and data decryption of a multiplicity of data communication packages to be transferred in a network such as LAN (local area network) or WAN (wide area network) and including a plurality of processing units, each of said multiplicity of data communication packages containing a first section of non-encrypted data and a second section containing encrypted data and each said of multiplicity of data communication packages having an associated processing descriptor defining source, destination, process configuration of said plurality of processing units and processing of said data communication package, and said communication controller chip comprising:

(a) a bridge unit connecting said communication controller through a bus to a central processing unit (CPU) or a host, (b) a random access memory RAM for keys, processing descriptors and for temporary storage of data.

(c) a data transmission control unit for providing access for said CPU to information regarding general configuration of said communication controller, (d) an in-queue unit comprising a plurality of queues for pointers referencing processing descriptors for data communication packages in said RAM to be processed by said plurality of processing units, (e) an out-queue unit comprising a go-queue of pointers referencing processing descriptors for data communication packages in RAM to be processed by a plurality of processing units, which process is monitored and analysed by said CPU or host system so as to establish if further processing is required, and said out-queue unit comprising a complete-queue of pointers referencing processing descriptors for data communication packages in said RAM having completed processing in accordance with requirements of said CPU or host system, (f) a decompression processing unit included in said plurality of processing units providing decompression of compressed data of said second section of said data communication packages thereby producing decompressed data in said RAM or memory of said host in accordance with processing descriptors associated with said data communication packages, (g) a compression processing unit providing compression of said second section of said outgoing data communication packages thereby producing compressed data in said RAM or memory of said host in accordance with processing descriptors associated with said data communication packages, (h) a decryption processing unit providing a decryption of said second section of a data communication package according to a reception decryption key provided in a decryption key space of said RAM, said decryption key space being referenced by a key pointer included in said processing descriptors, and said decryption processing unit providing generation of said second section of said data communication package, (i) an encryption processing unit providing an encryption of said second section of a data communication package according to a transmission encryption key provided in an encryption key space of said RAM, said encryption key space being referenced by said key pointer of said processing descriptors, and said encryption processing unit providing generation said second section of said outgoing data communication package, (j) a bus designated as first in first out (FIFO) bus enabling communication between said bridge unit, said RAM, said data transmission control unit, said in-queue unit, said out-queue unit, said compressing processing unit, said decompression processing unit, said encryption processing unit and said decryption processing unit, and (k) a management bus providing signaling and configuration between said data transmission control unit, said in-queue unit, said out-queue unit, said compressing processing unit, said decompression processing unit, said encryption processing unit and said decryption processing unit, said communication controller allowing for parallel processing of said multiplicity of said data communication packages to be performed in any arbitrary order in accordance said processing descriptors in RAM.

The communication controller chip according to the sixth aspect of the present invention provides a superior implementation of the invention according to first, second, third and fifth aspect of the invention, since the communication controller chip allows for any combination of units and any combination of order in which the units operated thereby providing an extremely fast system.

The communication controller chip according to the sixth aspect of the present invention further comprises:

(l) a first authentication processing unit providing calculation of an integrity check value (ICV) to be included in an outgoing data communication package, said calculation utilising an ICV key provided in a ICV key space of said RAM, said ICV key space being referenced by said processing descriptors, (m) a second authentication processing unit providing verification of an ICV to be extracted from an incoming data communication package, said calculation utilising a ICV key provided in said ICV key space of said RAM, said ICV key space being referenced by said processing descriptors, (n) a receiving media access control unit (RX-MAC) constituting an address filter for said communication controller and providing a receiving gate for said network, said receiving media access control unit filtering all data communication packages on said network and communicating incoming data communication packages to a incoming data communication package space in said RAM, said receiving media access control unit simultaneously generating a processing descriptor for every incoming data communication packages, said processing descriptor including a start address of associated incoming data communication package in a incoming data communication package space in said RAM, said receiving media access control unit communicating said processing descriptor to said in-queue unit, and said receiving media access control unit communicating an end address of said incoming data communication package space in said processing descriptor at completion of reception of said incoming data communication package, and (o) a transmitting media access control unit (TX-MAC) providing a transmitting gate for said communication controller on said network and performing a transmission on said network of outgoing data communication packages identified by said processing descriptors in said RAM, said transmitting media access control unit performing evaluation of length of said outgoing data communication package and writing said length in said first section of said outgoing data communication package, and said transmitting media access control unit communicating said processing descriptors to said complete queue of said out-queue on completion of transmission of said data communication package.

The RAM of the communication controller chip according to the sixth aspect of the present invention is constituted by SRAM, DRAM, or SDRAM or any combinations thereof.

The compressing processing unit of the communication controller chip according to the sixth aspect of the present invention may be configured to detect compression efficiency and in accordance to the compression efficiency continue compression of data or disengage further compression.

The communication controller chip according to the sixth aspect of the present invention ensures that the management bus further providing signaling and configuration for the first authentication processing unit, the second authentication processing unit, the receiving media access control unit, and the transmitting media access control unit, and the first in first out (FIFO) bus further enabling communication between the bridge unit, the RAM, the data transmission control unit, the in-queue unit, the out-queue unit, the compressing processing unit, the decompression processing unit, the encryption processing unit, the decryption processing unit, the first authentication processing unit, the second authentication processing unit, the receiving media access control unit, and the transmitting media access control unit.

The communication controller chip according to the sixth aspect of the present invention includes the compressing processing unit having a maximum allowable space on the RAM for compressed data included in the second section of the outgoing data communication package and includes the decompressing processing unit having a maximum allowable space on the RAM for decompressed data included in the second section of the incoming data communication packages to be communicated to the CPU or the host.

As mentioned above the communication controller chip according to sixth aspect of the present invention is implemented having features of the communication controller according to features of the first aspect of the present invention, having features of the transmission and encryption section of a communication controller according to second aspect of the present invention, being adapted to perform the method according third aspect of the present invention, having features of a network controller of a communication controller according to fourth aspect of the present invention, and having features allowing transmission of the data communication packages according fifth aspect of the present invention.

Figure 2:
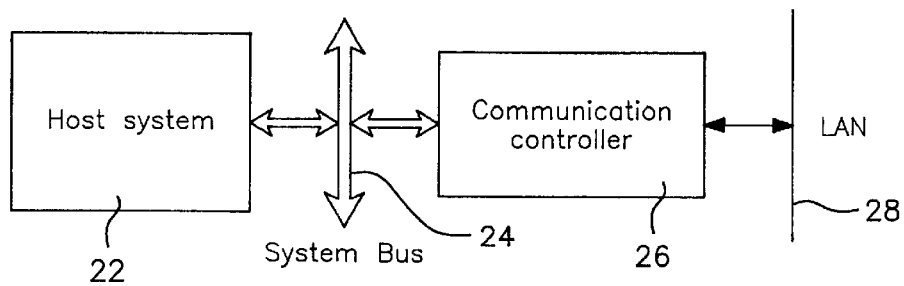
Figure 4:
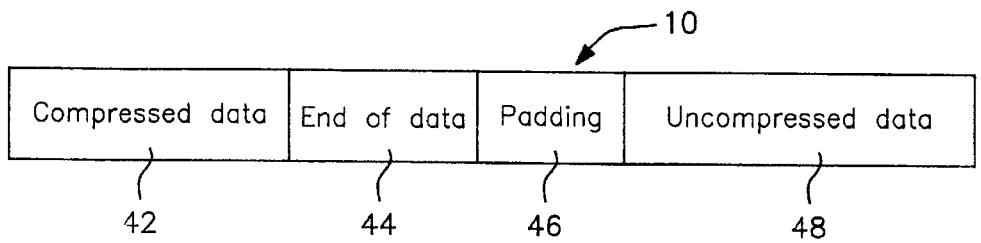
Figure 5:
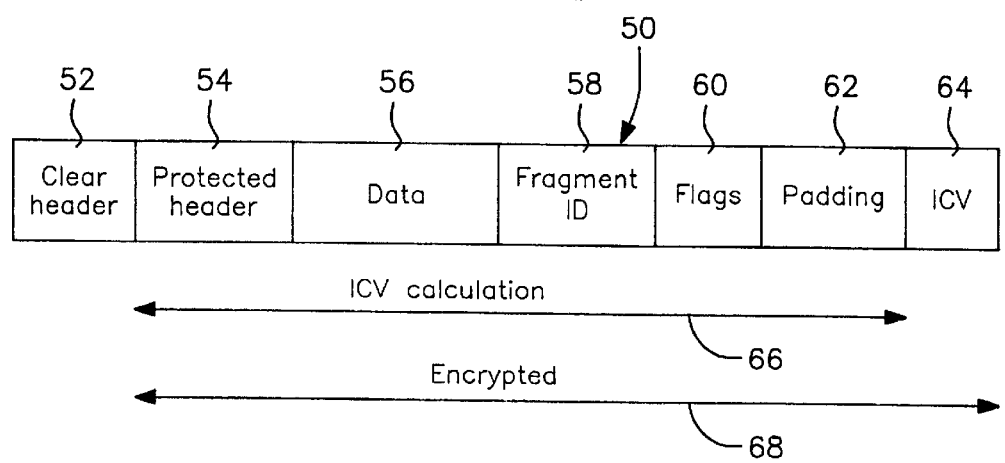

In the following the invention will be further explained with reference to the drawing and tables, wherein:

FIG. 1 is a schematic presentation of an encrypted LAN communication package,

FIG. 2 is a schematic overview of a typical communication system having incorporated a communication controller according to present invention, FIG. 3 is a schematic diagram of a presently preferred embodiment according to the invention for data-encryption/data-decryption, FIG. 4 is a schematic presentations of data formats for a compressed payload, FIG. 5 is a schematic presentation of an example on an advantageously and presently preferred embodiment of a LAN communication package format according to the invention.

Figure 6:
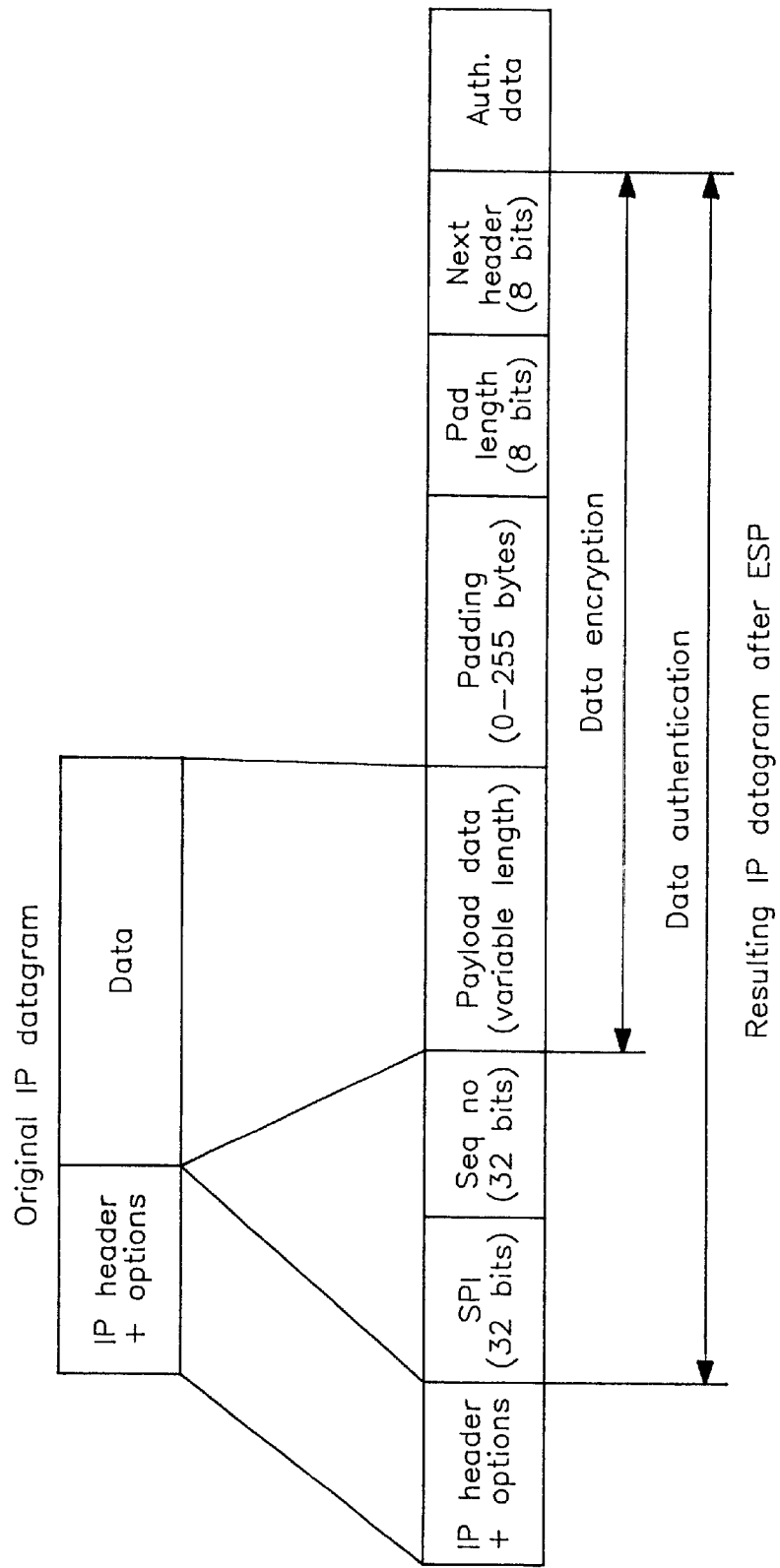
Figure 7:
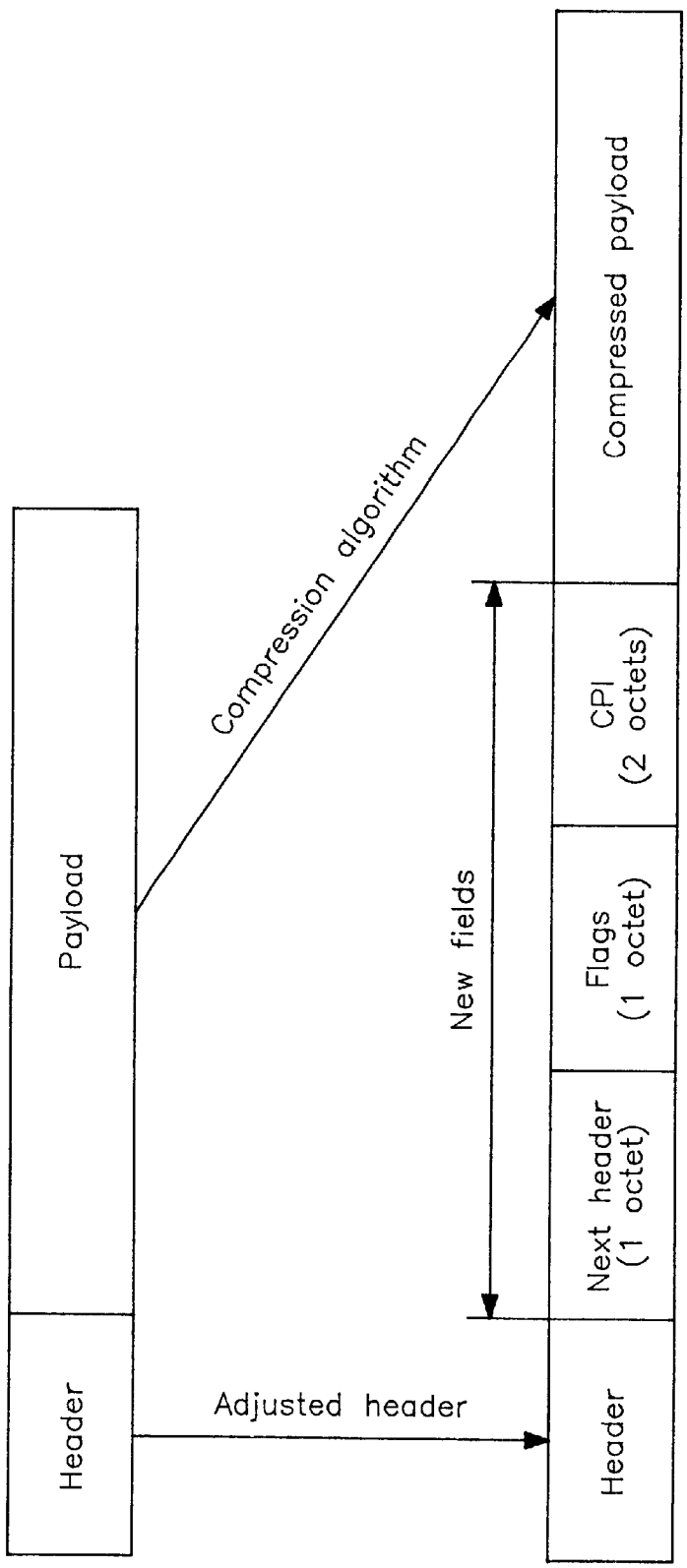
Figure 8:
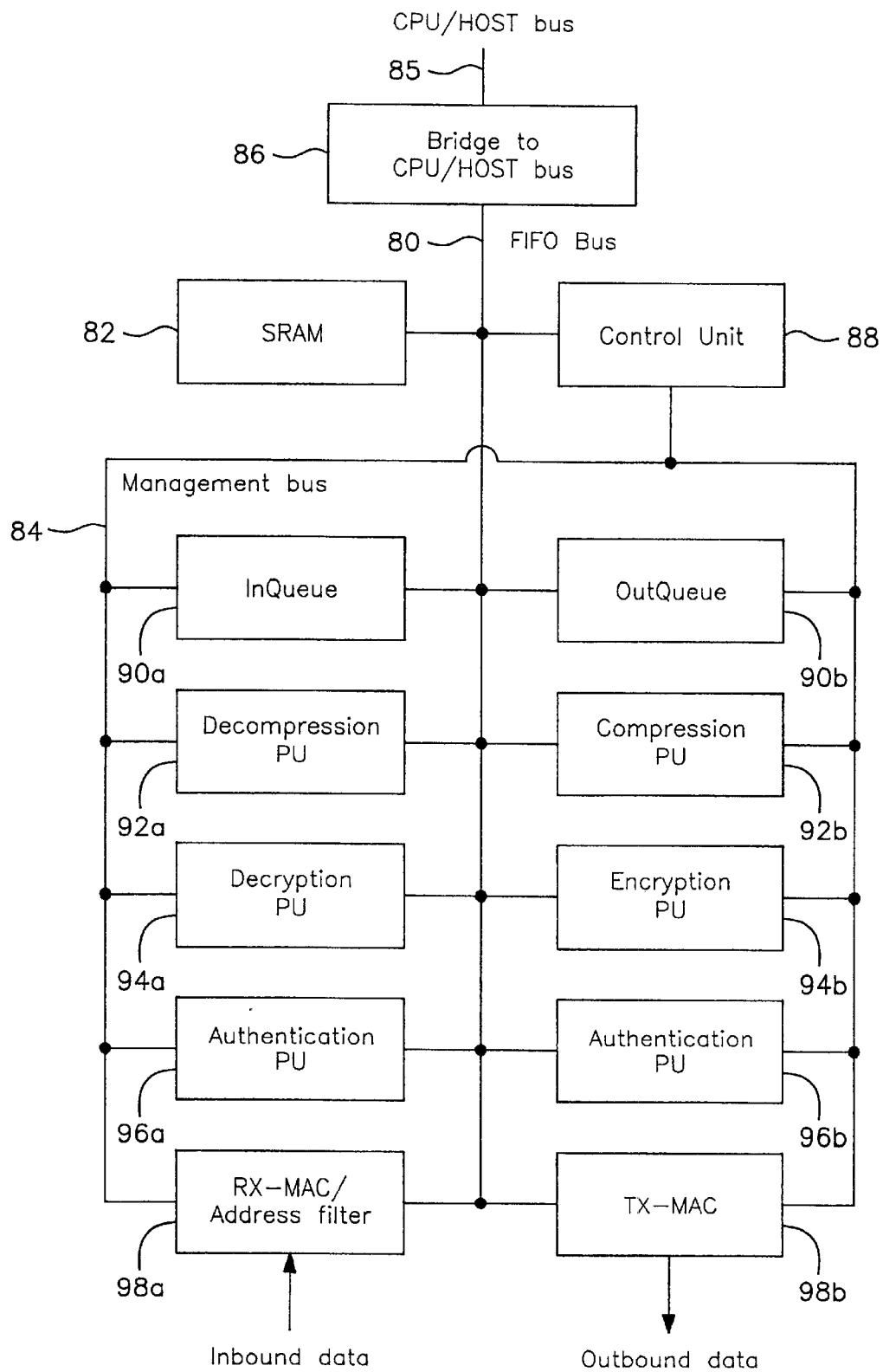
Figure 9:
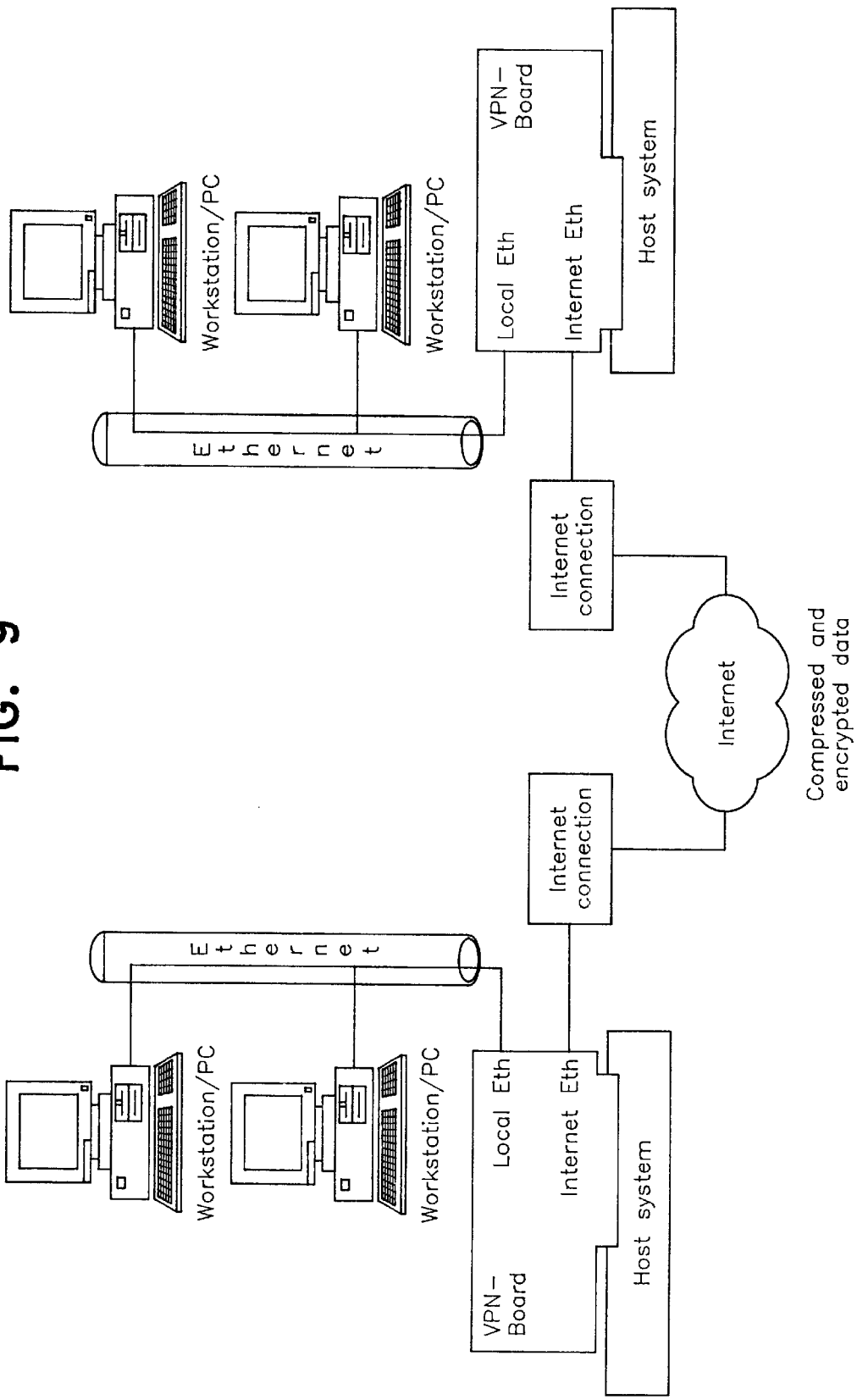
Figure 10:
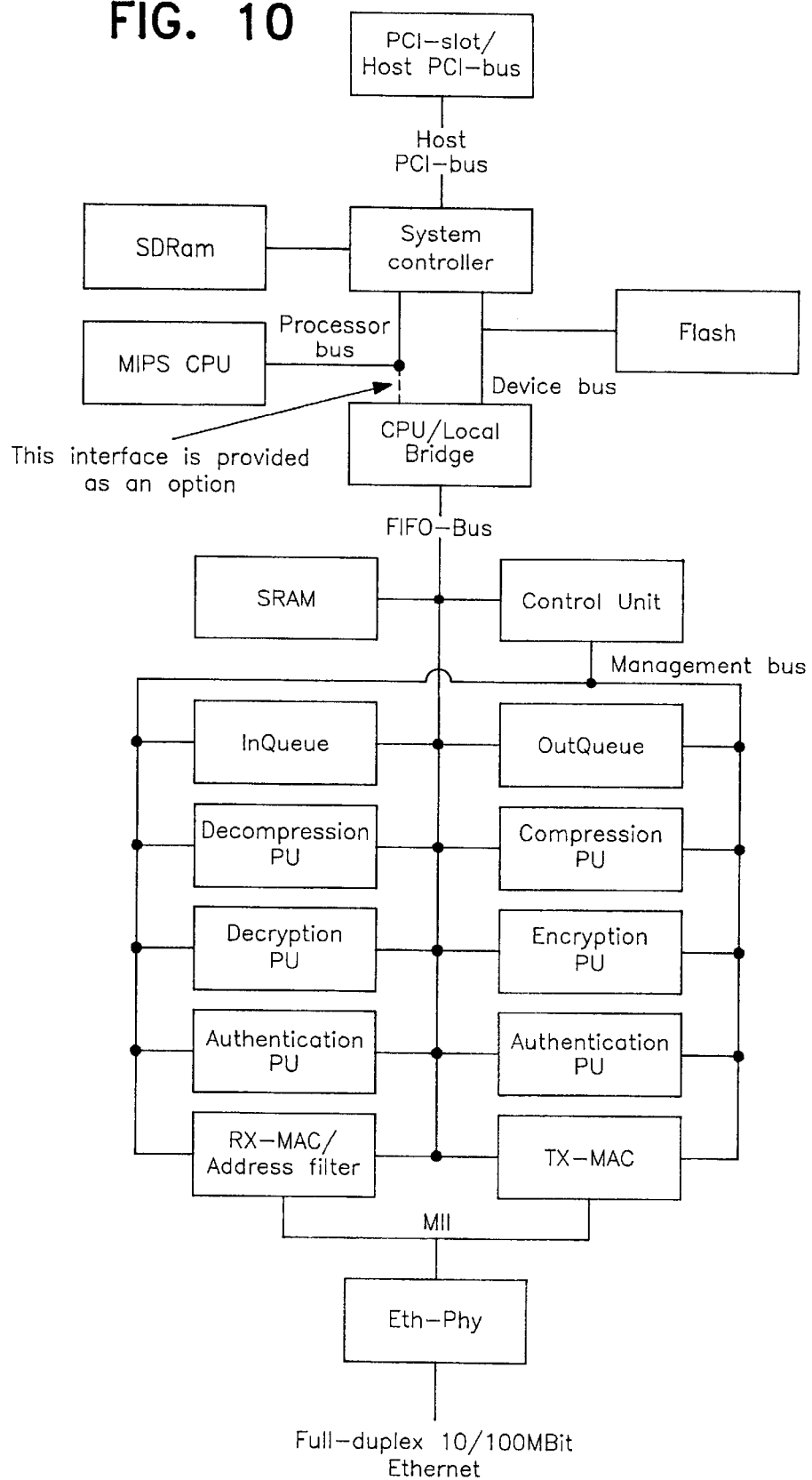
Figure 11A:
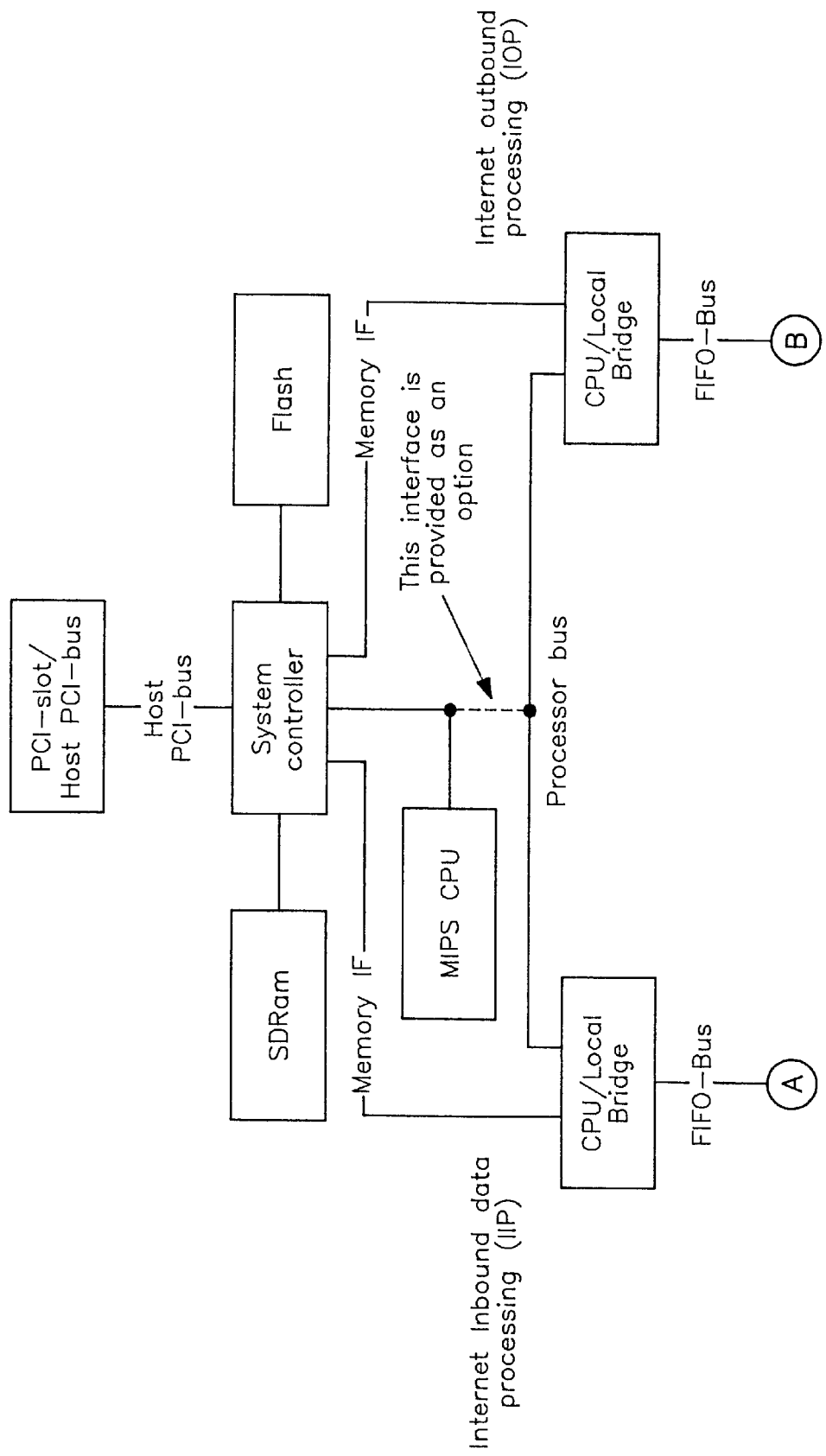
Figure 11B:
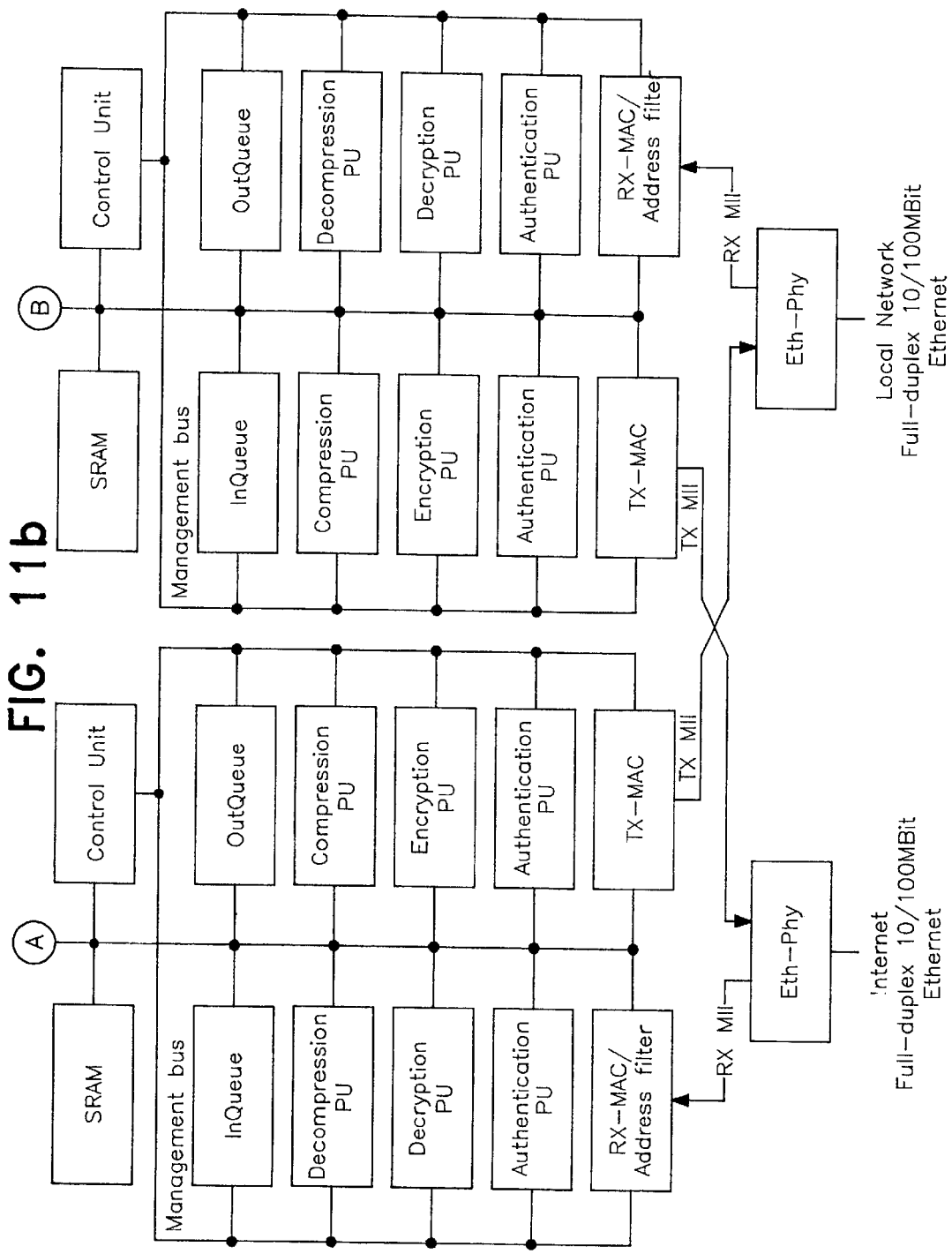
Figure 12:
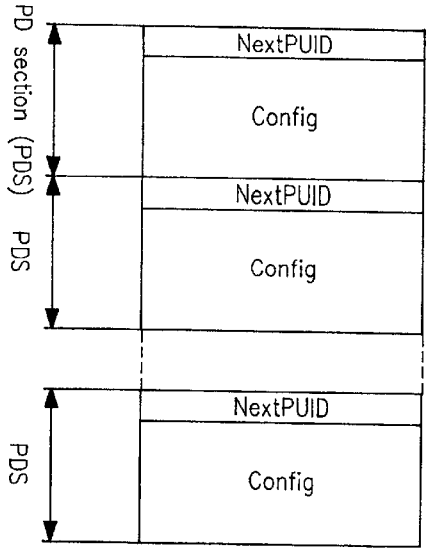
Figure 13:
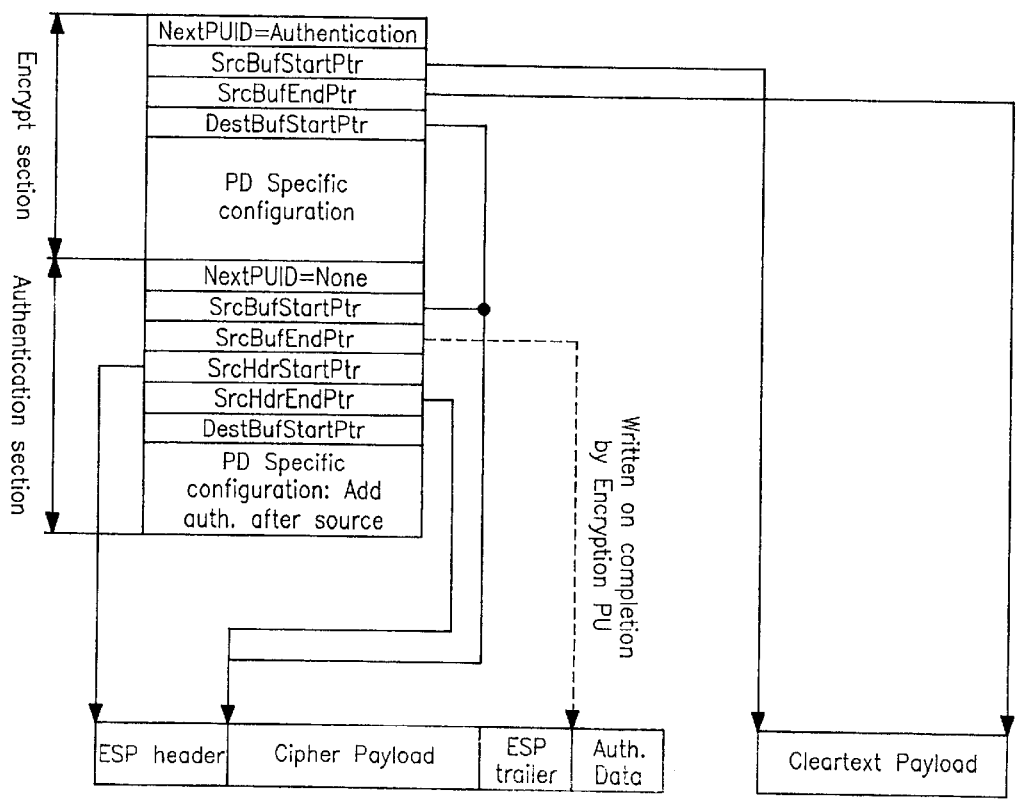

FIG. 6 is a schematic diagram of an ESP (Encapsulating Security Payload) processing of an IP data telegram, FIG. 7 is a schematic presentation of a compression in accordance to IP com, FIG. 8 is a log diagram of the processing units and connecting ram, FIG. 9 is a schematic presentation of a virtual private network interfacing to the internet and to the internet, FIG. 10 is a block diagram of a network interface controller card consisting of a single Ethernet interface and a single set of processing units such as compressing or encryption units, FIG. 11 is a block diagram of a virtual private network showing logical connections and structures, FIG. 12 is a schematic presentation of a structure of a processing descriptor, FIG. 13 is a schematic presentation of an example of a buffer indication in the processing descriptor and shows a processing descriptor configuration for encryption followed by authentication.

Figure 14:
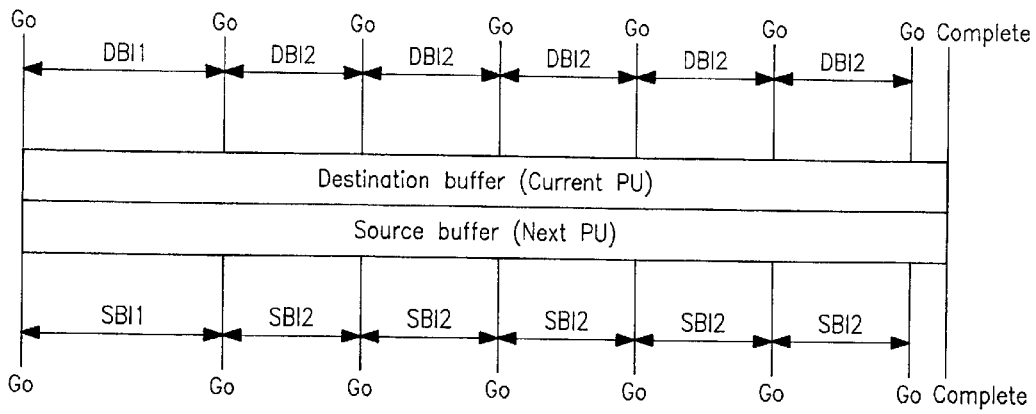
Figure 15:
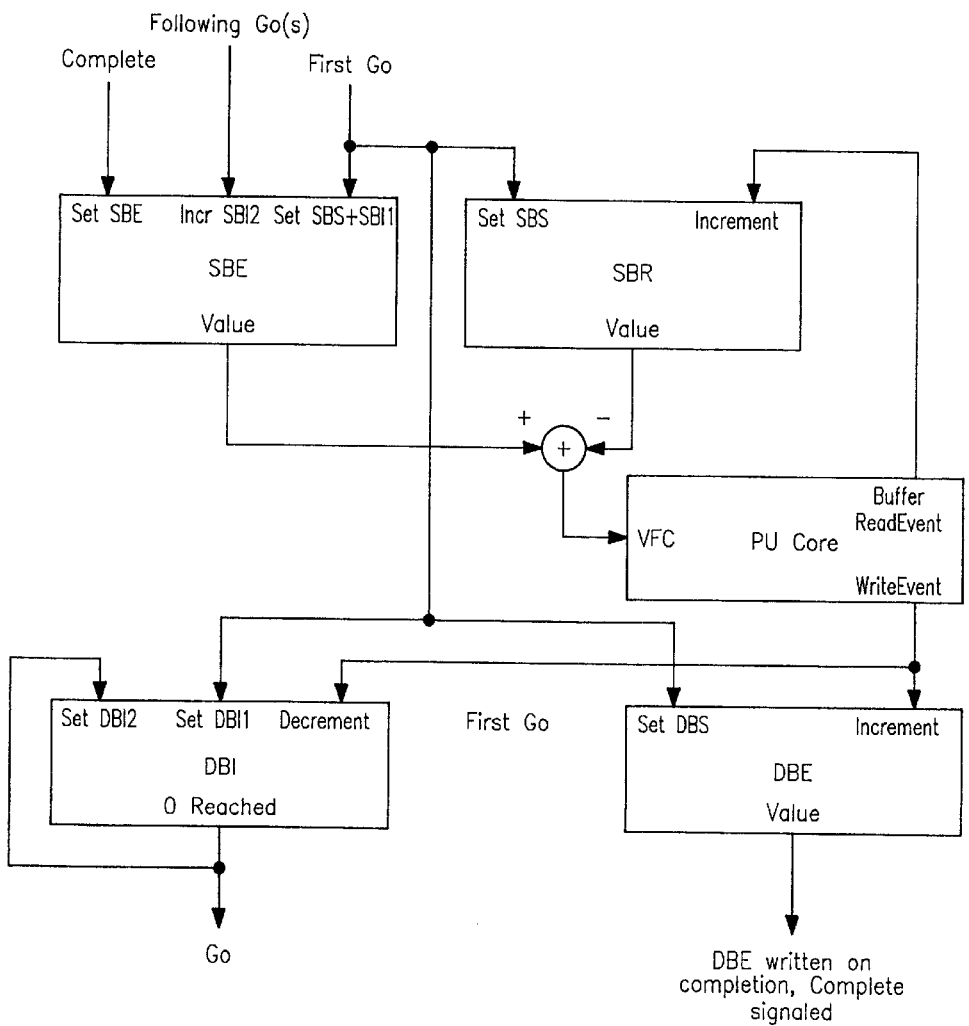
Figure 16:
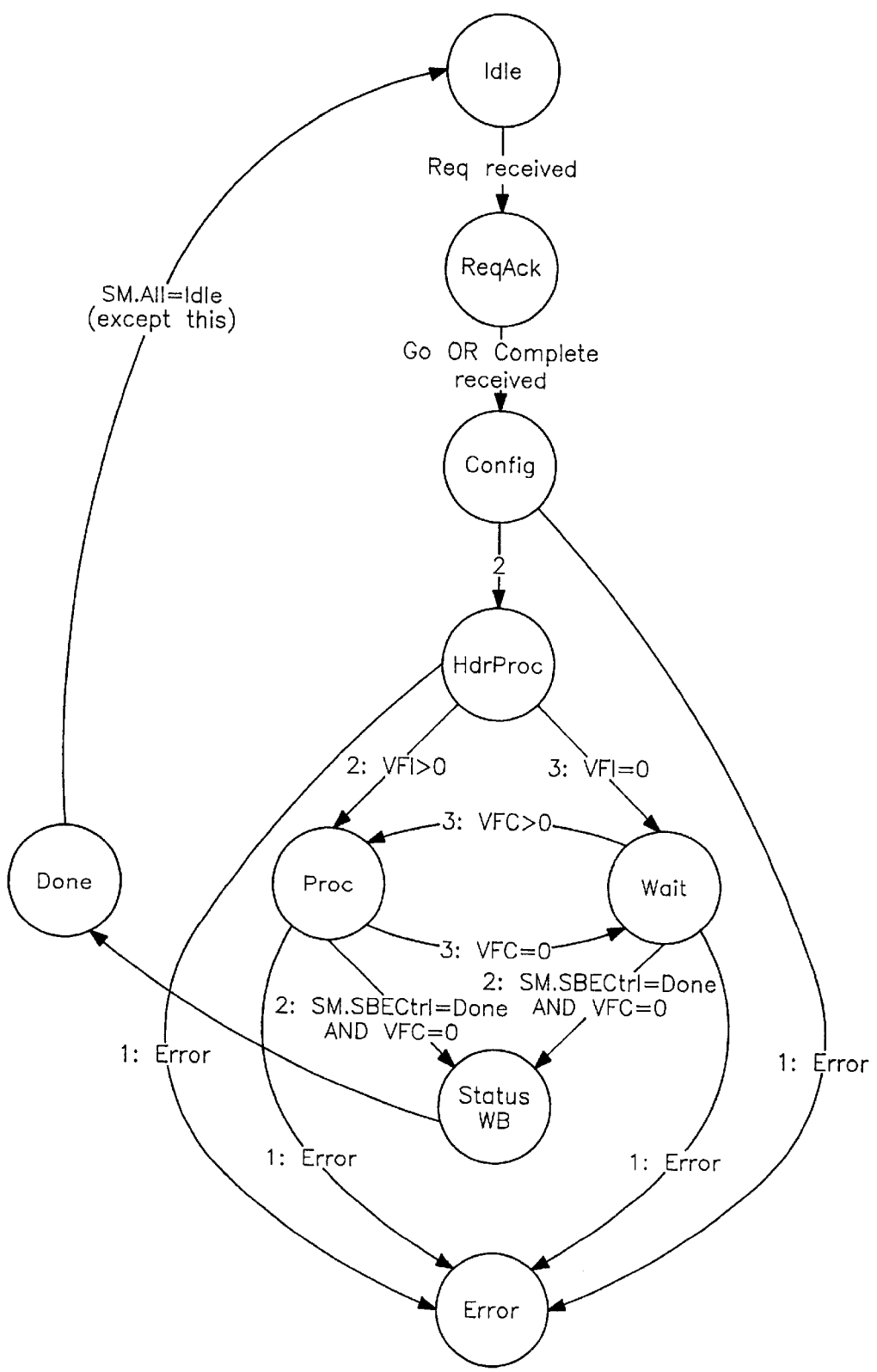
Figure 17:
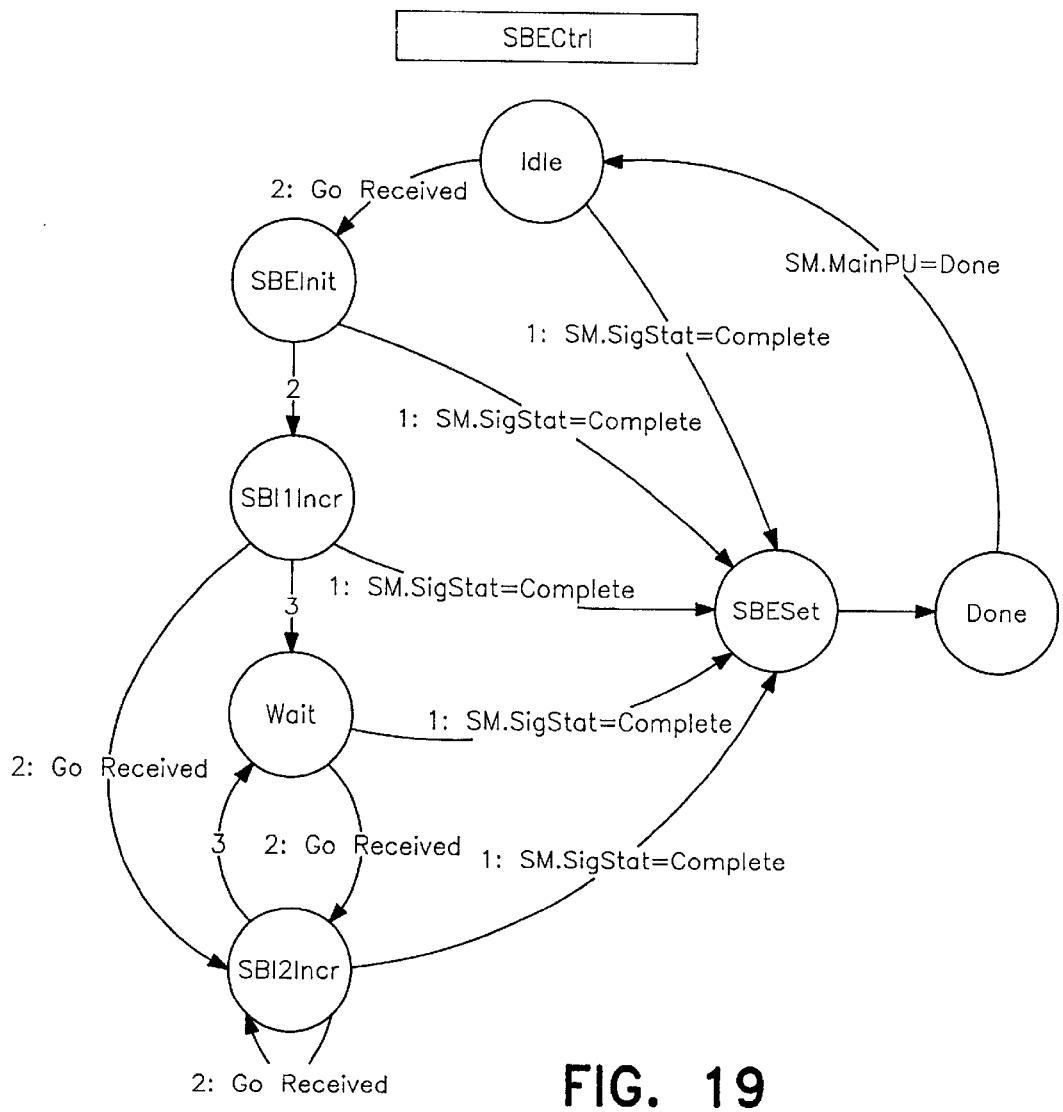
Figure 19:
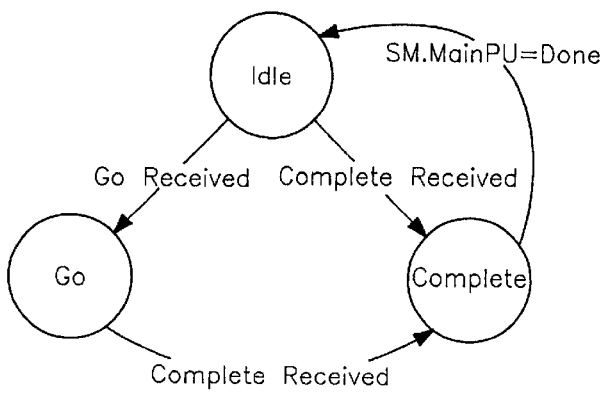
Figure 18:
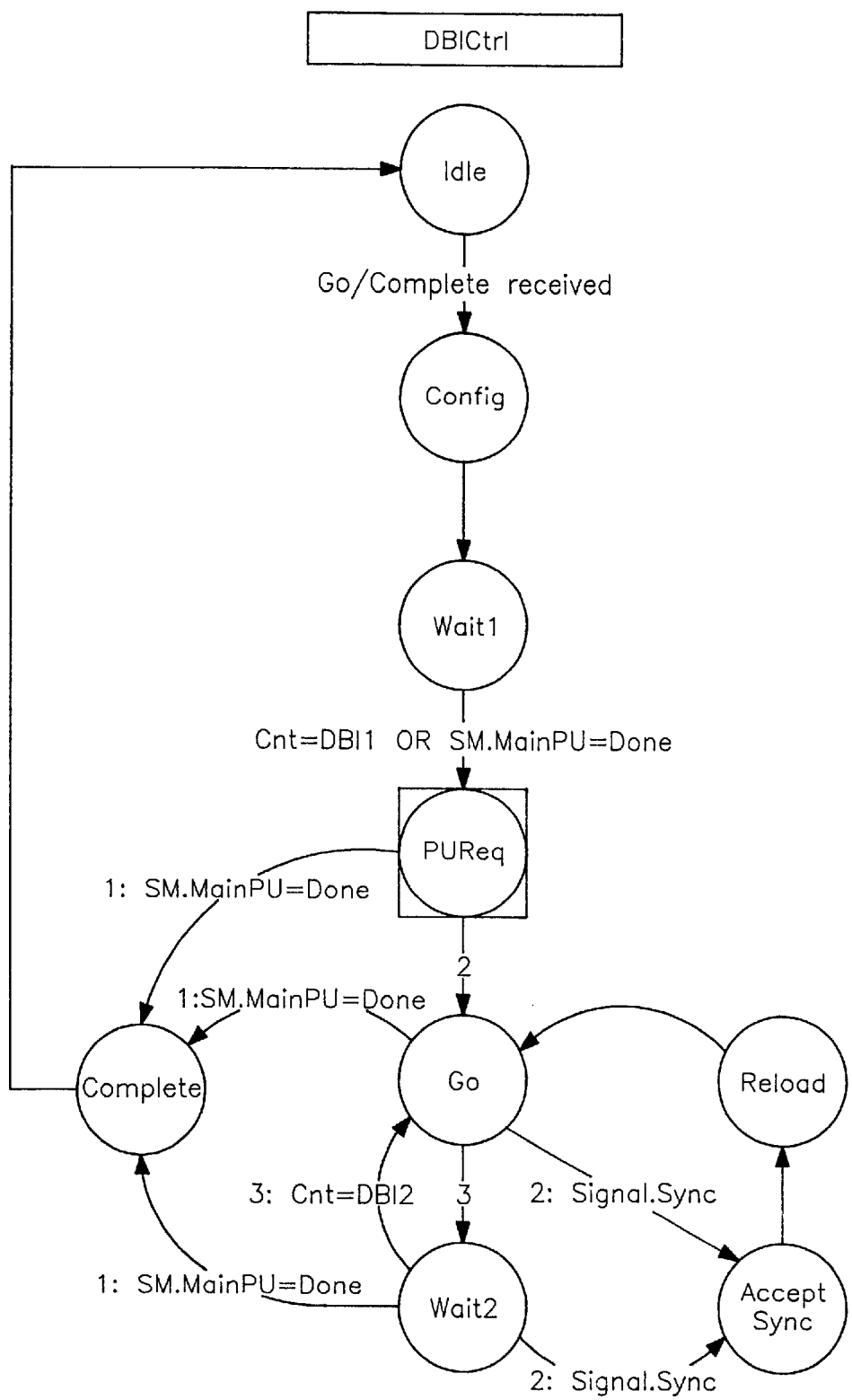
Figure 20:
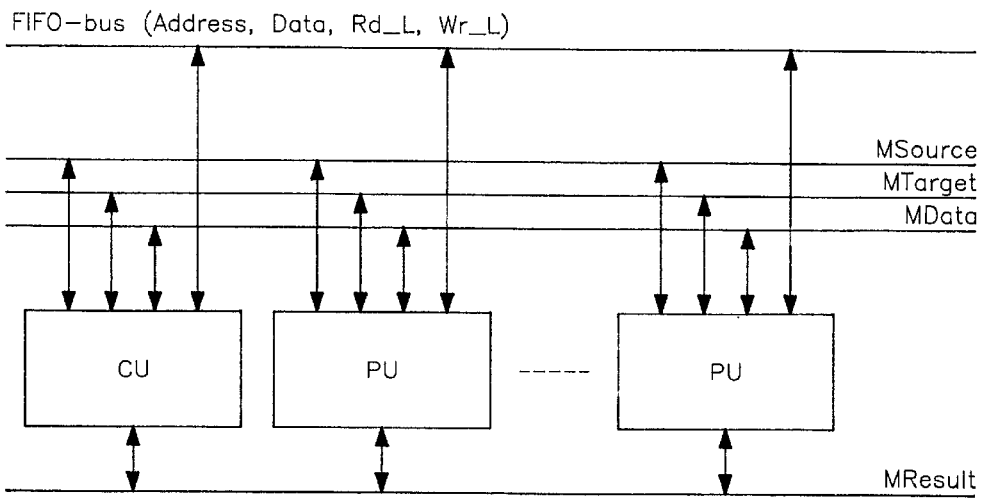
Figure 21:
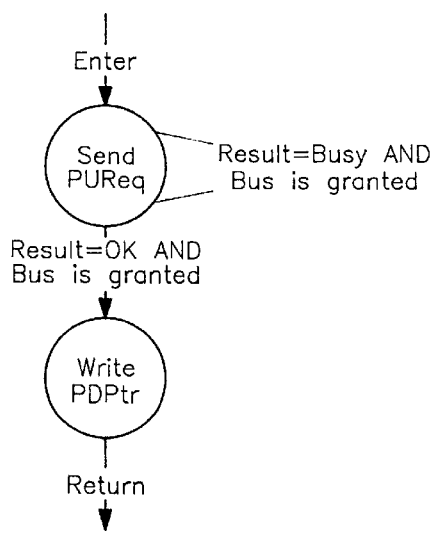
Figure 22:
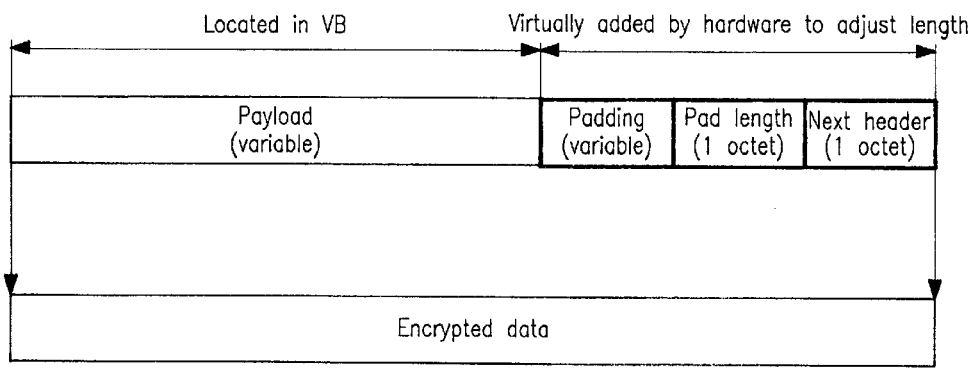
Figure 23:
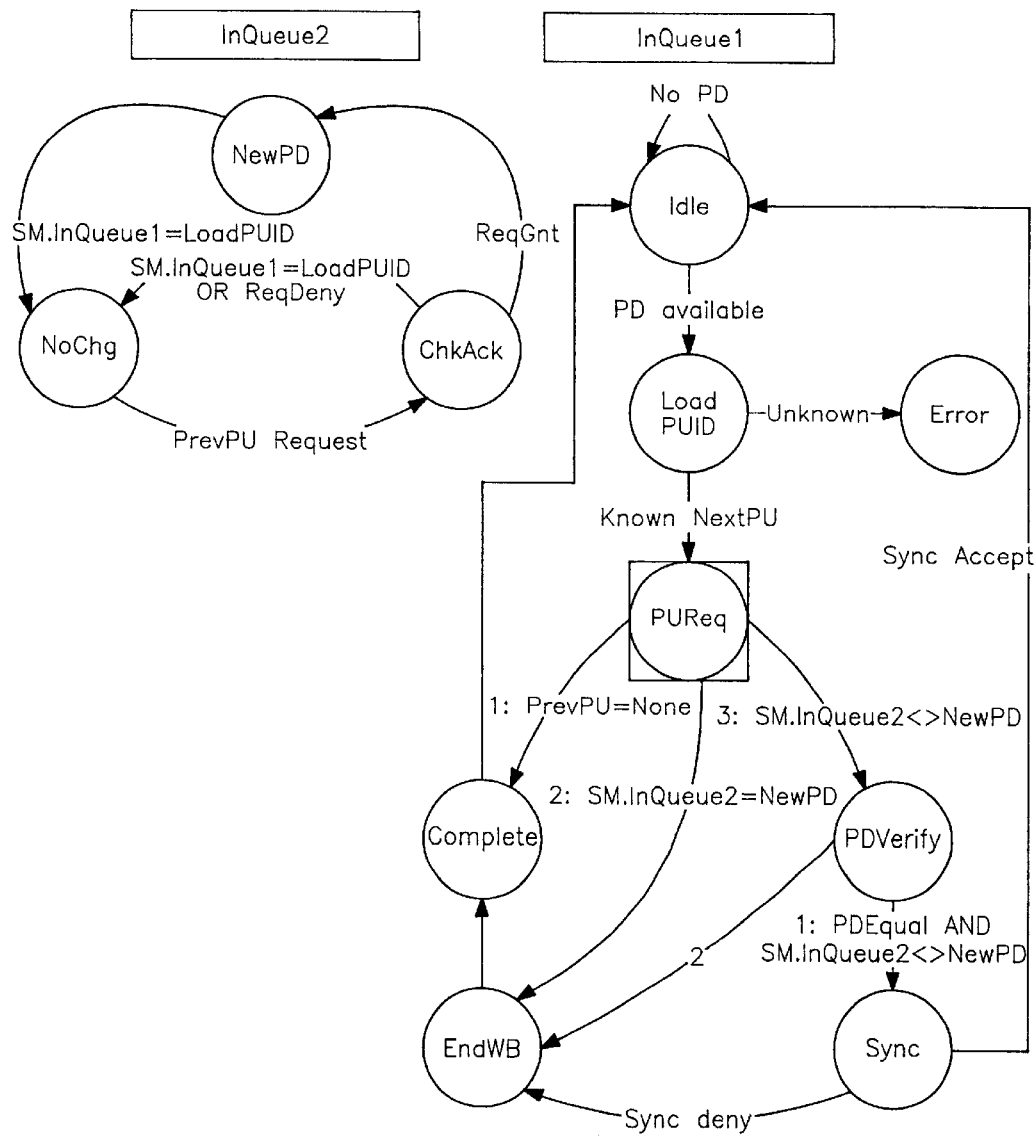
Figure 24:
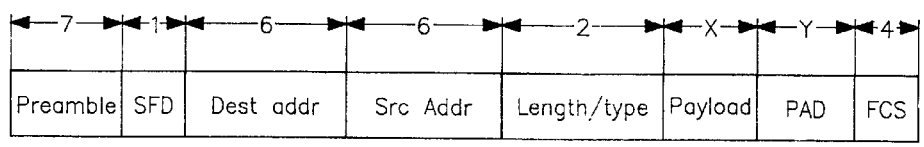

FIG. 14 is a schematic presentation of a principle of signalling between processing units, FIG. 15 is a schematic presentation of a model for the synchronisation performed between the processing unit, FIG. 16 is a schematic presentation of the main state machine of the processing unit, which controls the processing and the overall operation, FIG. 17 is a schematic presentation of a calculation of a virtual FIFO count calculated as the difference between a source buffer end and source buffer start, FIG. 18 is a schematic presentation of destination buffer control and signalling (destination buffer increment control signalling), FIG. 19 is a schematic presentation of signalling status (SIGStatus), FIG. 20 is a schematic presentation of a management bus and the attached processing units and controller units, FIG. 21 is a schematic presentation of a state machine, which requests a processing unit, FIG. 22 is a schematic presentation of an encapsulated security payload specification including padding at the end of the payload, FIG. 23 is a schematic presentation of the activation of a processing descriptor which activation is controlled by the state machines, and FIG. 24 is a schematic presentation of an Ethernet frame format, FIG. 25 summarises encryption algorithms currently suggested by the encryption security payload and the requirements for confidentiality, FIG. 26 lists the algorithms which are required by the authentication of authentication header and encryption security payload, FIG. 27 lists State and Activity of a processing unit main state machine, FIG. 28 lists State and Activity of source buffer end and virtual FIFO count control, FIG. 29 lists State and Activity of destination buffer control and signalling, FIG. 30 lists State and Activity of signalling status, FIG. 31 lists the implementation of the interrupt lines of the central processing unit (CPU), FIG. 32 lists allocation of chip select in memory areas which allocation is controlled by the system controller which provides large flexibility regarding location in the processor memory space, FIG. 33 lists the address fields of the register space layout, FIG. 34 lists common processing units registers, FIG. 35 lists source buffer increment layouts, FIG. 36 lists identifiers for all the processing units, FIG. 37 lists definitions of the currently identified signals to be transferred on a management bus, FIG. 38 lists the result/status of each command's last signal indicated by the target, FIG. 39 lists State and Activity of the processing unit's request/arbitration, FIG. 40 lists definitions of type, FIG. 41 outlines the differences in handling of the header and source buffer, FIG. 42 outlines the requirement regarding the alignment, FIG. 43 lists common fields, which are common to most of the processing descriptor sections, FIG. 44 lists the configuration of the base, FIG. 45 lists Offset, Size, Type and Name of fixed fields, FIG. 46 lists Offset, Size, Type, Name, Description of encryption processing descriptor section, FIG. 47 lists the configuration base of encryption processing descriptor section, FIG. 48 lists Offset, Size, Type, Name and Description of decryption processing descriptor section, FIG. 49 lists configuration base of decryption processing descriptor section, FIG. 50 lists value of the next header field in the encryption security payload trailer of description processing descriptive section, FIG. 51 lists Offset, Size, Type, Name and Description of keys/initialisation vector section, FIG. 52 lists Offset, Size, Type, Name and Description of calculation processing descriptive section, FIG. 53 lists configuration base of calculation processing descriptive section, FIG. 54 lists Offset, Size, Type, Name and Description of verification processing descriptive section, FIG. 55 lists configuration base of verification base of verification processing descriptive section, FIG. 56 lists Offset, Size, Type, Name and Description of authentication algorithm configuration, FIG. 57 lists algorithms of the authentication algorithm configuration, FIG. 58 lists Offset, Size, Type, Name and Description of compression processing descriptive section, FIG. 59 lists configuration base of compressing processing descriptive section, FIG. 60 lists Offset, Size, Type, Name and Description of decompression processing descriptive section, FIG. 61 lists configuration of decompression processing descriptive section, FIG. 62 lists Offset, Size, Type, Name and Description of register interface, FIG. 63 lists Offset, Size, Type, Name and Description of InQueue processing descriptive section, FIG. 64 lists configuration of InQueue processing descriptive section, FIG. 65 lists State and Activity for a InQueue state machine used for monitoring the state of previous processing units, FIG. 66 lists Offset, Size, Type, Name and Description of register's interface, FIG. 67 lists OutQueue pointer format of register's interface, FIG. 68 lists configuration of register's interface, FIG. 69 lists Offset, Size, Type, Name and Description of OutQueue processing descriptive section, FIG. 70 lists Offset, Size, Type, Name and Description of Ethernet transmission and IP compensation of processing descriptive section, FIG. 71 lists configuration base of Ethernet transmission and IP compensation of processing descriptive section, FIG. 72 lists Offset, Size, Type, Name and Description of Ethernet reception, FIG. 73 lists configuration base of Ethernet reception, FIG. 74 lists Offset, Size, Type, Name and Description of media access control address registers, FIG. 75 lists Offset, Size, Type, Name and Description of receive media access control address filter configurations, FIG. 76 lists media access control types, FIG. 77 lists Offset, Size, Type and Description of source buffer register interface, FIG. 78 lists the results of a read operation performed with an external memory access command, FIG. 79 lists Offset, Size, Type, Name and Description of destination buffer registers, and FIG. 80 lists the results of a write operation performed with an external memory access command.

A transmission between different stations connected in a network such as a LAN (local area network) or a WAN (wide area network) involves sending data communication packages from one station to a connecting station or connecting stations and receiving data communication packages at one station from a connecting station or several connecting stations. FIG. 1 illustrates a data communication package designated in its entirety by numeral 10 and comprising a section containing clear text 12 and a section containing encrypted data 14. The section containing clear text 12 holds a 48 bit address or addresses of the receiving station or stations, respectively, and a 48 bit address of the transmitting station. Since all stations in the LAN should be able to maintain communication with each other an obvious solution would be that the LAN systems use a single encryption key for the entire system. This will ensure a fast working communication net but simultaneously undermine the security of the transmissions since any station connected to the LAN will be able to decipher any data communication packages within the system. Therefor it is common practise to have communicating stations agree upon an encryption key or a set keys only known to the stations involved before transmitting data communication packages. Multicasting functions are provided for by having all the individual stations agree upon an encryption key or a set of keys only known by the transmitting and receiving stations before a transmission is performed. Generally the communicating stations may deduce which encryption key to apply from the clear text of the transmission. The receiving station may locate an encryption key in a local key centre and recall the encryption key associated with the transmitting station, similarly the transmitting station prior to encryption may locate an encryption key in a local key centre and recall the encryption key associated with the receiving station. According to the addresses of the receiving and transmitting stations contained in the clear text 12 the correct selection of an encryption key may be performed.

FIG. 2 illustrates a schematic overview of a communication system, designated in its entirety by numeral 20, incorporating a communication controller 26 according to the present invention. The communication controller 26 is connected to a LAN 28 and to a local system bus 24 of a host system or station 22. The host system 22 for example a computer or a router directs a data communication package in a raw state, i.e. containing data which is not encrypted, to the system bus 24. This activates the communication controller 26, which subsequently encrypts the data and initiates a transmission of a data communication package through the LAN 28. Alternatively, the communication controller 26 receives a data communication package from the LAN 28, performs a decryption of the data communication packages and places the decrypted data communication packages on the system bus 24. The decrypted data communication packages are then collected from the system bus 24 by the host system 22. The communication controller 26 is an independent unit acting between the host 22 and the LAN 28 and performing the data communication encryption and decryption thereby significantly reducing processing time of the host needed for data transmissions. Additionally, the communication controller 26 may be applied to wide area network (WAN) modes connected through high speed transmission lines.

FIG. 3 illustrates the communication controller 26 according to the present invention in greater detail. The communication controller 26 is connected to the system bus of a host system through connections 100, 186 and 182. The connection designated by numeral 100 provides transmission data from the system bus of the host system as input to a Data Read TX control 102. The Data Read TX control comprises DMA (Direct Memory Access) means performing the collecting and reading of transmission data from the system bus. The first part of data communication packages are transmitted without the application of an encryption procedure according to the IEEE standard, therefor a switching between an encryption mode and a non-encryption mode must be implemented. Presently, there are two acknowledge standards for encryption of data transmission, IEEE 802.10 and IPSec. Either of these standards or potential future standards may be applied in the presently preferred embodiment of the invention. A switch, designated in its entirety by numeral 108, is connected to the Data Read TX control 102 through connection 106 fulfils this requirement. The switch 108 may be implemented by any gate means utilising semiconductor techniques. Since the beginning of each data communication package contains non-encrypted data the switch has an initial position 110. When the switch 108 is switched in the position 110 encryption processing is bypassed through a connection 116 providing input data directly to a TX FIFO 130. However, when the switch 108 is switched in a position 112 a connection 114 is established to a Data Compressing unit 118. As described previously, the clear text 12 in the data communication package contains information regarding the transmitting and receiving addresses from which a correct encryption key may be deduced. When the Data Read TX control 102 obtains the address information it extracts the appropriate encryption key in a Session Key LUT 182 through a connection 104 and delivers the encryption key to a Data Encryption unit 126 through a connection 103. The switch 108 is brought in the position 112 thereby connecting the Data Read TX control 102 with Data Compressing unit 118 through connections 106 and 114. The Session Key LUT 182 comprises an external CAM or a binary searching means built into an IC in conjunction with an ordinary RAM and stores a copy of the session keys. Alternatively, the Session Key LUT 182 comprising HASH means in conjunction with an ordinary external RAM. The session keys are updated according to a key management protocol by the host system.

The security of a data transmission is typically improved by adding additional data, such as an additional header, padding and ICV (integrity check value), to data communication packages before encryption. However, if the length of these typical data communication packages exceeds the maximum allowable data package size, limited by LAN specifications, it becomes necessary to apply a fragmentation procedure upon the data contained in the package. This consequently slows the transmission rate considerably since more packages are introduced to the LAN each of which have copies of the first section added containing destination address and transmitting address. The introduction of these additional packages to the LAN is avoided by utilising data compressing means, such as the Data Compressing unit 118, for the reduction of raw data to package sizes that comply with the LAN specifications. During the compressing procedure the data is transferred substantially simultaneously from the Data Compressing unit 118 to an ICV calculation unit 122 through a connection 120. The ICV calculation unit 122 performs a calculation of the integrity check value by numerically summing the data part of the data communication package. The ICV calculation unit 122 further adds the value to the end of the data package. The compressed data are continuously transferred and finally the integrity check value is also transferred from the ICV calculation unit 122 to a Data Encryption unit 126 through a connection 124. The Data Encryption unit 126 performs the encryption of the compressed data and the integrity check value, and continuously transfers the result to the TX FIFO 130 through a connection 128. Depending on which standard is applied the ICV calculation and the data encryption process may be interchanged, so as to enable data encryption prior to ICV calculation. The TX FIFO 130 acts as a first in first out storage buffer ensuring that the LAN always has data to transmit. The TX FIFO 130 is partly filled before an actual transmission is initiated since the LAN only transmits with a predefined transmission rate and does not wait for data to be transmitted. A LAN controller TX 134 collects outgoing data from the TX FIFO 130 through a connection 132 and places them on the LAN through connection 136. The LAN controller TX 134 ensures that the data continuously are loaded onto the LAN within LAN specifications.

The LAN generally needs a continuous flow of data. Once a transmission session is initiated the data should be delivered to the LAN by the LAN controller TX 134 at regular intervals and continue to do so until the transmission is complete. The data read rate of the Data Read TX control 102 of the communication controller 26 compared to the LAN transmission rate determines how the data transmission is performed. If, the data read rate of the Data Read TX control 102 is larger than the LAN transmission rate then transmission data will temporarily need to be stored in the TX FIFO 130 while the LAN controller TX 134 transmits initial parts of the data. The LAN controller TX 134 may initiate the transmission as soon as the receiving address is extracted from data received from the host. If, on the other hand, the data read rate of the Data Read TX control 102 is slower than the LAN transmission rate then the LAN controller TX 134 needs to temporarily store transmission data in the TX FIFO 130 before transmission of any of the data. The LAN controller TX 134 may initiate the transmission as soon as the TX FIFO contains sufficient transmission data to allow for a continuous flow of data in the LAN transmission. In either case, the data read rate of the Data Reid TX control 130 being faster or slower than the transmission rate of the LAN, the communication controller 26 may perform the storing of transmission data in the TX FIFO 130 substantially simultaneously to operations such as extraction of the receiving address from the first section of the data package and collecting an encryption key accordingly. Furthermore, the LAN controller TX 134 may substantially simultaneously calculate the amount of transmission data from the data communication package that needs to be stored in the TX FIFO 130 before the transmission is initiated on the LAN. The calculation performed by the LAN controller TX 134 may start when the LAN controller TX 134 has received the information regarding the size of the complete data communication package. The calculation is based upon size of the data communication package, the efficiency of the Data Compression unit 118 and the LAN transmission rate. If this calculation shows, that transmission time may be reduced by transmitting without compression of the data the LAN Controller TX 134 may order the Data Compression 118 through a connection 119 to shift from a high compression mode to a low compression mode.

When the data read rate of the Data Read TX control 130 is equivalent to the transmission rate of the LAN a worst case station to station transmission time arises. Since no transmission data in this case necessarily is stored in the TX FIFO 130 the communication controller 26 cannot perform parallel operations and therefore the transmission time is the longest.

The time consumption allowed for the LAN controller TX 134 to extract the encryption key depends on the LAN transmission rate, the LAN type, the location of the key information in the data communication package, and the encryption algorithm. The following equation must be complied $$T_{preamble}+T_{wait}>T_{Get\ Block}+T_{Encrypt\ Block} \quad (1)$$

and $$T_{Get\ Key}=T_{preamble}+T_{wait}+T_{TX\ Clear\ header}-T_{Read\ Key\ ID}-T_{GetBlock}-T_{Encrypt\ Block} \quad (2)$$

where $T_{preamble}$ is the time necessary for transmitting the preamble part of the data communication package on the LAN, $T_{TX\ Clear\ header}$ is the time necessary for transmitting the non-encrypted header on the LAN, $T_{Read\ Key\ ID}$ is the time necessary for reading the data from which the encryption key may be deduced, $T_{Get\ Key}$ is the time allowed for extraction of the encryption key, $T_{Encrypt\ Block}$ is the time necessary for encrypting a block of data, $T_{Get\ Block}$ is the time necessary for reading a block of data that needs encryption, $T_{wait}$ is the time the LAN controller TX 134 must wait before the transmission may begin (can be 0).

In an IEEE 802.3 configured LAN with 10 basex the preamble part of the data communication package comprises 8 octets having a transmission rate of 10 Mbit/sec. A Key ID comprises 6 octets for a destination address and a Clear header comprises 12 octets for destination address and source address. The encryption algorithm applying DES block mode using 8 octets and not transmitting fixed IV consumes 0.64 $\mu$sec for encrypting every block, equivalent to an encryption rate of 100 Mbit/sec. The data read rate of the Data Read TX control 102 might be 10 Mbit/sec, if, in combination herewith the $T_{wait}$=0sec then equation 1 fails because $T_{preamble}+T_{wait}$=6.4 $\mu$sec and $T_{Get\ Block}+T_{Encrypt\ Block}$=7.04 $\mu$sec. In this situation the LAN controller TX 134 must wait 2 octets or $T_{wait}$=1.28 $\mu$sec before it according to equation (1) is allowed to initiate a transmission. If, the LAN controller TX 134 starts transmitting when it receives the third octet then the elapsed time will be 8 octets of preamble part of the data communication package ($T_{preamble}$=6.4 $\mu$sec), a wait state ($T_{wait}$=1.28 $\mu$sec) and following 14 octets ($T_{Tx\ Clear\ header}$=11.2 $\mu$sec). Therefor 18.88 $\mu$sec passes before the first encrypted data must be ready for the LAN. There must be 8 bytes of data in the Data Encryption 126 before the encryption can begin ($T_{Get\ Block}$=6.4 $\mu$sec) since a DES encryption technique is applied and the data compression may be considered as time wise neutral. Subsequently the encryption is performed ($T_{Encrypt\ Block}$=0.64 $\mu$sec). Key extraction is initiated as soon as the destination address is read from the clear text in the data communication package ($T_{Read\ Key}$=4.8 $\mu$sec). Hence the time allowed for extraction of the key from the Session key LUT 186 is, according to equation (2), equal to $$T_{Get\ Key}=6.4+1.28+11.2-4.8-6.4-0.64=7.04\ \mu sec$$

If, the $T_{Get\ Key}$ is smaller or negative then the LAN controller TX 134 must wait until there is a sufficient number of data in the TX FIFO 130 before initiating the transmission.

The primary purpose of the Data Compression unit 118 is to compress the data to a state where any fragmentation may be avoided. Additionally, an improved efficiency of the LAN is obtained, if, the data read rate of the Data Read TX control 102 is faster than the LAN transmission rate then. The data compression may influence the allowable time consumption of the LAN controller TX 134 however, this influence may be reduced significantly by following certain data compression methods.

A first method involves performing the data compression substantially simultaneously to performing the data transmission. However, the rate at which the data is output from the Data Encryption unit 126 is unpredictable. This is unacceptable since the TX FIFO 130 must never be emptied during the data transmission. Therefor the data compression function of the Data Compression unit 118 may be implemented as dependent on the amount of stored bytes in the TX FIFO 130. Thus, if the TX FIFO 130 is running low on stored bytes then the Data Compression unit 118 will lower data compression efficiency. When applying a data compression algorithm LZ1977 of the LZS type to data in the Data Compression unit 118, the implementation of the lowering of data compression efficiency may be implemented by having The Data Compression unit 118 ignoring its history buffer. The Data Compression unit will lower its efficiency as long as the TX FIFO 130 contains an insufficient amount of stored bytes.

In applying the first method in a LAN configured according to IEEE 802.3 one might experience difficulties. The last two bytes in a (media access control) MAC header normally contains information relating to the length of the data communication package and this information is not known prior to the compression of the data communication package. Therefor a precisely defined and vacant Ethernet type may substitute this information relating to the length of the data communication package (byte count). The original value is moved into a protected header in the data communication package thus allowing the receiving station to re-establish the information.

The first method might induce further difficulties when applying the IPSec standard since the length of the data communication package must be included in the IP header. However, under certain circumstances one may employ the first method if for example the communications controller 26 engages in transmitting a IPSec data communication package having a payload of 4,000 octets of data on a LAN employing IEEE 802.3 standard having a maximum data communication package size of 1,500 octets, when a fragmentation is likely to be required since the data in the data communication package cannot be compressed to a size within the limits. The communications controller 26 therefore starts by transmitting a data communication package having maximum payload, and if the data compression unit 118 compresses too much the data compression unit 118 stops compressing so as to ensure that the resulting length of the data communication package is identical to the length of a data communication package included in the IP header.

A second method involves compressing all the data before the transmission is initiated i.e. the amount of data contained in the data communication package and the necessity for data fragmentation is known. If the primary purpose is to avoid fragmentation of the data a following first scheme may be implemented. If the data communication packages are smaller than the maximum payload then they are transmitted non-compressed at once. If the data communication packages are larger than maximum payload then they are compressed and if the size of the compressed part and the clear text part is smaller than the maximum payload, then the data communication packages are transmitted. However, if the Data Compression unit 118 is unsuccessful in compressing the data communication package to comply with the maximum payload then the data communication package may be transmitted non-compressed. The Data Read TX control 102 may check the progress of the compression of the data in the Data Compression unit 118 and make a decision as to either continue or interrupt further data compressing of the data communication package. Alternatively, the LAN controller TX 134 may check the progress of the compression of the data in the Data Compression unit 118 through the connection 119 and order a high or low compression mode.

In case the data read rate of the Data Read TX control 102 and the compression speed of the Data Compression unit 118 is faster than the LAN transmission rate a second scheme may be implemented. Data communication packages, smaller than a predetermined size, are transmitted non-compressed at once. Data communication packages, larger than the predetermined size, are compressed and in case the compression of the data communication package is progressing normally then the Data Compression unit 118 continues the compressing procedure otherwise the compression is interrupted and the data communication package continued as a non-compressed transmission. The receiving station or stations experience compatibility between the first and second scheme and may be implemented and used with most relevant standards for data transmission. FIG. 4 illustrates a data format for a compressed payload, designated by numeral 40 in its entirety, comprising a first section 42 containing compressed data, a second section 44 containing a bit pattern indicating the end of the compressed data section 42, a third section 46 containing padding of 0–7 bits insuring the correct placement of the octets in the non-compressed data and a fourth section 48 containing the non-compressed data. The length and the bit pattern of the second section 44 describe which algorithm is used for compressing the data. An alternative format for a compressed pay load comprises a first section 43 containing compressed data, a second section containing uncompressed encrypted data including octets of uncompressed data encrypted according to a compression standard, a third section containing a bits pattern indicating the end of the compressed data section and finally a fourth section containing padding of 0–7 bits ensuring the correct placement of the octets in the non-compressed data.

When the data communication packages exceed a size compatible with the LAN specifications or when the data communication package expand as a result of the compression then the data communication package may be fragmented into two or more data communication packages. Expansion resulting from compression may occur when the compression is applied to encrypted data. Normally, the maximum expansion of the data due to compression relates to the compression algorithm and consequently the maximum expansion is known. Typically, an expansion percentage is in the range of 5% to 20%, depending on which compression algorithm is utilised. By having the Data Read TX control 102 continuously check the progress of the Data Compression unit 118 ensures that only the amount of data, which guaranteed can be contained in the package including protocol trailer, padding and ICV, is transferred to the Data Compression unit 118.

The protocol trailer is the last byte before the padding information in a LAN data communication package and is used for indicating if the LAN communication package is a fragmented package. FIG. 5 illustrates an example on a LAN communication package format according to the invention, designated by numeral 50 in its entirety, comprising a first section 52 containing a clear text, a second section 54 containing a protected header, a third section 56 containing data, a fourth section 58 containing fraction ID, a fifth section 60 containing flags, a sixth section 62 containing padding 62 and a seventh section 64 containing ICV. The protocol trailer comprises sections 58 and 60 containing fragment ID and flags and includes a byte having 6 reserved bits, 1 bit indicating more segments and 1 bit indicating fragmentation. If the fragmentation bit is TRUE or logical '1' then a fragment identifier may be stored in the in six bytes situated from the seventh to last byte to the second to last byte in the data section 56 in the LAN communication package 50. Alternatively, the flags 60 and the padding 62 may according to normal practice be contained in the protected header 54. Choosing the fragmentation identifiers capacity this large ensures against reruns of the identical fragmentation identifier before the session key is changed. Utilising 6 bytes to describe the fragmentation identifier results in 120 years on a 1 Gbit Ethernet LAN must pass before the identifier is rerun. Contrary to normal practise the first compression method places flags and fragment ID in the later sections of the LAN communication package 50. The value included in the ICV section 64 of the LAN communication package 50 is based on an ICV calculation including sections 54 to 62 illustrated by arrow 66. Sections in the LAN communication package trailing the clear text section 52 are all encrypted as illustrated by arrow 68.

The receiving section of the communication controller 26 comprises several functions. A LAN controller RX 140 receives data from the LAN through a connection 138 and stores the data in an RX FIFO 144 through a connection 142 at rates determined by the LAN specifications. The RX FIFO 144 acts like a storage buffer ensuring compatibility between LAN transmission rates and processing speeds of the communication controller 26. If an error should occur during a reception of data in the LAN controller RX 140 the LAN controller RX 140 sends a message to the host system and to an RX control unit 148.

The RX control unit 148 extracts the information in the first section of the data communication package regarding the encryption key needed for the decryption of the received data, collects the appropriate decryption key from the Session key LUT 186 through a connection 150 and provides the decryption key to a Data Decryption unit 164 through a connection 165. The RX control unit 148 is capable of translating a wide variety of formats of data communication packages and the translation algorithm may be adjusted to any new or different formats of data communication packages. A switch 154 has an initial position 158 directing non-encrypted data contained in the first section of a data communication package to a WR FIFO 176 through a connection 160. As the first section of the data communication package ends the switch 154 changes to a new position 156 directing encrypted data contained in the second section of the data communication package to the Data Decryption unit 164 through a connection 162 and a connection 152. The Data Decryption unit 164 decrypts the second section of the data communication package and transfers the decrypted data to an ICV check unit 168 through a connection 166. The ICV check unit 168 performs a verification of the integrity check value of the decrypted data by calculating the integrity check value of the decrypted data and comparing the calculated value with the value stored in the data communication package by the transmitting controller of a different station. If the ICV check unit 168 finds an error in the value it sends a message to the host system and the data communication package is discarded. Depending on which standard is applied the ICV check calculation and the data decryption process may be interchanged so as to enable data decryption before ICV check calculation. If the ICV check unit 168 finds that the two values are identical then the data communication package is transferred through a connection 170 to a Data Decompression unit 172. The Data Decompression unit 172 provides a decompression of the verified data communication package and transfers the result through a connection 174 to the WR FIFO 176.

The WR FIFO 176 acts like a storage buffer ensuring compatibility between LAN transmission rates and processing speeds of the communications control 26 e.g. the system bus 24 of the host system 22 and the LAN 28 are operating at a different speeds. The data communication package is subsequently extracted through a connection 178 and placed on the system bus of the host by a Data Write unit 180 through a connection 182. If any errors occur during a reception the host system is notified through the Data Write unit 180 enabling the discarding of any parts of data received from the package and which are already stored in the host system.

The communication controller 26 co-operates with the host system 22 in providing the optimum performance and lowest costs regarding a data transmission system. The host system 22 must comprise a powerful central programmable unit (CPU) and include a large capacity of RAM for management of the encryption keys and for the updating of the Session Key LUT 186. Furthermore, the host system 22 collects fragmented data communication packages in its RAM because this provides the fastest solution. The communication controller 26 comprises relevant algorithms implemented in hardware, some CPU means and RAM. During a transmission procedure the host system 22 may perform a interpretation in part of the data communication package when the package format is complicated and transmit relevant information to the communication controller 26 enabling the Data Read TX control 102 to quickly find the associated session key. During, a reception procedure the RX control unit 148 performs an interpretation of the data communication packages and extracts the relevant encryption keys without help from the host system 22. However, the host system 22 may perform adjustments to the data communication packages before they are handed to the applications.

The term data communication package is a generic term for a data telegram, data telegram, data package and is to be construed as a complete data package to be transmitted on LAN or WAN.

In the following implementation of the presently preferred embodiment is further described having standards IPComp and IPSec applied to the methods described above. The implementation may be accomplished by configuring a network card or a virtual private network card (VPN).

The IPSec standard as defined in RFC 2401 provides a method for achieving confidentiality and/or authenticity. In the presently preferred embodiment of the invention encapsulated security payload (ESP) as defined in RFC 2406 is used as the general technology. The ESP processing is performed on the entire IP data communication package in transport- or tunnel mode and provides a new IP data communication package. The ESP processing in transport mode shown in FIG. 6 essentially consists of generation of a new IP data communication package comprising a copy of the original header including an adjustment of the next header value and further consists of the application of ESP on the payload. This results in the encryption of data and the calculation of an ICV. The encryption is performed before the ICV calculation. The field defined as SPI in FIG. 6 is used as reference for which encryption key and which algorithm should be employed.

The IPComp standard (RFC 2393) provides the possibility for compression of data as shown in FIG. 7. A compression parameter index (CPI) designates which algorithm should be employed in accordance with RFC 2393. During transmission of data the compression must be completed before encryption since it is not possible to compress encrypted data.

An alternative and presently preferred embodiment of the invention provides the possibility for utilising IPSec and IPComp standards as ESP so that delays in the system is minimised. This is achieved by combining a central processing unit (CPU) for administration and set up of the processing of the individual data communication packages as well as dedicated processing units (PU). The PUs are characterised by firstly having access to local RAM (common between PUs) into which RAM data is written and read at a position in the RAM, which is determined by a processing descriptor (PD), thereby obtaining enlarged flexibility since the CPU is enabled to define data before and subsequent to a PU process. Secondly, the process of data may be accomplished synchronously between individual PUs thereby enabling virtual transfer of data from for example the data compression unit and the data encryption unit without significant delays in the system. Thirdly, the individual PUs are able to manage header and trailer in accordance with above mentioned standards, thereby allowing to define the entire processing of the data communication package from clear text to transmission. Fourthly, the processing descriptor PD for each data communication package defines which process the respective PUs should perform. Finally, a queuing system enables the communication controller to manage peak loads and further accomplishes an effective operation of the CPU.

FIG. 8 shows a block diagram of the PUs and connected RAM, in which block diagram the FIFO (first in first out) bus 80 provides access to a SRAM 82 (static random accessible memory) shared by all PUs 92a, 92b, 94a, 94b, 96a, and 96b. The management bus 84 shown in FIG. 8 is used for signalling between individual PUs 92a, 92b, 94a, 94b, 96a, and 96b for example for the synchronising described above. A bridge to CPU/host bus 86 provides access for the CPU to registers in the individual PUs 92a, 92b, 94a, 94b, 96a, and 96b, and the SRAM 82.

An external bus 85 may typically be a local bus whereto the local CPU has access. If the presently preferred embodiment of the invention is used as a network card then the bridge to CPU/host 86 further provides the primary path for transferring to and from a host system.

A control unit 88 provides access for the CPU to data relating to general configuration and surveillance of the system.

An inqueue unit 90a and an out-queue unit 90b comprises a collection of PDs which need to be processed by the CPU (out-queue 90b) and a collection which need to be processed by the PUs (in-queue 90a). The in-queue 90a enables the CPU to insert PDs as soon as they are ready for processing without having to wait for the PUs to become ready. Additional queues ensure that a busy PU does not block or disable initiation of a PD on a different PU. The out-queue 90b utilises a go-queue and a complete-queue. The go-queue is for inserting PDs as soon as a PU has produced a certain amount of data, thereby enabling the CPU to inspect for example an IP header on a received Ethernet frame. Further processing may subsequently be initiated even though all the data still has not been received. An interrupt is generated to the CPU when the go-queue contains a PD. The complete-queue is for inserting PDs when the processing of the PDs is finalised. PDs included in the complete-queue are utilised by a transmitting media access control unit (TX-MAC) 98a or by the CPU.

A decompression unit PU 92a and a compression unit PU 92b perform a decompression and compression of data respectively. During compression of data the CPU sets up the header thereby ensuring that the complete data block is ready by the completion of the compression process. Both the decompression unit PU 92a and the compression unit PU 92b have a maximum allowable length of the data. In case the length of the data exceeds the maximum allowable length an interrupt is generated and transmitted to the CPU. This ensures that no data is over written during the creation of a data communication package. The end of data indication may further be applied for the detection of whether the compression has resulted in an expansion of the data. By specifying a limit for the compression required the decision as to further compression is accelerated. If a satisfactory compression is achieved then the compression continues and if a non-satisfactory compression is achieved then the data will not be compressed and a second start address is applied. The decision regarding further compression may be taken without the involvement of the CPU.

A decryption unit PU 94a and an encryption unit PU 94b perform respectively decryption and encryption of the payload as defined by ESP. A memory block includes information on keys used for decryption and encryption and is referenced by the PDs. The memory block has allocated an ICV (integrity check value) field for each SPI (FIG. 6). The decryption unit 94a and the encryption unit 94b provides the possibility for using an ICV for a first set of data on a second set of data using the same key block in the memory referenced by the PDs. Further, the decryption unit 94a and the encryption unit 94b provides an possibility for configuring the process so that decryption and encryption may be performed on fragmented data even though additional processing of other data communication packages are initiated.

Two authentication units PU 96a and 96b perform calculation and validity control of ICV. A pointer included in the authentication units 96a and 96b points to a memory block including key. Typically a block will be allocated for each SPI.

A transmitting media access control unit (TX-MAC) 98b and the RX-MAC 98a transmits and receives data communication package via the network. At reception of a data communication package data is sequentially written to a large buffer and a PD is configured in accordance with firstly the start address and secondly the end address. As soon as a part of the data is received the PD is moved to the Go-queue enabling the CPU to detect the reception of a new data communication package. The CPU reads the header of the data communication package and decides which form of process is needed. If the first PU is available for carrying out this process then the processing may be initiated immediately. Consequently processing of the data may be performed simultaneously to the reception of data from the LAN. At a following reception of a data communication package from the LAN the data is written to a main buffer. The main buffer is configured with a defined limit for amount of data and in case the limit is exceeded an interrupt is generate for the CPU, which configures a new buffer hereafter.

In a virtual private network (VPN) reception of data communication packages belonging to a LAN should be avoided. To prevent this an address filter is implemented, which address filter determines from the MAC address whether the data communication packages should be received or not. The address filter may operate in a positive or negative mode designating which data communication packages should be received and designating which data communication packages should be ignored. Configuration of the address filter may be performed dynamically so as to enable compatibility with the network configuration used.

Before initiating a transmission the length of the data provided in a field in the IP header may be adjusted in accordance with the real length of the data communication package. In case of a new length of the data communication package a new ICV is calculated and inserted in the IP header. The adjustment of the length value in the IP header field may obviously be initiated only when the processing of the data is concluded that is that for example the compression of data is complete. If no compression is applied to the data the transmission may be initiated as soon as the first data arrive at the TX-MAC 98b.

Compared to a standard PCI network interface controller card (NIC), the Safe NIC product will provided hardware assisted compression/decompression, encryption/decryption and authentication which makes it possible to provide full data confidentiality and authentication without significant reduction in performance—in some cases even with improved performance due to compression and the on-board IP processing.

Key features of the board are:
PCI-bus interface compliant with PCI spec. 2.1.32 bit/33 MHz
10/100 Mbit Ethernet interface. Autosense
Support for IPSec. RFC 2406.
Support for IPComp. RFC 2393

In a VPN configuration, the board will provide one half of the VPN functionality. The interfaces of the board is therefore one to the intranet and one to the internet. This configuration is illustrated in FIG. 9.

In FIG. 9, the interface is provided by means of an Ethernet interface but other physical interfaces are also possible by—optionally by means of the PCI interface although an integrated interface is preferred.

In this configuration, the board is primarily intended for the VPN pro to provide hardware based cryptography, authentication and compression. If the two Ethernet interfaces are used, all processing between the intranet and internet is performed on-board whereby the PCI interface is not loaded by this traffic—only non-VPN related traffic is routed through the PCI-bus to the host system.

A MAC-address filter is provided on the local Ethernet channel in order not to load the system with Ethernet frames that are not intended for the VPN processing.

In short, the main features of the VPN-board are as follows:
PCI-bus interface compliant with PCI spec. 2.1 32 bits/33 MHz.
10/100 Mbit Ethernet for local net. Includes MAC address filter.
10/100 Mbit Ethernet for internet access.
Support for IPSec (ESP primary, possibly also AH). RFC 2406.
Support for IPComp. RFC 2393

Now the hardware design will be defined. The following subsections show the overall functional blocks and interconnections. Detailed descriptions of implementation and use are explained, and any interfaces are described.

The basic architecture is the same for the NIC as and the VPN board, and will be described in common in the following. FIG. 10 and FIG. 11 show the block diagrams of the two configurations.

The architecture of the design is based on a number of processing units (PU) which performs the processing of the data based on a SRAM memory interface. These PUs are Authentication, En/decryption compression/decompression and a transmit/receive MAC.

Each on these processing units have access to SRAM which provides a virtual FIFO between the units—this memory is therefore also denote FIFO-RAM. The SRAM and the PUs are accessed by a bus which will be denoted Fifo Bus.

Note, that for the SRAM for the inbound internet processing IIP will be denoted FIFO-ram for this unit only, the SRAM of the outbound internet processing IOP will be equivalent to external memory for the IIP since it can not be accessed by its local SRAM-bus.

This bus also provides access to the PC system memory by means of the CPU/PCI bridge provided by the system controller. Each PU will operate on buffers (identified by a start and end pointer) in memory. The accessible memory may be divided in three sections:

System memory is accessible by means of the system controller. Accesses to system memory should be limited to transfer of data to be transmitted/received from/to the host system.

SEAM is primarily intended for processing by the PUs. Use of the SEAM for this processing will make it possible to process data at wire-speed of the network connection (100 Mbit). The amount of SEAM is limited since it only should be used as a temporary processing storage during processing of the datagrams. In the VPN configuration, the data should quickly be retransmitted (probably with a new security association) to a new receiver. In the NIC configuration, the data will be transferred to/from an upper application layer.

Processor memory is intended to be working memory for the local CPU. The CPU has access to all other memory areas by means of system controller.

To gain the maximum performance of the system, the PUs should work in the local SRAM.

The configuration of the PUs is based on a processing descriptor (PD) which contains all configuration information and may be located on any location in the FIFO-memory. A part of the PD is indication of source and destination buffers used for the processing. Two queue units are included in order to provide an efficient interface to the CPU. PDs which are to processed are placed in a queue. The InQueue will then initiate processing as soon as the relevant PU is available. Similar, the Outqueue unit will collect the PDs (represented by a pointer to each) as they are processed by the PUs. Using these queues provides more efficient use of the CPU as well as the PUs since none of them have to wait for each other.

In addition to the local bus is a management bus which is used to perform communication between the PUs. An important part of the communication is synchronization between the PUs whereby a pipelined processing may be achieved.

Since the required processing cannot easily be deduced from the received datagrams a processor is provided to perform this analysis and configuration for the processing. This processor will also perform management related tasks such as negotiation and maintenance of the security association which shall be used for each individual connection.

Details about each of the blocks and functions is provided in the following paragraphs.

FIG. 10 shows a block diagram of the NIC-card. This configuration only consist of a single Ethernet interface and a single set of PUs. FIG. 11 shows a block diagram of the VPN. This configuration contains two Ethernet interfaces—one for the internet interface and one for the local network interface. Two sets of PUs is provided—one for inbound and one for outbound internet data processing (IOP) and one for inbound internet data processing (IIP).

Each section has its own memory and dedicated PUs. Configuration and processing of the two blocks are also independent.

Note, that the primary data-flow is between the local net and the internet. In order to keep the processing in local SRAM, each set of PUs interfaces to the local network and the internet. This means that the physical interfaces are shared between the two PU sets.

Analysis of the IPsec [1], IPComp [2], IPv4 [3] and IPv6 [4] shows that processing of the IP datagrams in hardware only will be very complex due to the header analysis.

A local processor is provided to perform the above mentioned tasks. The use of a local processor puts less effort on the host processor and the network adapter will appear as 'black box' since the IPsec and IPcomp processing is performed by the board itself.

The NEC VR4310 [18] and the Galileo GT64115 [19] is chosen as the local processor and system controller.

Three memory devices are provided on the board:

SDRam which is intended for the program execution on the MIPS processor. The code from the Flash should be copied to this area in order to provide faster access and thereby improved performance compared to the Flash. 16 MB SDRam will be provided on the initial version. This amount might be adjusted.

Flash which will provide boot-code for the local processor. This device must be programmed as a part of the initial test of the board. Later maintenance may then be performed by means of the PCI-bus and/or the local processor itself. Several MB may be provided.

SRAM is provided for each direction as shown on the block diagram. At least 128 KB will be provided for each block in the diagram.

The CPU/Local bridge provides an interface between the device-bus and possibly the processor-bus and the FIFO-bus. This unit is additionally arbiter on the local bus.

The main access types which are translated by this block is:

CPU/PCI bus access to the local SRAM

CPU/PCI bus access to configuration registers of the PUs and the bridge itself.

Access to CPU-bus/memory by means of source and destination buffer functionality. This will be implemented by means of DMA. The proccessor-bus interface may be used as an alternative.

When a PU accesses memory, it may either be directly to the local SRAM which may be accessed at random or it may be to the processor memory/external RAM by means of a source and destination buffer functionality.

The source/destination buffer functionality may be seen as two independent PUs which are configured only by means of a register interface and which must be requested similarly to the other PUs. Two buffer PUs are provided—one for read (source buffer) and one for write (destination buffer).

The Buffer PUs can only be used for the source and destination data of the processing and thereby not for any configuration. All configuration data must therefore be present in the FIFO-RAM.

Note: In earlier versions, it was the intention that memory access should be fully transparent by means of the bridge. This is now only the case for source and destination data. Full transparency may be provided then the system is integrated further.

An address filter is integrated as a part of the RX-MAC PU. This filter will be utilised in the VPN configuration in order only to process packets which shall be routed to the internet. The processor will thereby not have to analyze packets which are intended for the LAN and thereby not tunneling through the internet.

For the use described above, only the MAC Address filter on the LAN-port will be utilized.

The Address Filter can operate in either positive mode or in negative mode. In negative mode the Address Filter will discard the frame if the Destination Address Field in the received frame matches with one of the Destination Addresses stored in the Address Filter. In positive mode the Address Filter will discard the frame if the Destination Address Field in the received frame do not match with one of the Destination Addresses stored in the Address Filter. In short positive mode allows reception of frames with an address match and negative mode allows reception of frames with no match.

The addresses of the filter is maintained by the following commands:

InsertAddress.

RemoveAddress.

RemoveAll.

The address filter operates on the data received from the MAC.

The addresses are stored in separate memory not shown in the block diagram of FIG. 11.

The following sections describe the processing units, which may be a part of the pipelined operation.

The InQueue is used to implement a queue of PDs which shall be processed. This makes batch-processing more efficient and it simplifies the entry of a PD for processing since this is done in a single point accessed by the CPU only.

The InQueue PU will process the PDs on a strict queue basis. Alternatively, it may be considered to improve the performance by selecting a PD further down the queue if the PU of that PD should be free.

The Out Queue is used to collect PDs in a queue during and after processing. Two queues will be provided:

A Go-queue which collects PDs where some amount of data has been processed. This allows the CPU to inspect the result and initiate further processing although the processing has not completed yet.

A Complete-queue which collects PDs where processing has been completed.

An interrupt may be generated when one or more PDs are available in the queues.

Compression is in principle only related to IPComp. The algorithms are listed in section 4.4.5 in [6] and are:

Zlib deflate algorithm [9].

Stac electronics LZS [10].

None of the above algorithms are mandatory.

It is possible to use proprietary algorithms as well.

Both algorithms will use a history buffer which will be provided by separate memory not shown on the block diagram in FIG. 11.

Section 4.4.4 in [6] lists the encryption algorithms which currently are suggested by the ESP. FIG. 25 summarizes these algorithms and the requirements for confidentiality.

Please refer to [6] for details and references to documents which describes the algorithms in detail.

The supported column in FIG. 25 indicates whether the algorithm is supported by the hardware. Additional algorithms may be supported later.

FIG. 26 lists the algorithms which are required by the authentication of authentication header (AH) and ESP as defined in [6] section 4.4.3 and 4.4.4:

The authentication PU will calculate the ICV and either write the data or compare to an existing value.

Additional algorithms may be supported later.

The Ethernet interface is provided by a MAC-controller with a MII interface. Embedding the MAC instead of using a standard external PCI Ethernet controller allows a tight integration and thereby an improved pata-path to the PUs.

The block diagrams in FIG. 10 and FIG. 11 does only define the overall function. Reset circuits, buffers etc. are not included.

The processing descriptor (PD) is used to configure the PUs. The PD is located at an arbitrary location in FIFO memory and has the overall structure shown in FIG. 12.

The PD is logically divided in sections corresponding to a section for each PU in the pipeline Each section is denoted PDS (Processing Descriptor Section).

The NextPUID field will be present in (almost) all PDS and indicates which PU follows the current in the processing order.

An example of use of the PDs is provided in the following paragraphs.

FIG. 13 provides an example of buffer indication in the PD. The desired processing is that the payload is encrypted (and trailer is implicitly added). The authentication value shall then be calculated for the header followed by the encrypted payload, and the result of the authentication shall be added immediately after the encrypted payload (special option for authentication).

The example contents of the PDS is illustrated in FIGS. 12 and 13. The result of the encryption is written to an 'unused' location in memory, but it could also be written directly in the original payload (providing that the cleartext payload is not required—even in case of error). Note, that the configuration above results in a continues datagram which could be transmitted if a IP header was added in front of the ESP header.

One of the optional functions of the encryption PU is to add the ESP trailer. To indicate the final length of the source buffer to the next PU, the pointer to the end of the ESP trailer is written to the SrcBufEndPtr field of the authentication section.

The above example illustrates the buffer configuration. For the processing to be successful, one must ensure that data is processed in the correct order. This is done by letting a PU signal to the next PU as blocks of data become available in the destination buffer. The principle of this signaling is shown in FIG. 14.

The part above the buffer shows the terminology used for the destination buffer (i.e. the data production part of the current PU) and the part below the buffer shows the terminology for the source buffer (i.e. the part of the next PU which consumes data).

The signaling takes place based on the values set for the SBI (Source Buffer Increment) and DBI (Destination Buffer Increment), and consist of three major phases:

1. The current PU produces data until DBI1 words are available. A Go (first go) will then be signaled to the next PU. This will initiate the next PU which then knows that SBI1 words of data are available.
2. Every time the current PU produces additionally DBI2 data, a Go is signaled to the next PU. The next PU then increments the amount of data in the input buffer by SBI2.
3. When the current PU has completed processing, it writes the end-pointer of the buffer to the SrcButEndPtr field of the next PU PDS. A Complete is then signaled to the next PU which now may read the final end of its source buffer from the PD and process the remaining data.

Step 1 and 2 may be bypassed if less than DBI I data is produced.

In practice, it is probably easiest to keep account of the available source data by means of a source buffer-end pointer (SBE) which is initialized to the beginning of the buffer and then incremented during the signaling. On completion, the final end may be loaded to the pointer. For the signaling to the next PU it may be preferred to use a counter which is loaded with the DBI value and decremented when data is produced. When the counter reach zero, it is reloaded and a Go is signaled to the next PU.

FIG. 15 provides a model for an understanding of the synchronization which is performed between the PUs. The function of the modules in the drawing is as follows:

SBE Source Buffer End. This unit keeps track on the end of the source buffer. When the unit is started with the first go, it is initialized to SBS+SBI1. On the following Gos it is incremented by SBI2.

When the previous PU is done (complete signaled), the actual buffer length is read from the PD. Note, that it is acceptable (although not desirable) to miss one or more of the following Gos since the final end of the source buffer is passed.

SBR Source Buffer Read. Pointer to the next data to read in the source buffer. On start, this is initialized to SBS and then incremented as data is read by the PU core.

VFC Virtual Fifo Count. This is calculated as SBE-SBR and does thereby provide a count on how many octets remains to be processed in the source buffer. The operation of the PU core is controlled by this figure.

DBE Destination Buffer End. Keeps track on where the next data shall be written. This value is written in the PD on completion.

DBI Destination Buffer Increment. This block provides the signaling to the next PU. The counter is initially loaded with DBI I. When the counter reach 0, a Go is signaled and the counter is loaded with DBI2. A Go-signaling scheme as illustrated in FIG. 11 is thereby achieved. This unit may also be implemented by means of an incrementing counter and a compare operation against DBI1 and DBI2 if this is found to be more efficient.

The DBI1 value depends on the typical load on the PUs. A high value of DBI1 allows the current PU to perform a significant amount of processing before the next PU is started. If the next PU is busy, this allows the current PU to produce a larger amount of data. If however the next PU typically is idle, the DBI should be set low in order to start the next PU as early as possible and thereby reduce latency.

The values of the SBI1 and SBI2 for each PU is stored in registers of each PU. A part of the configuration of the PUs is to read this register from the next PU in order to determine the DBI1 and DBI2 values which will be used for this PD.

PU operation and state machines (SM) provides further details about the behavior of the PUs by means of state machines (SM).

The description is based on PUs which consumes data from a header and a source buffer and produces data to a destination buffer. This does not apply for all PUs, and their state machines will therefore be simplified accordingly.

The initial state of all state machines is the Idle state. This state shall also unconditionally be entered if a Reset is signaled to the PU.

In order to simplify the transition conditions, they are numbered: "1: Condition" the transition with the lowest number always has the highest precedence and shall be issued if it is true.

A PU main state machine (MainPU) is the main state machine of the PU which controls the processing and overall operation. FIG. 16 shows a block diagram of the MainPU and table 3 provides states and activities of the MainPU.

A Source Buffer End and VFC control (SBECtrl) keeps track on the current end of the Source buffer (SBE). The SBE is dynamically increased as Go signals are received from the previous PU. From the SBE, the VFC may be calculated as the difference between the SBE and SBR as shown in FIG. 17. Further table 4 lists state and activity of the SBE.

Since the final SBE is set when a complete is received from the previous PU, a loss of one or more Go is acceptable, but it will increase latency since the PU will lack the previous PU with more data.

A Destination buffer control and signaling (DBICtrl) shown in FIG. 18 controls the Go and Complete signaling to the next PU. This SM does also implement the request/grant protocol since the next PU must be granted before Go or Complete can be signaled. FIG. 29 lists state and activity of DBICtrl.

This SM additionally handles the Sync signal which is issued if this PU will be the producer of data to a next PU. This allows additional processing to be initiated 'on the fly'.

The ReqPU sub-state machine (SSM) will request/arbitrate the next PU. The arbitration protocol and ReqPU state machine is further described below.

A Signaling status (SigStat) shown in FIG. 19 is a simple state machine which monitors the progress/signaling state of the previous PU. States and activities of SigStat is listed in table 6.

The FIFO-bus interface of the PUs is intented for the actual data-transfer. The source/destination for these data-transfers is typically the FIFO-memory, but may also be access to registers or access to external memory. The type of access as well as the signaling is communicated by means of a management bus.

The ownership of the management bus always follows the ownership of the local bus. The default transaction on the FIFO-bus is access to FIFO-memory which will take place unless register-access or external access explicitly is indicated on the management bus.

The control unit (CU) also operates as a device on the management bus and allows the CPU to perform signaling on the bus.

An overview of the management bus and the attached PUs and the CU is shown FIG. 20.

The management bus is synchronous and consist of three signal groups (and clock):

MSource This is the source of the bus-transfer which is controlled by the CU only. Each PU (and the CU) has a unique identifier (PUID) which is used for selection. The PU indicated by MSource has the mastership of the bus for the active clock period and must drive the MTarget and MData. All other units must tristate their drivers on these signals. It may be considered only to drive the bus in the 2nd half of the clock period in order to avoid multiple drivers during the Source decode phase.

MTarget The owner of the bus indicates the target for the management data/command. The Target shall respond on the MResult line with an indication of the result of the transaction. If no signaling shall take place and no logical PU exist for the transaction (fx. a simple access to FIFO-ram), the PUNone may be used.

MData The owner places the data on these lines. These indicate the actual signal/command.

MResult The result of the bus-cycle management command is indicated on this bus which is driven by the PU identified by MTarget.

The Msource is exclusively driven by the CU. Ownership of the bus is determined by an arbiter in the CU. Each PU has a request signal indicating that it wants ownership of the bus.

The arbitration is essentially based on a timeslot for each PU. If a PU is not requesting the bus, it is bypassed and the 'next' PU in the sequence will grant the bus. A more intelligent arbitration may be considered in order to reduce signaling latency, but the benefits will probably be limited.

A detailed description of the signaling/datatransfer on the management bus is provided below regarding management bus signalling.

The FIFO-bus is very similar to a typical asynchronous SRAM-bus consisting of the following signals.

Address Indication of the address for the access. This may be interpretated as a register address of a FIFO-memory address.

Data Data for the transaction. The driver of this bus depends on the Rd_L and Wr_L signals. The current implementation uses a 32 bit databus and does only support 32 bit data-access.

Rd_L Active low read signal.

Wr_L Active low write signal.

Each transaction on the FIFO-bus is completed within one clock cycle.

Interrupts is the way the PUs signals a need for attention from the CPU. Two basic types of interrupts are provided:

Fatal interrupts which are issued on errors which makes continuation of processing impossible/insensible. The PU will typically stop processing and hold the interrupt active until the cause has been resolved or the PU has been reset.

Service interrupts which is issued as an integrated part of the processing. Only the OutQueue is able to generate such interrupts.

A register allows the software to quickly identify which interrupts are pending and take the appropriate action.

In case of an error, the SM must examine each of the PUs and resolve the error. Typically it will be necessary and probably easiest to 'clean up' the entire pipeline in order to start processing from a well-defined state.

Each PU will have registers defining its internal state. These registers will be inspected by the CPU to determine the cause of the interrupt and appropriate actions.

In the current implementation, the interrupt lines on the CPU are used according to table 7.

The CPLD provides glue-logic for the board and provides some debugging facilities. The UART allows attachment of a terminal which may be used during the test phase of the design.

Below describtion provides an overview of the memory organization in terms of base addresses for various sections.

Care should be taken in connection with the configuration of the cache in the processor. The FIFO-ram area should not be cached since transactions are not propagated to the processor bus and the cache thereby not will be consistent.

Care should also be taken if the PUs are configured to operate in the SDRAM memory where consistency problems also may appear in case of write-back caching.

Little endian is used for all registers/memory.This means that the least significant byte is at the lowest address. In processor memory mapping all memory areas are controlled by the system controller which provides large flexibility regarding their location in the processor memory space. See [19] for details.

FIG. 32 lists the allocation of Chip-selects

The memory area of the FPGAs will consist of two major blocks:

FIFO-Ram which provides a direct access to the SRAM attached to the FPGA. The lower 2 MB of the addresses are used for this purpose.

Register area. The upper 2 MB block is used for this area.

Address bit 21 will be used to determine which area to access. This provides 2 MBytes for each area with the FIFO-ram at the lowest addresses. This will also mean that the areas will be mirrored if more than a 4 MB window is allocated for this purpose.

Regarding the PU memory map/view, the PUs shall primarily work in the local SRAM, it is however possible to have the source or destination buffer outside this scope. Use of external memory is indicated with dedicated bits in the PD.

Access to external memory is only allowed for:

Source buffer/header where start and end pointer is defined—i.e. the source data may not be provided dynamically by a previous PU since the length is not known until processing is complete.

Destination buffer.

Since the access to external memory is provided by the source and destination buffer of the bridge is it only possible for one PU to have read access and one PU to have write access at a time.

The above limitations implies that all configuration data (PDs, keys etc.) must be in the SRAM.

The actual access to external memory is performed by bridge-blocks which may utilize DMA or busmastering on the processor bus in order to perform the transfer.

The PCI-interface is based on the Pajero system controller which provides a bridge between the PCI interface and the processor- and device-bus.

Access to external memory—including PCI-memory—is provided by means of the BridgeRead and Bridge Write PUs.

The BridgeRead and BridgeWrite will be arbited by a PU when it has a buffer located in external memory. After configuration of the entities, they will initiate a DMA-transfer and provide/consume the data from the PU.

The DMA-transfer may be to the local memory—such as SDRam or it may be to the PCI-bus whereby memory in the host system can be accessed.

Configuration of PCI space provides good flexibility regarding which memory-spaces should be present/configurable in the PCI configuration space.

See [19] for details.

Use of the Power-management configuration registers and boot-rom may be considered. The register regions in the register space consist of blocks of 256 words (8 word address bits)—one block for each PU or other functional block. The order of the blocks for the PUs is determined by their PUID.

As mentioned earlier, address bit 21 is used to indicate access to the local FIFO-ram or register access. This results in the fields of the address fields listed in FIG. 33.

Common registers listed in FIG. 34 are registers which are common to most PUs.

Some of the above registers are described further in the following sections. The addresses are defined in the VHDL-files.

For the signaling of more data to make sense between the PUs., it is obvious that:

CurrentPU.DBI1=NextPUID.SBI1 and CurrentPU.DBI2=NextPUID.SBI2, it is therefore only the SBI values which are stored for each PU since the destination DBI easily may be derived when the next PU is known.

SBI1 and SBI2 are each represented by 8 bits as defined in FIG. 35. The fields define the counter values in increments of 32 bits. It should be noted that at least the specified amount of data must be available before signaling of Go.

For proper signaling, it is required that SBI2>0, but it is acceptable that SBI1=0—this will simply result in an immediate activation of the next PU.

Detailed configuration and operation information is described below in regards to data structures and registers of the board which are used for programming.

The FIG. 36 lists identifiers—PUID—of all the PUs. These are used to identify the PUs and other units on the management bus and for identification in the PDs.

The (*) marked rows in FIG. 36 are not implemented in the FPGA, but might be included in ASIC—probably by means of a dedicated processor. These units will perform analysis of the header/decrypted data and setup processing. This task is currently performed by the local processor.

The following sections describe the signals which may be send on the management bus first in terms of all the available signaling, and then sections which defines signaling protocols for specific purposes.

Refer to description above for a general description of the management bus.

FIG. 37 gives a signal overview, which defines the currently identified signals to be transferred on the management bus. For all commands except ExtMemAcc and RegAccess, an access to the FIFO-memory will also take place. NOP transactions on the bus may be generated by deasserting Rd_L and Wr_L. Each command has a source which always is the active master of the local bus and a target. Each is identified by their PUID. The command is identified by 4 bits.

The result/status of each command/signal is indicated by the target by one of the results listed in FIG. 38. Note in FIG. 37, that RegAccess and ExtMemAcc can be interpreted as a cycle-modifier on the local bus to force a register access or read/write to external memory. All cycles where one of these signals are not present will be interpreted as access to the FIFO-ram.

The identifiers of the source and target for the PUs follows the PUID.

The Control-unit provides a bridge between the Device-bus and the FIFO/Management bus. The following access may be performed by the CPU:

CPU-access to the FIFO-ram. This is provided by means of a 2 MB window.

CPU-access to registers. This is provided by another 2 MB window.

CPU-generated management bus cycles. These allows the CPU to reset and resume individual PUs.

The request/arbitration of a PU is required before the actual processing of a PD can start. Since (almost) all PUs can request another PU, it must be ensured that only one grants the ownership and writes the PD pointer to the PDPtr register of the next PU.

This request/arbitration is achieved by means of the PUReq signal and the following result based on the following rules:

1. Any PU may send a PUReq (providing it actually wants the PU).
2. The target PU of the request will reply with an OK status if it can accept the request otherwise it will reply with Busy. The requesting PU uses this status to determine whatever the request was acknowledged or not.

A state machine (PUReq) which requests a PU according to the above rules is shown in FIG. 21 and the actions in the states are listed in FIG. 39.

The target PU must obviously always respond to the PUReq signal. A OK will be the response if the PU is ready to process a new PD—otherwise the response shall be Busy.

Below describtion describes the processing descriptor (PD). The PD consist of a number of sections (PDS) where each section contains configuration data for a PU. The following sections provides an overview, further details are available in the specifications of each of the processing units.

The FIGS. 40, 43 to 64, 66 to 77 and 79 defining the contents contains a 'type' column which indicate who are intended to write to the field.

Most of the PUs have some kind of source data and destination data. The source data may be represented as a header section and a source buffer. Splitting the source data in a header and a source buffer allows a fixed image to be used without the need for it to be continuous with the remaining data to be processed.

The matrix in FIG. 41 outlines the differences in the handling of the header and source buffer.

A source buffer end pointer is written to the PDS section of the next PU when the current PU has completed processing. Passing the end of the buffer in this way makes it possible to setup a pipelined processing although it may not be possible to predict the resulting length of the output data when the processing is initiated.

The buffers is represented by a pointer to the first word and—in some cases—a pointer to the last word/octet. A buffer is empty if the start address is greater than the end address.

All read- and write operations is performed in units of 32 bits on aligned addresses (i.e. bit 1..0=00). Unaligned access does therefore add complexity to the hardware. The requirements regarding the alignment is defined in the matrix listed in FIG. 42.

Since all headers seem to be an increment of 32 bits, it should not be a problem to require alignment of header start and end. The start of a buffer should also be aligned whereas the end does not need to be aligned. It should be noted that the end of the buffer does not need to be aligned. Such a requirement would also require the length of the buffer to be an increment of 32 bits which would not be acceptable.

It should be noted that a full 32 bit write operation will take place at the end of the buffer although 32 bits of valid data might not be present. The remaining bits are therefore undefined.

The IP-header adjustment in connection with transmission is one exception since fields smaller than 32 bits needs to be adjusted in the header. A read-modify-write operation is used for this purpose.

To simplify the following description, fields which are common to most of the PDS are described in FIGS. 43 and 44.

NextPUID3..0
Indication of the next PU in the processing order.
HdrExt
The header is located in external memory. Does only apply if a header is used by the PU.
SrcExt
The source buffer is located in external memory.
DestExt
The destination buffer is located in external memory.

Since some information always is required and some information needs to be passed from one PU to another, a number of fields have a fixed offset within the PDS. These fields are located in the beginning of each PDS and are listed in FIG. 45.

To simplify the following description, fields which involve encryption PDS are described in FIGS. 46 and 47.
ESPTrail
1: ESP trailer (Padding and Next header field) will be added as input to the encryption processing. The trailer will not be written to the source buffer.
IVCopy
1: The initialization vector is copied to the destination buffer as the very first data.
0: The initialization vector is not copied to any location.
IVWB
1: The last block of data (typically 64 bits) is written back to the IV-field of the key-section. This provides an easy way to implement a reuse of the last encrypted data as the initialization vector for the next datagram.
0: The last data is not written to other locations.
NextHdr7..0
Value of next header field in ESP trailer.
PadLen7..0
Minimum padding length. 0 will add as little padding as possible.
Note: -It must be possible to generate padding which at least is as long as PadLen. This field should therefore not be set higher than 256-BlockLen, where BlockLen is the block length of the encryption algorithm.
It is recommended to set this field to 0 unless it is desired to hide the actual payload length.
The HW will not notify in case of illegal setting.

To simplify the following description, fields which involve decryption PDS are described in FIGS. 48 and 49.
ESPTrail
1: ESP trailer (Padding and Next header field). When set, the ESP-trailer will not be included in the destination buffer and the NextHeader field will be extracted and written to the Status field
IVWB
1: The last data being read will be copied to the IV-field in the key section. This allows continuation on a fragmented datagram.
0: The last data will not be written to any additional location.
IVSource
1: The first block of the data is used as initialization vector (typically 64 bits).
0: The IV field of the key section is used as initialization vector.
NextHdr7..0
Value of next header field in ESP trailer.
PadLen7..0
Maximum expected pad-length.
Since the actual payload length is unknown until the padlength field is decrypted, the PU will not report the last MaxPadLength+2 octets ready to the next PU until the pad-length is determined.
A conservative setting is 255.
A optimistic setting assuming that no unnecessary padding is present is Blocklength-1, where BlockLength is the block length of the encryption algorithm.
See the detailed description regarding ESP trailer handling below for details.

The KeyPtr field of the PDS is used to reference a block containing keys and initialization vectors. This is an efficient way to indicate the keys which typically will be reused for many datagrams (depending on the parameters of the security association). It also provides an efficient passing of initialization vectors.

The block contains the fields listed in FIG. 51.

Care must be taken during handling of an ESP trailer, since the en/decryption operation will typically require that the data is some increment of a given block size in order to operate correctly. In the ESP specification [8], this problem is solved by adding padding in the end of the payload as illustrated in FIG. 22.

Since the length of the cleartext not necessarily can be predicted (for example if it is the result of compression), the software is not able to generate the padding and place the Next Header field correctly before the compression is complete. It is therefore desirable to have the padding and Next Header fields generated automatically since the processing otherwise would need to be stalled and resumed when the padding is added by software.

Similarly, it is desirable that the decryption algorithm only reports the actual amount of payload data to the next PU. The Next Header field is passed as a part of the status information in the PD, but may also be read from the destination buffer.

This hardware support does thereby provide a trailer handling without any intervention from the software.

During trailer generation in connection with encryption, it is decided not to write the contents of the generated fields to the source buffer because:

They will probably not be required for by any other processing.

They would be added to the source buffer of the encryption unit. This will be inpractical if the source buffer is a payload located in system memory which not necessarily has space for the additional data. This will typically be the case if the data is supplied directly from some upper application layer in the protocol stack.

It would break the general rule of the source buffer being read only and the destination buffer being write only.

The above functionality is specific for the ESP and will probably not be usable for any other protocols. The padding is an incrementing sequence of bytes starting at I as defined in [8].

Although it probably generally is desirable to have as little padding as possible, it is possible to specify a minimum amount of padding for the encryption (MinPadLength). A similar field exist for the decryption (MaxPadLength). This field must be present for the decryption since the padding may not be passed to the next PU. This field thereby determines how many octets will be hold until the decryption is complete and the actual padding length is known.

It may be considered to perform padding verification on reception. Authentication involves calculation PDS. To simplify the following description, fields which involve calculation PDS are described in FIGS. 52 and 53.

AlgID3.0
    Authentication algorithm identification

KeyPtr
    Pointer to block with specific information for the authentication.

AuthStartPtr
    Start location of authentication value if AuthAppend=0.

AuthApp
    1: Append authentication value to the end of the source buffer (i.e. SrcBufEndPtr)
    The SrcBufStartPtr of the next PU will be updated with the address of the octet immediately after the authentication value.
    0: Write the authentication value to location indicated by DestBufStartPtr Although the Authentication calculation unit does not have an explicit destination buffer, it shall behave as it had regarding signaling to the next PU. This includes:

Perform arbitration of the next PU

Signal go to the next PU as data become available in the source buffer. This may be done by signaling go as data is being read.

Write the end of the source buffer—possibly including the authentication value if AuthApp=1—to the SrcBufEndPtr field of the PDS of the next PU.

Signal Complete to the next PU.

This allows the next PU (fx. Ethernet transmission) to process data as soon as they are valid.

Further fields which involve verification PDS are described in FIGS. 54 and 55.

AuthStartPtr
    Start location of authentication value if AuthAppend=0.

AuthAppend
    1: Authentication value is located at end of source buffer. (i.e. SrcBufEndPtr)
    0: Authentication value is located at AuthStartPtr.

Although the Authentication calculation unit does not have an explicit destination buffer, it shall behave as it had regarding signaling to the next PU. This includes:

Perform arbitration of the next PU

Signal go to the next PU as data become available in the source buffer. This may be done by signaling go as data is being read. If AuthApp=1, the authentication value shall not be regarded a part of the source buffer and may therefore not be included in the go-signaling.

Write the end of the source buffer. If AuthApp=1, the authentication value may not be included in the end pointer value.

Signal Complete to the next PU.

This allows the next PU (fx. data decryption) to process data as soon as they are valid.

In interrupt shall be generated if the authentication verification fails. The processing will stop to allow the CPU read the PD and take further action. It may be considered to indicate the failure in the PDS. This will reduce the overhead of the CPU in case of excessive authentication failures. This policy would however require that the software inspects the result of the result of authentication.

The authentication algorithm configuration involves a detailed configuration of the encryption and decryption algorithm, which is performed in a separate block indicated by the ConfPtr in the two authentication PDS. FIGS. 56 and 57 list possible configurations.

AlgID3..0
    Authentication algorithm identifier. TBD

AlgOpt7..0
    Further options for Authentication algorithm configuration. TBD

BlkLen2..0
    Length of authentication check value. The length is given in increments of 32 bits.
    This value may be given implicity by the AlgID field in which case this field is ignored.

BeginConf
    Configuration to perform before beginning of calcuation:
    0: Do not perform configuration before start (used for continuation).
    1: Do perform a complete configuration before start.

EndConf

Configuration/state writeback after completion.
 0: No action
 1: Write internal configuration to Config field. Used to store state for continuation on a new buffer.

Key

Key for the authentication algorithm. Interpretation and size depends on the AlgID field.

Config

Internal configuration data for the authentication algorithm. Use is controlled by the StartConf and EndConf fields in combination with the authentication algorithm.

To simplify the following description, fields which involve compression PDS are described in FIGS. 58 and 59.

AlgID3..0
 Compression algorithm identifier.
 Set to 0 for LZS.

AlgOpt7..0
 Options for compression algorithm. Interpretation depends on AlgID field.
 None is defined for LZS.

Init
 1: Perform full initialization of compression algorithm/history window for LZS (i.e. 'empty history window).
 0: No initialization—typically used for continuation where the existing history window is reused.

CompDet
 If 1, the first part of the compression will be monitored. This PU does also provide support for an end indication of the destination buffer. If the destination data should exceed the destination buffer, an interrupt will be generated. This end indication may be used to detect if the compression of the data results in an expansion.

CompDet is used to enable a compression detection and determine if data should be compressed or not. If sufficient compression is achieved, all data will be compressed and written to the destination buffer starting at DestBufStartPtr. If the compression is insufficient, all data will be copied to the destination buffer now starting at AltDestBufPtr. In addition the AltTxConfig will be copied to the ConfigBase field of the Ethernet transmit PDS. Copying this field allows a pipelined transmission of the frame since the length can be predicted when compression is not being used.

Use of the alternate destination buffer start allows fx. the compression header to be overwritten. The remaining processing can thereby take place without further configuration from the CPU.

If CompDet is set, Go will not be signaled to the next PU until it is determined whatever the compression is sufficient (and—obviously DBI1 data are available). The compression criteria is configured by the register interface of the compression PU.

To simplify the following description, fields which involve decompression PDS are described in FIGS. 60 and 61.

AlgID3..0
 Decompression algorithm identifier. TBD

AlgOpt7..0
 Options for decompression algorithm. Interpretation depends on AlgID field. TBD Init
 1: Perform full initialization of decompression algorithm.
 0: No initialization - typically used for continuation.

The end-pointer for the destination buffer is primarily intended to avoid that the allocated memory is being overwritten. If the output data should exceed the destination buffer, it is possible to resume the decompression with a new buffer configuration.

The InQueue and OutQueue are PUs which provides administration of PDs which are to be processed, are partially processed or which have been completed. The Outqueue is also an important part of the PD allocation since it collects completed PDs which will be used by the Ethernet receive PU on reception of Ethernet frames.

The PD, register interface and operation of the InQueue is defined below.

Register Interface

In order to avoid the problems related to mutual exclusion of the in queue maintenance, new PDs to be inserted in the queue are added by writing the pointer to the PD to the queue register defined in FIG. 62.

The HW will perform the maintenance of the queue. The Link field in the beginning of the PD is used to link the PDs.

InQueue PDS

To simplify the following description, fields which involve inqueue PDS are described in FIGS. 63 and 64.

The PrevPU field is used to indicate which PU—if any is providing the data. This field is used only if synchronization with the previous PU is required. In this case, it must be ensured that the previous PU is either processing the data or that it has completed the processing of the PD (in which case the PrevPU field is redundant, and may be set to NoPU).

The processing of the PDs in the queue may be divided in two cases:

All Source data are ready for processing. This is typically the case if some data is to be transmitted from some upper application layer.

A previous processing unit is generating data. In this case the startup of the next PU requires special care since the PUs has not been synchronized from the start. It must be ensured that at least SBI1 data is available for the Next PU before the PD is entered in the queue. This case typically applies to processing of Ethernet frames where the processing cannot be determined until the header is available. This may also apply to decryption and decompression where further processing may start as soon as the header is revealed.

Each of the cases are detected by the hardware and handled as defined below.

InQueue Operation

Activation of the Next PD is controlled by the state machines shown in FIG. 23 and the states for InQueue1 are defined as listed in 41. The InQueue2 state machine is used to monitor the state of the previous PU in order to detect whatever it has initiated processing of a new PD since InQueue1 was in the LoadPUID state.

The PD, register interface and operation of the OutQueue is defined below.

Outqueue actually consist of two queues: a Go and a Complete queue. A PD is placed in the Go queue on the first Go (for each PD) and a PD is placed in the Complete queue on complete signaling.

A PD is collected in the queue simply by indicating OutQueue as the next PU. It is possible to configure whatever an interrupt shall be asserted when one of the queues contain PDs.

The Go queue is intended for the CPU to examine the first part of output data in order to determine the following processing of the data. The SBI1 value should be set accordingly for this purpose.

Registers Interface

The OutQueue is used to collect PDs. New PDs are always appended to the end of the queue. Two registers are used for maintenance of the queue and these are listed in FIG. 66. The format of the Address/pointer field is listed in FIGS. 67 and 68.

GoEnb and ComplEnb are used to enable the Go and Complete queue. When the queue is disabled, no PDs will be added.

GoIntr and ComplIntr are used to enable interrupt for the Go and Complete queue. If interrupt is enabled, it well be asserted as long as there are PDs in the Queue.

GoRdy and ComplRdy indicates whatever the next element of the queues may be read. This bit must be cleared before a valid read of the queue can take place.

It is important to note, that scheduling a PD which is being processed in the Inqueue might imply that the final complete is not signaled to the Outqueue. This is because the active PU is forced to signal to an other PU in case of a sync command.

OutQueue PDS

The outqueue only contains a field for the SrcBufEnd and a link field for the Go queue. The link field of the general section of the PD is used for the Complete queue. Offset, size, type, name and description is listed in FIG. 69.

Below a detailed description of the Ethernet and address filter is provided starting with Ethernet transmission and IP compensation PDS. This processing unit provides two functions:

IP header compensation. A length field may be written and a checksum according to IPv4 may be calculated.

Transmission of Ethernet frame. Some of the fields may be generated automatically or the raw frame may be transmitted.

The PDS is listed in FIGS. 70 and 71.

IPChk
    1: Checksum will be calculated on the header section and written according to the IPv4 specification.
    0: No checksum will be calculated and written. A read-modify-write cycle is used to write the checksum.

IPLenCalc
    1: The length field is calculated based on the transmitted data: HdrEndPtr-HdrStartPtr+SrcBufEndPtr-SrcBufStartPtr+2
    0: The length is set to the value specified by Length.

IPLen 1: Datagram length will be written starting at location HdrStartPtr+IPOfs.
    0: No datagram length will be written.
    The length field is 16 bits and is written by means of a read-modify-write cycle, other PUs may therefore not have access to the header while this PU is active.

IPOfs
    Offset relative to start of header indicating where length shall be written as defined above. This field provides flexibility in the location and may thereby be used for IPv4 and IPv6.
    This is a byte-offset LenT
    1: The length field of the MAC frame is written based on the MAC-payload length.
    0: The value of the type is written to the type field of the MAC-frame.

DestAddr
    Destination MAC address of frame.

Pipelined transmission may take place if all data of the IP header is available—otherwise transmission will not start until the final length is known. In case of transmission errors, an interrupt will be generated and further transmission will be suspended. The CPU must resolve the situation.

The Ethernet frame generation is described further in FIG. 24. The frame may either be passed as raw data including all the fields, or the hardware may build the frame as defined by the PDS. The interpretation and generation of the fields is as follows:

Preamble
    Bit sequence used to synchronize reciver.

SFD
    Start Frame Delimiter. Indicates start of frame.

Dest addr
    Destination MAC address of frame. This field is read from the
    DestAddr field of the PDs.

Src Addr
    Source MAC address.

Length/Type
    This field has two interpretations: Either a length indication of a type indication.
    LenT determines whatever a specified value shall be written or the value shall be the length of the payload.

Payload
    Payload which consist of the header data followed by the source buffer.

PAD
    This field shall be added for short frames.

FCS
    Frame Check Sequence. 32 bit CRC calculated on the MAC-frame.

For further details, refer to [17].

The interface to the MAC-controller is provided by transparent registers.

The Ethernet Receiver must always be able to receive data. A special buffer arrangement is therefore provided. A register interface allows the CPU to define a memory space (in FIFO-memory) where received data shall be written. On reception of a PD, a PD will be fetched from the complete queue and the start, of the buffer will be written. When DBI1 of Out queue words have been received, it will be placed in the Go-queue for analysis by the CPU. When the entire Ethernet frame has been received, Complete will be signaled.

The reception of the next Ethernet frame will continue from the next word in the receive buffer. Two limits are defined for the buffer: An early warning limit which generates an interrupt to the CPU. This allows the CPU to configure a new buffer before the end limit is reached. Writing will not take place beyond the end limit.

The PDS of the Ethernet receiver is defined by FIGS. 72 and 73.

NextPUID3..0
    This field is initially ignored since the destination on the first go always will be Outqueue.
    The software may configure this field according to the required processing. This field will then be written when the PD is placed in InQueue.

The MAC address of the transmit and receive section of the two processing blocks are defined by the registers listed in FIG. 74.

Ethernet frames with the configured address will always be received independently of the Address filter configuration.

The transmit MAC address is added to frames which are transmitted.

Configuration of Receive MAC Address filter is performed by controlling the address filter by means of 2 registers to represent the MAC address and to provide status/control information. FIGS. 75 and 76 list the registeres and controls.

CMD2 ..0
Command:
000: No operation
001: Insert address specified by the MAC0 register and MAC47..32 of this register.
010: Remove address specified by the MAC0 register and MAC47..32 of this register.
011: Remove all addresses in the filter No command may be issued while the Busy bit is set.

Mode
Sets the operation mode of the filter:
0: Negative mode
1: Positive mode

Busy
Indicates whatever a maintenance (Initiated by CMD) operation is in progress:
1: Address filter maintenance is in progress
0: Address filter maintenance has completed.
New command may not be issued while this bit is set.

The bridge provides access to external memory by means of a source and destination buffer functionality. This is the only way the PUs can access external memory. The source and destination buffer are similar to the other PUs, they just lack a PDS and does not perform any processing themselves.

Configuration is performed by means of registers and read/write of data is performed by use of the ExtMem command. The following status of the cycle will indicate whatever the transfer was successful or not.

All read- and write access is performed as a complete word. The lower two bits of the address is therefore ignored during addressing, but they are included in the determination of the byte level end of the source buffer.

The register interface and detailed operation is provided in below description.

Source Buffer Register Interface

The registers listed in FIG. 78 are provided for the source buffer.

Source Buffer Operation

Before operation of the source buffer can start, it must be granted and the start and end address must be configured. The read operations are performed with the ExtMemAcc command. The result may be one of the listed results in FIG. 79.

The buffer will automatically be released (ready to be requested by another PU) when the end of the buffer has been reached.

Destination Buffer Registers

The registers listed in FIG. 80 are provided for the destination buffer.

Destination Buffer Operation

The destination buffer must be granted and the start and end address must be defined before processing can start.

The write operations are performed with the ExtMemAcc command. The result may be one of the results listed in FIG. 80.

In opposite to the Source buffer, the destination buffer is not released (ready to be requested by another PU) when the end of the buffer is reached. This allows an easy resumption where the BufEnd register is rewritten and writing to the buffer may proceed.

References

[1] IPSec, IP Security. Security Architecture for IP. RFC 2401
[2] IPComp RFC2393
[3] IPv4 Internet protocol version 4.RFC0791
[4] IPv6 Internet protocol version 6.RFC2460
[5] Conference papers provided by Kasper Langkilde.
[6] IPsec DOI: IP Security Domain of Interpretation. RFC 2407. Provides further details about the requirements to the associations which are established for IPComp and IPSec.
[7] IP Authentication Header. RFC 2402.
[8] IP Encapsulation Security Payload (ESP), RFC 2406.
[9] IP Payload compression using Deflate, RFC 2394
[10] IP Payload compression using LZS, RFC 2395
[11] Deutsch, P. Deflate compressed data format specification version 1.3. RFC 1951.
[12] ANSI, American National Standards Institute, Inc., "Data Compression Method for Information Systems," ANSI X3.241–1994, August 1994. Describes the LZS compression/decompression algorithm.
[13] PCI specification 2.2
[14] The ESP DES-CBC Cipher Algorithm, RFC 2405.
[15] IDT79RC32364 RISC Controller Hardware Users Manual, Version 1.0, August 98.
[16] IDT79RC32164 RISCCore 32300 Family system controller chip. Hardware reference manual. Version 1.0 March 99
[17] IEEE 802.3, 1998 Edition. Part 3: Carrier sense multiple access with collision detection (CSMA/CD) access method and physical layer specifications.
[18] NEC VR4310 User's Manual. NEC Corporation Document No. U10504EJ5V0UM00 (6th edition), June 1999
[19] Galileo GT64115. Datasheet Revision 1.0 July 1, 1999.

Abbreviations

AH Authentication Header
ESP Encapsulated Security Payload
FSM Finite State Machine
IPSec IP Secure
LAN Local Area Network
NIC Network Interface controller/card. Also used to denote the NIC option of the board.
SA Security Association
VPN Virtual Private Network Also used to denote the NIC option of the board.
Abbreviations created for this document:
CU Control Unit
DBE Destination Buffer End (pointer)
DBI Destination Buffer Increment. Figure indicating how many data a PU must produce before Go can be signaled to the following PU.
DBS Destination Buffer Start (pointer)
IIP Internet Inbound Processing. Usually refers to hardware dedicated to the processing of data received from the internet.
IOP Internet Outbound Processing. Usually refers to hardware dedicated to the processing of data to be transmitted on the internet.
MAC Media Access Control
PD Processing Descriptor
PDS Processing Descriptor section. A section of the PD which configures a given PU.
PU Processing Unit (such as compression, encryption etc.).
PUID Processing Unit Identifier, for example used in the PD.
SBE Source Buffer End (pointer)
SBI Source Buffer Increment. Increment value for each go. Divided in first and following go-signals.
SBS source buffer start (pointer)

SM State machine (effectively a FSM/Finite State Machine)
SSM Sub State Machine
VFC Virtual Fifo Count

What is claimed is:

1. A communication controller for performing data encryption and data decryption of data communication packages to be transferred in a network (such as a LAN: Local Area Network, or a WAN: Wide Area Network), said data communication package containing a first section of non-encrypted data and a second section containing encrypted data, and comprising a session key LUT unit (186) and a transmission and encryption section comprising:

(a) a data read transmission control unit (102) connected to a system bus of a host system and receiving input data therefrom and communicating with said session key LUT (186), said session key LUT (186) providing a transmission encryption key for said data communication package, (b) a data compressing unit (118) providing compression of a part of said input data thereby producing a compressed part of said input data contained in said second section of said data communication package, (c) a data encryption unit (126) providing an encryption of said second section of said data communication package according to said transmission encryption key transferred from said session key LUT (186) to said data encryption unit (126), (d) an integrity check value calculation unit (122) constituting a first series configuration from said data compression unit (118) intercommunicating through said integrity check value calculation unit (122) to said data encryption unit (126), (e) a network transmission controller (134) providing said data communication package through a connection to said network, supplying said input data to said network in a transmission rate determined by said network transmission controller (134) and said network, and (f) a first switch means (108) enabling switching between two modes of operation, a first mode of operation providing bypassing or disabling of said first series configuration and enabling communication between said data read transmission control unit (102) and said network transmission controller (134) for transferring said input data directly hereto and a second mode of operation enabling communication between said data read transmission control unit (102) through said first series configuration to said network transmission controller (134), said communication controller further comprising a receiving and decrypting section comprising:

(g) a network receiving controller (140) providing a connection to said network and receiving a received data communication package from said network, (h) a data receiving control unit (148) receiving said received data communication package through communication with said network receiving controller (140), and communicating with said session key LUT (186), said session key LUT (186) providing a reception encryption key for said received data communication package, (i) a data decompression unit (172) providing decompression of said second section of said received data communication package, (j) a data decryption unit (164) providing a decryption of said second section of said received data communication package according to a reception encryption key transferred from said session key LUT (186) to said data decryption unit (164), (k) an integrity check value verification unit (168) receiving said received data communication package from said data decryption unit (164), and constituting a second series configuration from said data decryption unit (164) intercommunicating through said integrity check value verification unit (166) to said data decompression unit (172), said integrity check value verification unit (166) transferring said second section of said received data communication package to said data decompression unit (172), (l) a data write unit (180) connected to said system bus of said host system, supplying said system bus with said received data communication package, and (m) a second switch means (154) enabling switching between two modes of operation, a third mode of operation providing bypassing or disabling of said second series configuration and enabling communication between said data receiving control unit (148) and said data write unit (180) for transferring said first section of said received data communication package directly hereto, and a fourth mode of operation enabling communication between said data receiving control unit (148) through said second series configuration to said data write unit (180).

2. The communication controller according to claim 1, said transmission and encryption section further comprising a transmission FIFO (130) (first in first out storage means) constituting an input section of said network transmission controller (134).

3. The communication controller according to claim 1, said receiving and decrypting section further comprising a write FIFO (176) receiving said received data communication package from said data receiving control unit (148) in said third mode of operation, receiving said received data communication package from said data decompression unit (172) in said fourth mode of operation and transferring said received data communication package to said data write unit (180), and a receiving FIFO (144) receiving said received data communication package from said network reception control (140) and transferring said data communication package to said data receiving control unit (148).

4. The communication controller according to claim 2, said data compression unit (118) and said data encryption unit (126) being adapted to be operated substantially simultaneously and controlled by said network transmission controller (134) so as to guarantee the continuous supply of bytes from said transmission FIFO (130) to said network transmission controller (134).

5. A communication controller for performing data encryption and data decryption of data communication packages to be transferred in a network (such as a LAN: Local Area Network, or a WAN: Wide Area Network), said data communication package containing a first section of non-encrypted data and a second section containing encrypted data, and comprising a session key LUT unit (186) and a transmission and encryption section comprising:

(a) a data read transmission control unit (102) connected to a system bus of a host system and receiving input data therefrom and communicating with said session key LUT (186), said session key LUT (186) providing a transmission encryption key for said data communication package, (b) a data compressing unit (118) providing compression of a part of said input data thereby producing a compressed part of said input data contained in said second section of said data communication package, (c) a data encryption unit (126) providing an encryption of said second section of said data communication package according to said transmission encryption key transferred from said session key LUT (186) to said data encryption unit (126), (d) an integrity check value calculation unit (122) constituting a first series configuration from said data compression unit (118) intercommunicating through said integrity check value calculation unit (122) to said data encryption unit (126), (e) a network transmission controller (134) providing said data communication package through a connection to said network, supplying said input data to said network in a transmission rate determined by said network transmission controller (134) and said network, and (f) a first switch means (108) enabling switching between two modes of operation, a first mode of operation providing bypassing or disabling of said first series configuration and enabling communication between said data read transmission control unit (102) and said network transmission controller (134) for transferring said input data directly hereto and a second mode of operation enabling communication between said data read transmission control unit (102) through said first series configuration to said network transmission controller (134), said communication controller further comprising a receiving and decrypting section comprising:

(g) a network receiving controller (140) providing a connection to said network and receiving a received data communication package from said network, (h) a data receiving control unit (148) receiving said received data communication package through communication with said network receiving controller (140), and communicating with said session key LUT (186), said session key LUT (186) providing a reception encryption key for said received data communication package, (i) a data decompression unit (172) providing decompression of said second section of said received data communication package, (j) a data decryption unit (164) providing a decryption of said second section of said received data communication package according to a reception encryption key transferred from said session key LUT (186) to said data decryption unit (164), (k) an integrity check value verification unit (168) receiving said received data communication package from said data decryption unit (164), and constituting a second series configuration from said data decryption unit (164) intercommunicating through said integrity check value verification unit (166) to said data decompression unit (172), said integrity check value verification unit (166) transferring said second section of said received data communication package to said data decompression unit (172), (l) a data write unit (180) connected to said system bus of said host system, supplying said system bus with said received data communication package, and (m) a second switch means (154) enabling switching between two modes of operation, a third mode of operation providing bypassing or disabling of said second series configuration and enabling communication between said data receiving control unit (148) and said data write unit (180) for transferring said first section of said received data communication package directly hereto, and a fourth mode of operation enabling communication between said data receiving control unit (148) through said second series configuration to said data write unit (180), and said data read transmission control (102) being adapted to monitor the compression and encryption of said part of said input data for determining whether or not said part of said input data exceeds the amount of data containable within said second section of data communication package.

6. The communication controller according to claim 5, said integrity check value calculation unit (122) performing a subtraction, division, multiplication or preferably a summation of the data contained in said second section of said data communication package to be transmitted and adding a first integrity check value to said second section of said data communication package.

7. The communication controller according to claim 5, said data read transmission control unit (102) comprising control means for controlling said first switch means (108) in said two modes of operations.

8. The communication controller according to claim 5, said integrity check value verification unit (122) performing a subtraction, division, multiplication or preferably a summation of the data contained in said second section of a received data communication package obtaining a second integrity check value and comparing said second integrity check value with said first integrity check value contained in said second section of said received data communication package.

9. The communication controller according to claim 5, said data receiving control unit (148) comprising control means for controlling said second switch (154) in said two modes of operations.

10. The communication controller according to claim 5, said data read transmission control unit (102) further enabling communication to said data encryption unit (126) for transferring said transmission encryption key provided by said session key LUT (186) from said data read transmission control unit (102) to said data encryption unit (126).

11. The communication controller according to claim 5, said session key LUT (186) comprising encryption key information updated according to a key management protocol by said host system.

12. The communication controller according to claim 5, said communication controller for receiving and transmitting data communication packages on a network providing interrupt routines for units included in said communication controller hereby insuring a continuous data transmission on a network.

13. The communication controller according to claim 5, wherein said communication controller is implemented fully or partly as an integrated circuit applying VLSI, LSI, ASIC, FPGA, PLD techniques or any combinations thereof.

14. The communication controller according to claim 5, wherein said data compression unit (118) adds flag and fragment ID trailing said compressed part of said input data in said second section of said data communication package.

15. The communication controller according to claim 14, wherein said data decompression unit (170) extracts flag and fragment ID trailing said compressed part of input data contained in said second section of said data communication package.

16. The communication controller according to claim 5, said transmission and encryption section further comprising a transmission FIFO (130) (first in first out storage means) constituting an input section of said network transmission controller (134).

17. The communication controller according to claim 16, said network transmission controller (134) controlling said transmission FIFO (130) so as to guarantee the continuous supply of bytes from said transmission FIFO (130) to said network transmission controller (134).

18. The communication controller according to claim 5, said receiving and decrypting section further comprising a write FIFO (176) receiving said received data communication package from said data receiving control unit (148) in said third mode of operation, receiving said received data communication package from said data decompression unit (172) in said fourth mode of operation and transferring said received data communication package to said data write unit (180), and a receiving FIFO (144) receiving said received data communication package from said network reception control (140) and transferring said data communication package to said data receiving control unit (148).

19. The communication controller according to claim 5, said data compression unit (118) and said data encryption unit (126) being adapted to be operated substantially simultaneously and controlled by said network transmission controller (134) so as to guarantee the continuous supply of bytes from said transmission FIFO (130) to said network transmission controller (134).

20. A transmission and encryption section of a communication controller for performing data encryption and data decryption of data communication packages to be transferred in a network (such as a LAN: Local Area Network, or a WAN: Wide Area Network), said data communication package containing a first section of non-encrypted data and a second section containing encrypted data, and said communication controller comprising a session key LUT unit (186), and comprising:

(a) a data read transmission control unit (102) connected to a system bus of a host system and receiving input data therefrom and communicating with said session key LUT (186), said session key LUT (186) providing a transmission encryption key for said data communication package, (b) a data compressing unit (118) providing compression of a part of said input data thereby producing a compressed part of said input data contained in said second section of said data communication package, (c) a data encryption unit (126) providing an encryption of said second section of said data communication package according to said transmission encryption key transferred from said session key LUT (186) to said data encryption unit (126), (d) an integrity check value calculation unit (122) constituting a first series configuration from said data compression unit (118) intercommunicating through said integrity check value calculation unit (122) to said data encryption unit (126), (e) a network transmission controller (134) providing said data communication package through a connection to said network, supplying said input data to said network in a transmission rate determined by said network transmission controller (134) and said network, and (f) a first switch means (108) enabling switching between two modes of operation, a first mode of operation providing bypassing or disabling of said first series configuration and enabling communication between said data read transmission control unit (102) and said network transmission controller (134) for transferring said input data directly hereto and a second mode of operation enabling communication between said data read transmission control unit (102) through said first series configuration to said network transmission controller (134).

21. The transmission and encryption section further comprising a transmission FIFO (130) (first in first out storage means). constituting an input section of said network transmission controller (134).

22. The transmission and encryption section according to claim 21, said data compression unit (118) and said data encryption unit (126) being adapted to be operated substantially simultaneously and controlled by said network transmission controller (134) so as to guarantee the continuous supply of bytes from said transmission FIFO (130) to said network transmission controller (134).

23. A transmission and encryption section of a communication controller for performing data encryption and data decryption of data communication packages to be transferred in a network (such as a LAN: Local Area Network, or a WAN: Wide Area Network), said data communication package containing a first section of non-encrypted data and a second section containing encrypted data, and said communication controller comprising a session key LUT unit (186), and comprising:

(a) a data read transmission control unit (102) connected to a system bus of a host system and receiving input data therefrom and communicating with said session key LUT (186), said session key LUT (186) providing a transmission encryption key for said data communication package, (b) a data compressing unit (118) providing compression of a part of said input data thereby producing a compressed part of said input data contained in said second section of said data communication package, (c) a data encryption unit (126) providing an encryption of said second section of said data communication package according to said transmission encryption key transferred from said session key LUT (186) to said data encryption unit (126), (d) an integrity check value calculation unit (122) constituting a first series configuration from said data compression unit (118) intercomnunicating through said integrity check value calculation unit (122) to said data encryption unit (126), (e) a network transmission controller (134) providing said data communication package through a connection to said network, supplying said input data to said network in a transmission rate determined by said network transmission controller (134) and said network, (f) a first switch means (108) enabling switching between two modes of operation, a first mode of operation providing bypassing or disabling of said first series configuration and enabling communication between said data read transmission control unit (102) and said network transmission controller (134) for transferring said input data directly hereto and a second mode of operation enabling communication between said data read transmission control unit (102) through said first series configuration to said network transmission controller (134), and said data read transmission control (102) being adapted to monitor the compression and encryption of said part of said input data for determining whether or not said part of said input data exceeds the amount of data containable within said second section of data communication package.

24. The transmission and encryption section according to claim 23, said integrity check value calculation unit (122) performing a subtraction, division, multiplication or preferably a summation of the data contained in said second section of said data communication package to be transmitted and adding a first integrity calculation value to said second section of said data communication package.

25. The transmission and encryption section according to claim 23, said data read transmission control unit (102) comprising control means for controlling said first switch means (108) in said two modes of operations.

26. The transmission and encryption section according to claim 23, said data read transmission control unit (102) further enabling communication to said data encryption unit (126) for transferring said transmission encryption key provided by said session key LUT (186) from said data read transmission control unit (102) to said data encryption unit (126).

27. The transmission and encryption section according to claim 23, said session key LUT (186) comprising encryption key information updated according to a key management protocol by said host system.

28. The transmission and encryption section according to claim 23, said transmission and encryption section for encrypting and transmitting data communication packages on a network providing interrupt routines for units included in said communication controller hereby insuring a continuous data transmission on a network.

29. The transmission and encryption section according to claim 23, wherein said communication controller is implemented fully or partly as an integrated circuit applying VLSI, LSI, ASIC, FPGA, PLD techniques or any combinations thereof.

30. The transmission and encryption section according to claim 23, wherein said data compression unit (118) adds flag and fragment ID trailing said compressed part of said input data contained in said second section of said data communication package.

31. The transmission and encryption section according to claim 23 further comprising a transmission FIFO (130) (first in first out storage means) constituting an input section of said network transmission controller (134).

32. The transmission and encryption section according to claim 31, said network transmission controller (134) controlling said transmission FIFO (130) so as to guarantee the continuous supply of bytes from said transmission FIFO (130) to said network transmission controller (134).

33. A network controller of a communication controller comprising means for producing a data communication package comprising a non encrypted first section including clear header, and a encrypted second section including a protected header, a data section, a fragment ID, flags, padding and a ICV.

34. The network controller of a communication controller according to claim 33, wherein said network controller further comprising means for producing the data communication package wherein the data section comprises compressed data, end of data, padding and uncompressed data.

35. A data communication package comprising a data section including compressed data and uncompressed data.

36. The data communication package according to claim 35, said data section being included in an encrypted section of said data communication package.

37. The data communication package according to claim 35, further comprising a non-encrypted section preceding said encrypted section.

38. The data communication package according to claim 35, said encrypted section further including a protected header, a fragment ID, flags, padding and a ICV.

39. The data communication package according to claim 35, said data section further including end of data and padding following said compressed data and preceding said uncompressed data.

40. A communication controller chip for performing data encryption and data decryption of a multiplicity of data communication packages to be transferred in a network such as LAN (local area network) or WAN (wide area network) and including a plurality of processing units, each of said multiplicity of data communication packages containing a first section of non-encrypted data and a second section containing encrypted data and each said of multiplicity of data communication packages having an associated processing descriptor defining source, destination, process configuration of said plurality of processing units and processing of said data communication package, and said communication controller chip comprising:

(a) a bridge unit (86) connecting said communication controller through a bus (85) to a central processing unit (CPU) or a host, (b) a random access memory RAM (82) for keys, processing descriptors and for temporary storage of data, (c) a data transmission control unit (88) for providing access for said CPU to information regarding general configuration of said communication controller, (d) an in-queue unit (90a) comprising a plurality of queues for pointers referencing processing descriptors for data communication packages in said RAM (82) to be processed by said plurality of processing units, (e) an out-queue unit (90b) comprising a go-queue of pointers referencing processing descriptors for data communication packages in RAM (82) to be processed by a plurality of processing units, which process is monitored and analysed by said CPU or host system so as to establish if further processing is required, and said out-queue unit (90b) comprising a complete-queue of pointers referencing processing descriptors for data communication packages in said RAM (82) having completed processing in accordance with requirements of said CPU or host system, (f) a decompression processing unit (92a) included in said plurality of processing units providing decompression of compressed data of said second section of said data communication packages thereby producing decompressed data in said RAM (82) or memory of said host in accordance with processing descriptors associated with said data communication packages, (g) a compression processing unit (92b) providing compression of said second section of said outgoing data communication packages thereby producing compressed data in said RAM (82) or memory of said host in accordance with processing descriptors associated with said data communication packages, (h) a decryption processing unit (94a) providing a decryption of said second section of a data communication package according to a reception decryption key provided in a decryption key space of said RAM (82), said decryption key space being referenced by a key pointer included in said processing descriptors, and said decryption processing unit (94a) providing generation of said second section of said data communication package, (i) an encryption processing unit (94b) providing an encryption of said second section of a data communication package according to a transmission encryption key provided in an encryption key space of said RAM (82), said encryption key space being referenced by said key pointer of said processing descriptors, and said encryption processing unit (94b) providing generation said second section of said outgoing data communication package, (j) a bus designated as first in first out (FIFO) bus (80) enabling communication between said bridge unit (86), said RAM (82), said data transmission control unit (88), said in-queue unit (90a), said out-queue unit (90b), said compressing processing unit (92b), said decompression processing unit (92a), said encryption processing unit (94b) and said decryption processing unit (94a), and (k) a management bus (84) providing signaling and configuration between said data transmission control unit (88), said in-queue unit (90a), said out-queue unit (90b), said compressing processing unit (92b), said decompression processing unit (92a), said encryption processing unit (94b) and said decryption processing unit (94a), said communication controller allowing for parallel processing of said multiplicity of said data communication packages to be performed in any arbitrary order in accordance said processing descriptors in RAM (82).

41. The communication controller chip according to claim 40, wherein said communication controller further comprising:

(l) a first authentication processing unit (96a) providing calculation of an integrity check value (ICV) to be included in an outgoing data communication package, said calculation utilising an ICV key provided in a ICV key space of said RAM (82), said ICV key space being referenced by said processing descriptors, (m) a second authentication processing unit (96b) providing verification of an ICV to be extracted from an incoming data communication package, said calculation utilising a ICV key provided in said ICV key space of said RAM (82), said ICV key space being referenced by said processing descriptors, (n) a receiving media access control unit (98a) (RX-MAC) constituting an address filter for said communication controller and providing a receiving gate for said network, said receiving media access control unit (98a) filtering all data communication packages on said network and communicating incoming data communication packages to a incoming data communication package space in said RAM (82), said receiving media access control unit (98a) simultaneously generating a processing descriptor for every incoming data communication packages, said processing descriptor including a start address of associated incoming data communication package in a incoming data communication package space in said RAM (82), said receiving media access control unit (98a) communicating said processing descriptor to said in-queue unit (90a), and said receiving media access control unit (98a) communicating an end address of said incoming data communication package space in said processing descriptor at completion of reception of said incoming data communication package, and (o) a transmitting media access control unit (98b) (TX-MAC) providing a transmitting gate for said communication controller on said network and performing a transmission on said network of outgoing data communication packages identified by said processing descriptors in RAM (82), said transmitting media access control unit (98b) performing evaluation of length of said outgoing data communication package and writing said length in said first section of said outgoing data communication package, and said transmitting media access control unit (98b) communicating said processing descriptors to said complete queue of said out-queue on completion of transmission of said data communication package.

42. The communication controller chip according to claim 41, wherein said first in first out (FIFO) bus (80) further enabling communication between said bridge unit (86), said RAM (82), said data transmission control unit (88), said in-queue unit (90a), said out-queue unit (90b), said compressing processing unit (92b), said decompression processing unit (92a), said encryption processing unit (94b), said decryption processing unit (94a), said first authentication processing unit (96a), said second authentication processing unit (96b), said receiving media access control unit (98a), and said transmitting media access control unit (98b).

43. The communication controller chip according to claim 41, wherein said communication controller chip further comprises an additional part similar to a communication controller chip for performing data encryption and data decryption of a multiplicity of data communication packages to be transferred in a network such as LAN (local area network) or WAN (wide area network) and including a plurality of processing units, each of said multiplicity of data communication packages containing a first section of non-encrypted data and a second section containing encrypted data and each of said multiplicity of data communication pages having an associated processing descriptor defining source, destination, process configuration of said plurality of processing units and processing of said data communication package, and said communication controller chip comprising:

(a) a bridge unit (86) connecting said communication controller through a bus (85) to a central process unit (CPU) or a host, (b) a random access memory RAM (82) for keys, processing descriptors and for temporary storage of data, (c) a data transmission control unit (88) for providing access for said CPU to information regarding general configuration of said communication controller, (d) an in-queue unit (90a) comprising a plurality of queues for pointers referencing processing descriptors for data communication packages in said RAM (82) to be processed by said plurality of processing units, (e) an out-queue unit (90b) comprising a go-queue of pointers referencing processing descriptors for data communication packages in RAM (82) to be processed by a plurality of processing units, which process is monitored and analyzed by said CPU or host system so as to establish if further processing is required, and said out-queue unit (90b) comprising a complete-queue of pointers referencing processing descriptors for data communication packages in said RAM (82) having completed processing in accordance with requirements of said CPU or host system, (f) a decompression processing unit (92a) included in said plurality of processing units providing decompression of compressed data of said second section of said data communication packages thereby producing decompressed data in said RAM (82) or memory of said host in accordance with processing descriptors associated with said data communication packages, (g) a compression processing unit (92b) providing compression of said second section of said outgoing data communication packages thereby producing compressed data in said RAM (82) or memory of said host in accordance with processing descriptors associated with said data communication packages, (h) a decryption processing unit (94a) providing a decryption of said second section of a data communication package according to a reception decryption key provided in a decryption key space of said RAM (82), said decryption key space being referenced by a key pointer included in said processing descriptors, and said decryption processing unit (94a) providing generation of said second section of said data communication package, (i) an encryption processing unit (94b) providing an encryption of said second section of a data communication package according to a transmission encryption key provided in an encryption key space of said RAM (82), said encryption key space being referenced by said key pointer of said processing descriptors, and said encryption processing unit (94b) providing generation of said second section of said outgoing data communication package, (j) a bus designated as first in first out (FIFO) bus (80) enabling communication between said bridge unit (86), said RAM (82), said data transmission control unit (88), said in-queue unit (90a) said out-queue unit (90b), said compressing processing unit (92b), said decompression processing unit (92a), said encryption processing unit (94b) and said decryption processing unit (94a) and (k) a management bus (84) providing signaling and configuration between said data transmission control unit (88), said in-queue unit (90a), said out-queue unit (90b), said compressing processing unit (92b), said decompression processing unit (92a), said encryption processing unit (94b) and said decryption processing unit (94a), said communication controller allowing for parallel processing of said multiplicity of said data communication packages to be performed in any arbitrary order in accordance with said processing descriptors in RAM (82), aid communication controller further comprising:

(l) a first authentication processing unit (96a) providing calculation of an integrity check value (ICV) to be included in an outgoing data communication package, said calculation utilizing an ICV key provided in an ICV key space of said RAM (82), said ICV key space being referenced by said processing descriptors, (m) a second authentication processing unit (96b) providing verification of an ICV to be extracted from an incoming data communication package, said calculation utilizing an ICV key provided in said ICV key space of said RAM (82), said ICV key space being referenced by said processing descriptors, (n) a receiving media access control unit (98a) (RX-MAC) constituting an address filter for said communication controller and providing a receiving gate for said network, said receiving media access control unit (98a) filtering all data communication packages on said network and communicating incoming data communication packages to an incoming data communication package space in said RAM (82), said receiving media access control unit (98a) simultaneously generating a processing descriptor for every incoming data communication package, said processing descriptor including a start address of associated incoming data communication package in an incoming data communication package space in said RAM (82), said receiving media access control unit (98a) communicating said processing descriptor to said in-queue unit (90a), and said receiving media access control unit (98a) communicating an end address of said incoming data communication package space in said processing descriptor at completion of reception of said incoming data communication package, and (o) a transmitting media access control unit (98b) (TX-MAC) providing a transmitting gate for said communication controller on said network and performing a transmission on said network of outgoing data communication packages identified by said processing descriptors in said RAM (82), said transmitting media access control unit (98b) performing evaluation of length of said outgoing data communication package and writing said length in said first section of said outgoing data communication package, and said transmitting media access control unit (98b) communicating said processing descriptors to said complete queue of said out-queue on completion of transmission of said data communication package, and said communication controller separately including the features (a) to (o) enabling parallel transmission and reception of said data communication packages on a LAN and/or a WAN.

44. The communication controller chip according to claim 40, wherein said management bus (84) further providing signaling and configuration for said first authentication processing unit (96a), said second authentication processing unit (96b), said receiving media access control unit (98a), and said transmitting media access control unit (98b).

45. The communication controller chip according to claim 40, wherein said compressing processing unit (92b) has a maximum allowable space on said RAM (82) for compressed data included in said second section of said outgoing data communication package.

46. The communication controller chip according to claim 40, wherein said decompressing processing unit (92a) has a maximum allowable space on said RAM (82) for decompressed data included in said second section of said incoming data communication packages to be communicated to said CPU or said host.

47. The communication controller chip according to claim 40, wherein said RAM (82) is constituted by SRAM, DRAM, or SDRAM or any combinations thereof.

48. The communication controller chip according to claim 40, wherein said compression processing unit (92b) may be configured to detect compression efficiency and in accordance to said compression efficiency continue compression of data or disengage further compression.

49. The communication controller chip according to claim 48, wherein said communication controller chip being implemented on a single housing or an in two or more housing.

50. A communication controller for performing data encryption and data decryption of data communication packages to be transferred in a network (such as a LAN: Local Area Network, or a WAN: Wide Area Network), said data communication package containing a first section of non-encrypted data and a second section containing encrypted data, and comprising a session key LUT unit (186) and a transmission and encryption section comprising:

(a) a data read transmission control unit (102) connected to a system bus of a host system and receiving input data therefrom and communicating with said session key LUT (186), said session key LUT (186) providing a transmission encryption key for said data communication package, (b) a data compressing unit (118) providing compression of a part of said input data thereby producing a compressed part of said input data contained in said second section of said data communication package, (c) a data encryption unit (126) providing an encryption of said second section of said data communication package according to said transmission encryption key transferred from said session key LUT (186) to said data encryption unit (126), (d) an integrity check value calculation unit (122) constituting a first series configuration from said data compression unit (118) intercommunicating through said integrity check value calculation unit (122) to said data encryption unit (126), (e) a network transmission controller (134) providing said data communication package through a connection to said network, supplying said input data to said network in a transmission rate determined by said network transmission controller (134) and said network, and (f) a first switch means (108) enabling switching between two modes of operation, a first mode of operation providing bypassing or disabling of said first series configuration and enabling communication between said data read transmission control unit (102) and said network transmission controller (134) for transferring said input data directly hereto and a second mode of operation enabling communication between said data read transmission control unit (102) through said first series configuration to said network transmission controller (134), said communication controller further comprising a receiving and decrypting section comprising:

(g) a network receiving controller (140) providing a connection to said network and receiving a received data communication package from said network, (h) a data receiving control unit (148) receiving said received data communication package through communication with said network receiving controller (140), and communicating with said session key LUT (186), said session key LUT (186) providing a reception encryption key for said received data communication package, (i) a data decompression unit (172) providing decompression of said second section of said received data communication package, (j) a data decryption unit (164) providing a decryption of said second section of said received data communication package according to a reception encryption key transferred from said session key LUT (186) to said data decryption unit (164), (k) an integrity check value verification unit (168) receiving said received data communication package from said data decryption unit (164), and constituting a second series configuration from said data decryption unit (164) intercommunicating through said integrity check value verification unit (166) to said data decompression unit (172), said integrity check value verification unit (166) transferring said second section of said received data communication package to said data decompression unit (172), (l) a data write unit (180) connected to said system bus of said host system, supplying said system bus with said received data communication package, and (m) a second switch means (154) enabling switching between two modes of operation, a third mode of operation providing bypassing or disabling of said second series configuration and enabling communication between said data receiving control unit (148) and said data write unit (180) for transferring said first section of said received data communication package directly hereto, and a fourth mode of operation enabling communication between said data receiving control unit (148) through said second series configuration to said data write unit (180), and said transmission and encryption section further comprising a transmission FIFO (130) (first in first out storage means) constituting an input section of said network transmission controller (134), and said data compression unit (118) comprising two modes of operation, a high compression mode of operation handling compression of said part of said input data substantially simultaneously to transmission of said data communication package, and a low compression mode of operation applying a reduced compression efficiency to said compression substantially simultaneously to transmission of said data communication package, said high compression mode of operation operating according to an amount of accumulated data in said transmission FIFO (130) and said data compression unit (118) being notified by said network transmission controller in case of said amount of accumulated data in transmission FIFO (130) is less than a predetermined value hence activating said low compression mode of operation.

51. A communication controller for performing data encryption and data decryption of data communication packages to be transferred in a network (such as a LAN: Local Area Network, or a WAN: Wide Area Network), said data communication package containing a first section of non-encrypted data and a second section containing encrypted data, and comprising a session key LUT unit (186) and a transmission and encryption section comprising:

(a) a data read transmission control unit (102) connected to a system bus of a host system and receiving input data therefrom and communicating with said session key LUT (186), said session key LUT (186) providing a transmission encryption key for said data communication package, (b) a data compressing unit (118) providing compression of a part of said input data thereby producing a compressed part of said input data contained in said second section of said data communication package, (c) a data encryption unit (126) providing an encryption of said second section of said data communication package according to said transmission encryption key transferred from said session key LUT (186) to said data encryption unit (126), (d) an integrity check value calculation unit (122) constituting a first series configuration from said data compression unit (118) intercommunicating through said integrity check value calculation unit (122) to said data encryption unit (126), (e) a network transmission controller (134) providing said data communication package through a connection to said network, supplying said input data to said network in a transmission rate determined by said network transmission controller (134) and said network, and (f) a first switch means (108) enabling switching between two modes of operation, a first mode of operation providing bypassing or disabling of said first series configuration and enabling communication between said data read transmission control unit (102) and said network transmission controller (134) for transferring said input data directly hereto and a second mode of operation enabling communication between said data read transmission control unit (102) through said first series configuration to said network transmission controller (134), said communication controller further comprising a receiving and decrypting section comprising:

(g) a network receiving controller (140) providing a connection to said network and receiving a received data communication package from said network, (h) a data receiving control unit (148) receiving said received data communication package through communication with said network receiving controller (140), and communicating with said session key LUT (186), said session key LUT (186) providing a reception encryption key for said received data communication package, (i) a data decompression unit (172) providing decompression of said second section of said received data communication package, (j) a data decryption unit (164) providing a decryption of said second section of said received data communication package according to a reception encryption key transferred from said session key LUT (186) to said data decryption unit (164), (k) an integrity check value verification unit (168) receiving said received data communication package from said data decryption unit (164), and constituting a second series configuration from said data decryption unit (164) intercommunicating through said integrity check value verification unit (166) to said data decompression unit (172), said integrity check value verification unit (166) transferring said second section of said received data communication package to said data decompression unit (172), (l) a data write unit (180) connected to said system bus of said host system, supplying said system bus with said received data communication package, and (m) a second switch means (154) enabling switching between two modes of operation, a third mode of operation providing bypassing or disabling of said second series configuration and enabling communication between said data receiving control unit (148) and said data write unit (180) for transferring said first section of said received data communication package directly hereto, and a fourth mode of operation enabling communication between said data receiving control unit (148) through said second series configuration to said data write unit (180), and said transmission and encryption section further comprising a transmission FIFO (130) (first in first out storage means) constituting an input section of said network transmission controller (134), said data read transmission control (102) being adapted to monitor the compression and encryption of said part of said input data for determining whether or not said part of said input data exceeds the amount of data containable within said second section of data communication package, and said data compression unit (118) comprising two modes of operation, a high compression mode of operation handling compression of said part of said input data substantially simultaneously to transmission of said data communication package, and a low compression mode of operation applying a reduced compression efficiency to said compression substantially simultaneously to transmission of said data communication package, said high compression mode of operation operating according to an amount of accumulated data in said transmission FIFO (130) and said data compression unit (118) being notified by said network transmission controller in case of said amount of accumulated data in transmission FIFO (130) is less than a predetermined value hence activating said low compression mode of operation.

52. The transmission and encryption section according to claim 51, said data compression unit (118) and said data encryption unit (126) being adapted to be operated substantially simultaneously and controlled by said network transmission controller (134) so as to guarantee the continuous supply of bytes from said transmission FIFO (130) to said network transmission controller (134).

53. A transmission and encryption section of a communication controller for performing data encryption and data decryption of data communication packages to be transferred in a network (such as a LAN: Local Area Network, or a WAN: Wide Area Network), said data communication package containing a first section of non-encrypted data and a second section containing encrypted data, and said communication controller comprising a session key LUT unit (186), and comprising:

(a) a data read transmission control unit (102) connected to a system bus of a host system and receiving input data therefrom and communicating with said session key LUT (186), said session key LUT (186) providing a transmission encryption key for said data communication package, (b) a data compressing unit (118) providing compression of a part of said input data thereby producing a compressed part of said input data contained in said second section of said data communication package, (c) a data encryption unit (126) providing an encryption of said second section of said data communication package according to said transmission encryption key transferred from said session key LUT (186) to said data encryption unit (126), (d) an integrity check value calculation unit (122) constituting a first series configuration from said data compression unit (118) intercommunicating through said integrity check value calculation unit (122) to said data encryption unit (126), (e) a network transmission controller (134) providing said data communication package through a connection to said network, supplying said input data to said network in a transmission rate determined by said network transmission controller (134) and said network, and (f) a first switch means (108) enabling switching between two modes of operation, a first mode of operation providing bypassing or disabling of said first series configuration and enabling communication between said data read transmission control unit (102) and said network transmission controller (134) for transferring said input data directly hereto and a second mode of operation enabling communication between said data read transmission control unit (102) through said first series configuration to said network transmission controller (134), and said transmission and encryption section further comprising a transmission FIFO (130) (first in first out storage means) constituting an input section of said network transmission controller (134), and said data compression unit (118) comprising two modes of operation, a high compression mode of operation handling compression of said part of said input data substantially simultaneously to transmission of said data communication package, and a low compression mode of operation applying a reduced compression efficiency to said compression substantially simultaneously to transmission of said data communication package, said high compression mode of operation operating according to an amount of accumulated data in said transmission FIFO (130) and said data compression unit (118) being notified by said network transmission controller (134) in case of said amount of accumulated data transmission FIFO (130) is less than a predetermined value hence activating said low compression mode of operation.

54. A transmission and encryption section of a communication controller for performing data encryption and data decryption of data communication packages to be transferred in a network (such as a LAN: Local Area Network, or a WAN: Wide Area Network), said data communication package containing a first section of non-encrypted data and a second section containing encrypted data, and said communication controller comprising a session key LUT unit (186), and comprising:

(a) a data read transmission control unit (102) connected to a system bus of a host system and receiving input data therefrom and communicating with said session key LUT (186), said session key LUT (186) providing a transmission encryption key for said data communication package, (b) a data compressing unit (118) providing compression of a part of said input data thereby producing a compressed part of said input data contained in said second section of said data communication package, (c) a data encryption unit (126) providing an encryption of said second section of said data communication package according to said transmission encryption key transferred from said session key LUT (186) to said data encryption unit (126), (d) an integrity check value calculation unit (122) constituting a first series configuration from said data compression unit (118) intercommunicating through said integrity check value calculation unit (122) to said data encryption unit (126), (e) a network transmission controller (134) providing said data communication package through a connection to said network, supplying said input data to said network in a transmission rate determined by said network transmission controller (134) and said network, and (f) a first switch means (108) enabling switching between two modes of operation, a first mode of operation providing bypassing or disabling of said first series configuration and enabling communication between said data read transmission control unit (102) and said network transmission controller (134) for transferring said input data directly hereto and a second mode of operation enabling communication between said data read transmission control unit (102) through said first series configuration to said network transmission controller (134), said transmission and encryption section further comprising a transmission FIFO (130) (first in first out storage means) constituting an input section of said network transmission controller (134), said data read transmission control (102) being adapted to monitor the compression and encryption of said part of said input data for determining whether or not said part of said input data exceeds the amount of data containable within said second section of data communication package, and said data compression unit (118) comprising two modes of operation, a high compression mode of operation handling compression of said part of said input data substantially simultaneously to transmission of said data communication package, and a low compression mode of operation applying a reduced compression efficiency to said compression substantially simultaneously to transmission of said data communication package, said high compression mode of operation operating according to an amount of accumulated data in said transmission FIFO (130) and said data compression unit (118) being notified by said network transmission controller (134) in case of said amount of accumulated data transmission FIFO (130) is less than a predetermined value hence activating said low compression mode of operation.

55. A method for transmitting and encrypting in a communication controller for performing data encryption and data decryption of data communication packages to be transferred in a network (such as a LAN: Local Area Network, or a WAN: Wide Area Network), said data communication package containing a first section of non-encrypted data and a second section containing encrypted data, and said communication controller comprising a session key storage means, a data read transmission control means, a data encryption means, a data compression means and an integrity check value calculation means constituting a first series configuration from said data compression means intercommunicating through said integrity check value calculation means to said data encryption means, said method for transmitting and encrypting, comprising:

(a) receiving input data from a system bus of a host system by means of said data read transmission control means connected to said session key storage means, providing a transmission encryption key for said data communication package by means of said session key storage means, (b) providing compression of a part of said input data thereby producing a compressed part of said input data contained in said second section of said data communication package by means of said data compressing means, (c) providing an encryption by means of said data encryption means, according to said transmission encryption key transferred from said session key storage means, of said second section of said data communication package transferred from said data compressing means, (d) supplying said data communication package to said network in a transmission rate determined by said controller means for network transmission and said network by means of a connection to said network from a controller means for network transmission, and (e) switching by means of a first switching means between two modes of operation, a first mode of operation providing bypassing or disabling of said first series configuration and enabling communication between said data read transmission control means and said controller means for network transmission and transferring said input data directly hereto and a second mode of operation enabling communication between said data read transmission control means through said first series configuration to said controller means for network transmission, and further comprising monitoring the compression and encrypting of said part of said input data by means of said data read transmission control means for determining whether or not said part of said input data exceeds the amount of data containable within said second section of data communication package.

56. The method for transmitting and encrypting according to claim 55, further comprising constituting an input section of said controller means for network transmission by means of a transmission FIFO means (first in first out storage means).

57. The method for transmitting and encrypting according to claim 56, further comprising controlling said transmission FIFO means by means of said controller means for network transmission so as to guarantee the continuous supply of bytes from said transmission FIFO means to said controller means for network transmission.

58. A method for transmitting and encrypting in a communication controller for performing data encryption and data decryption of data communication packages to be transferred in a network (such as a LAN: Local Area Network, or a WAN: Wide Area Network), said data communication package containing a first section of non-encrypted data and a second section containing encrypted data, and said data communication controller comprising a session key storage means, a data read transmission control means, a data encryption means, a data compression means and an integrity check value calculation means constituting a first series configuration from said data compression means intercommunicating through said integrity check value calculation means to said data encryption means, said method for transmitting and encrypting, comprising:

(a) receiving input data from a system bus of a host system by means of said data read transmission control means connected to said session key storage means, providing a transmission encryption key for said data communication package by means of said session key storage means, (b) providing compression of a part of said input data thereby producing a compressed part of said input data contained in said second section of said data communication package by means of said data compressing means, (c) providing an encryption by means of said data encryption means, according to said transmission encryption key transferred from said session key storage means, of said second section of said data communication package transferred from said data compressing means, (d) supplying said data communication package to said network in a transmission rate determined by said controller means for network transmission and said network by means of a connection to said network from a controller means for network transmission, and (e) switching by means of a first switching means between two modes of operation, a first mode of operation providing bypassing or disabling of said first series configuration and enabling communication between said data read transmission control means and said controller means for network transmission and transferring said input data directly hereto and a second mode of operation enabling communication between said data read transmission control means through said first series configuration to said controller means for network transmission.

59. The method for transmitting and encrypting according to claim 58, further comprising constituting an input section of said controller means for network transmission by means of a transmission FIFO means (first in first out storage means).

60. The method for transmitting and encrypting according to claim 59, further comprising substantially simultaneously operating said data compression means and said data encryption means, and controlling by said controller means for network transmission so as to guarantee the continuous supply of bytes from said transmission FIFO means to said controller means for network transmission.

61. The method transmitting and encrypting according to claim 55, further comprising performing a subtraction, division, multiplication or preferably a summation of the data contained in said second section of said data communication package to be transmitted and adding a first integrity calculation value to said second section of said data communication package by means of said integrity check value calculation means.

62. The method for transmitting and encrypting according to claim 55, further comprising controlling said first switching means in said two modes of operations by means of said data read transmission control means.

63. The method for transmitting and encrypting according to claim 55, further comprising transferring said transmission encryption key provided by said session key storage means from said data read transmission control means to said data encryption means by means of a connection means.

64. The method for transmitting and encrypting according to claim 55, further comprising providing interrupt routines for units included in said communication controller hereby insuring a continuous data transmission on said network by means of said controller means for network transmission.

65. The method for transmitting and encrypting according to claim 55, further comprising adding flag and fragment ID trailing said compressed part of said input data contained in said second section of said data communication package by means of said data compression means.

66. The method for transmitting and encryption according to claim 55, said communication controller further comprising receiving means, a data writing means, a data decompressing means, a data decryption means, a data receiving control means and an integrity check value verification means constituting a second series configuration from said data decryption means intercommunicating through said integrity check value verification means to said data decompression means, comprising:

(f) providing a connection to said network and receiving a received data communication package from said network by means of controller means for network reception, (g) receiving said received data communication package through a communication between said controller means for network reception and communicating to said session key storage means by means of a data receiving control means, providing a reception encryption key for said data communication package by means of said session key storage means, (h) providing a decryption of said second section of said received data communication package according to said reception encryption key transferred from said session key storage means and providing a decrypted second section of said received data communication package by means of a data decryption means, (i) providing decompression of a compressed part of said decrypted second section of said received data communication package and providing a decompressed part in said second section of said received data communication package instead of said compressed part in said second section of said data communication package by means of a data decompression means, (j) supplying said system bus of said host system with received data communication package by means of said data writing means, and (k) switching by means of a second switching means enabling switching between two modes of operation, a third mode of operation providing bypassing or disabling of said second series configuration and enabling communication between said data receiving control means and said data writing means and transferring said received input data directly hereto, and a fourth mode of operation enabling communication between said data receiving control means through said second series configuration said data writing means.

67. The method for transmitting and encrypting according to claim 66, further comprising receiving said received data communication package from said data receiving control means in said third mode of operation, receiving said received data communication package from said data decompression means in said fourth mode of operation and transferring said received data communication package to said data writing means by means of a write FIFO means, and receiving said received data communication package from said control means for network reception and transferring said data communication package to said data receiving control means by means of a receiving FIFO means.

68. The method for transmitting and encrypting according to claim 66, further comprising performing a subtraction, division, multiplication or preferably a summation of the data contained in said second section of a received data communication package, obtaining a second integrity check value and comparing said second integrity check value with said first integrity check value contained in said received data communication package by means of said integrity check value verification means.

69. The method for transmitting and encrypting according to claim 66, further comprising controlling said second switching means in said two modes of operations by means of said data receiving control means.

70. The method for transmitting and encrypting according to claim 66, further comprising providing interrupt routines for units included in said communication controller hereby insuring a continuous data transmission on said network by means of said receiving means for receiving said data communication packages on said network.

71. The method for transmitting and encrypting according to claim 66, further comprising extracting flag and fragment ID trailing said compressed part of said decrypted second section of said received data communication package by means of said data decompression means.

72. The method for transmitting and encrypting according to claim 55, further comprising updating encryption key information in said session key storage means according to a key management protocol by said host system.

73. The method for transmitting and encrypting according to claim 55, further comprising substantially simultaneously operating said data compression means and said data encryption means, and controlling by said controller means for network transmission so as to guarantee the continuous supply of bytes from said transmission FIFO means to said controller means for network transmission.

74. A method for transmitting and encrypting in a communication controller for performing data encryption and data decryption of data communication packages to be transferred in a network (such as a LAN: Local Area Network, or a WAN: Wide Area Network), said data communication package containing a first section of non-encrypted data and a second section containing encrypted data, and said communication controller comprising a session key storage means, a data read transmission control means, a data encryption means, a data compression means and an integrity check value calculation means constituting a first series configuration from said data compression means intercommunicating through said integrity check value calculation means to said data encryption means, said method for transmitting and encrypting, comprising:

(a) receiving input data from a system bus of a host system by means of said data read transmission control means connected to said session key storage means, providing a transmission encryption key for said data communication package by means of said session key storage means, (b) providing compression of a part of said input data thereby producing a compressed part of said input data contained in said second section of said data communication package by means of said data compressing means, (c) providing an encryption by means of said data encryption means, according to said transmission encryption key transferred from said session key storage means, of said second section of said data communication package transferred from said data compressing means, (d) supplying said data communication package to said network in a transmission rate determined by said controller means for network transmission and said network by means of a connection to said network from a controller means for network transmission, (e) switching by means of a first switching means between two modes of operation, a first mode of operation providing bypassing or disabling of said first series configuration and enabling communication between said data read transmission control means and said controller means for network transmission and transferring said input data directly hereto and a second mode of operation enabling communication between said data read transmission control means through said first series configuration to said controller means for network transmission, constituting an input section of said controller means for network transmission by means of a transmission FIFO means (first in first out storage means), and operating said data compression means in two modes of operation, a high compression mode of operation handling compression of said part of said input data substantially simultaneously to transmission of said data communication package, and a low compression mode of operation applying a reduced compression efficiency to said compression substantially simultaneously to transmission of said data communication package, said high compression mode of operation operating according to an amount of accumulated data in said transmission FIFO means and said data compression means being notified by said controller means for network transmission in case of said amount of accumulated data in said transmission FIFO means is less than a predetermined value hence activating said low compression mode of operation.

75. A method for transmitting and encrypting in a communication controller for performing data encryption and data decryption of data communication packages to be transferred in a network (such as a LAN: Local Area Network, or a WAN: Wide Area Network), said data communication package containing a first section of non-encrypted data and a second section containing encrypted data, and said communication controller comprising a session key storage means, a data read transmission control means, a data encryption means, a data compression means and an integrity check value calculation means constituting a first series configuration from said data compression means intercommunicating through said integrity check value calculation means to said data encryption means, said method for transmitting and encrypting, comprising:

(a) receiving input data from a system bus of a host system by means of said data read transmission control means connected to said session key storage means, providing a transmission encryption key for said data communication package by means of said session key storage means, (b) providing compression of a part of said input data thereby producing a compressed part of said input data contained in said second section of said data communication package by means of said data compressing means, (c) providing an encryption by means of said data encryption means, according to said transmission encryption key transferred from said session key storage means, of said second section of said data communication package transferred from said data compressing means, (d) supplying said data communication package to said network in a transmission rate determined by said controller means for network transmission and said network by means of a connection to said network from a controller means for network transmission, (e) switching by means of a first switching means between two modes of operation, a first mode of operation providing bypassing or disabling of said first series configuration and enabling communication between said data read transmission control means and said controller means for network transmission and transferring said input data directly hereto and a second mode of operation enabling communication between said data read transmission control means through said first series configuration to said controller means for network transmission, (f) constituting an input section of said controller means for network transmission by means of a transmission FIFO means (first in first out storage means), and monitoring the compression and encrypting of said part of said input data by means of said data read transmission control means for determining whether or not said part of said input data exceeds the amount of data containable within said second section of data communication package, and operating said data compression means in two modes of operation, a high compression mode of operation handling compression of said part of said input data substantially simultaneously to transmission of said data communication package, and a low compression mode of operation applying a reduced compression efficiency to said compression substantially simultaneously to transmission of said data communication package, said high compression mode of operation operating according to an amount of accumulated data in said transmission FIFO means and said data compression means being notified by said controller means for network transmission in case of said amount of accumulated data in said transmission FIFO means is less than a predetermined value hence activating said low compression mode of operation.

* * * * *